US009677714B2

(12) United States Patent
Wray

(10) Patent No.: US 9,677,714 B2
(45) Date of Patent: Jun. 13, 2017

(54) CRYOGENIC INJECTION COMPOSITIONS, SYSTEMS AND METHODS FOR CRYOGENICALLY MODULATING FLOW IN A CONDUIT

(71) Applicant: Daniel X. Wray, Minden, NV (US)

(72) Inventor: Daniel X. Wray, Minden, NV (US)

(73) Assignee: BIOFILM IP, LLC, Minden, NV (US)

( * ) Notice: Subject to any disclaimer, the term of this patent is extended or adjusted under 35 U.S.C. 154(b) by 1216 days.

(21) Appl. No.: 13/715,909

(22) Filed: Dec. 14, 2012

(65) Prior Publication Data

US 2013/0152608 A1    Jun. 20, 2013

Related U.S. Application Data

(60) Provisional application No. 61/617,536, filed on Mar. 29, 2012, provisional application No. 61/600,577, (Continued)

(51) Int. Cl.
*F25B 9/00* (2006.01)
*C09K 5/00* (2006.01)
(Continued)

(52) U.S. Cl.
CPC ............. *F17C 13/04* (2013.01); *C09K 5/04* (2013.01); *F16L 55/103* (2013.01); *F16L 55/1003* (2013.01)

(58) Field of Classification Search
CPC .......... F25B 9/005; F25B 9/006; C09K 5/041; C09K 5/042; C09K 5/048; C09K 5/00
(Continued)

(56) References Cited

U.S. PATENT DOCUMENTS 3,041,850 A    7/1962    Nunn et al. ................ 62/293
3,498,071 A    3/1970    Tremont .................. 137/15.08
(Continued)

FOREIGN PATENT DOCUMENTS

CN    101525530    9/2009
DE    39 03 009    8/1990
(Continued)

OTHER PUBLICATIONS

Letter/Written Disclosure of the Information Disclosure Statement for the above-referenced application, mailed on Mar. 19, 2013, 2 pages.
(Continued)

*Primary Examiner* — Ryan J Walters
*Assistant Examiner* — Erik Mendoza-Wilkenfe
(74) *Attorney, Agent, or Firm* — Dentons US LLP; Frank J. Miskiel; Stephanie Seidman

(57) ABSTRACT

Provided are cryogenic injection compositions, methods and systems to introduce a cryogenic injection composition into a fluid within a conduit such that at least a portion of the temperature of the fluid is reduced to a temperature below which at least a portion of the fluid becomes a solid thereby reversibly plugging the conduit. Also provided are methods and systems for cooling or freezing a conduit and a fluid therein using a pressurized fluid cryogen as a thermal transfer fluid for controlled removal of thermal energy from a thermal conducting metal conduit and a fluid contained therein.

35 Claims, 1 Drawing Sheet

Related U.S. Application Data filed on Feb. 17, 2012, provisional application No. 61/576,362, filed on Dec. 16, 2011.

(51) Int. Cl.

| | | |
|---|---|---|
| *F17C 13/04* | (2006.01) | |
| *F16L 55/10* | (2006.01) | |
| *C09K 5/04* | (2006.01) | |
| *F16L 55/103* | (2006.01) | |

(58) Field of Classification Search
USPC .................................................... 252/67, 75
See application file for complete search history.

(56) References Cited

U.S. PATENT DOCUMENTS

| | | | |
|---|---|---|---|
| 3,516,935 A | 6/1970 | Monforte et al. ......... 252/62.56 |
| 3,530,680 A | 9/1970 | Marvin ......................... 405/169 |
| 3,623,337 A | 11/1971 | Tremont ......................... 62/233 |
| 3,631,870 A | 1/1972 | Livingston ..................... 137/13 |
| 3,693,665 A | 9/1972 | Veerling ......................... 138/149 |
| 3,695,301 A | 10/1972 | Pittman ........................... 138/97 |
| 3,709,863 A | 1/1973 | White et al. .................... 524/104 |
| 3,730,931 A | 5/1973 | Simoneau et al. .............. 521/74 |
| 3,738,424 A | 6/1973 | Osmun et al. ................. 166/298 |
| 3,742,723 A | 7/1973 | Grise ...................... 137/315.01 |
| 3,760,598 A | 9/1973 | Jakob et al. ....................... 62/74 |
| 3,768,273 A | 10/1973 | Missimer ......................... 62/84 |
| 3,793,716 A | 2/1974 | Smith-Johannsen ........... 29/611 |
| 3,814,574 A | 6/1974 | Darley ........................... 431/338 |
| 3,815,377 A | 6/1974 | Tyree, Jr. ........................... 62/62 |
| 3,816,374 A | 6/1974 | White ............................. 526/270 |
| 3,852,235 A | 12/1974 | Krutchen ........................ 524/259 |
| 3,857,255 A | 12/1974 | Elwood et al. ................. 62/193 |
| 3,865,145 A | 2/1975 | Mckay et al. ................... 138/113 |
| 3,872,682 A | 3/1975 | Shook ............................... 62/114 |
| 3,905,424 A | 9/1975 | Elwood et al. .................. 169/46 |
| 3,928,516 A | 12/1975 | Sliva et al. .................. 423/447.8 |
| 3,933,722 A | 1/1976 | Krutchen ........................ 524/470 |
| 3,971,416 A | 7/1976 | Johnson ........................... 138/33 |
| 4,013,097 A | 3/1977 | Calandra ......................... 138/93 |
| 4,020,265 A | 4/1977 | White ............................. 526/285 |
| 4,095,747 A | 6/1978 | Anderson ..................... 239/288.5 |
| 4,112,706 A | 9/1978 | Brister ............................. 62/50.1 |
| 4,165,571 A | 8/1979 | Chang et al. ................... 37/322 |
| 4,219,224 A | 8/1980 | Hanley ............................. 285/47 |
| 4,220,012 A | 9/1980 | Brister ............................. 62/130 |
| 4,238,640 A | 12/1980 | Tweed et al. .................... 174/87 |
| 4,267,699 A * | 5/1981 | Bahrenburg .......... F16L 55/103 138/89 |
| 4,283,935 A | 8/1981 | Eguchi et al. ................... 374/44 |
| 4,350,027 A | 9/1982 | Tyree, Jr. .......................... 62/374 |
| 4,370,862 A * | 2/1983 | Brister ....................... F25D 3/10 138/89 |
| RE31,450 E | 11/1983 | Smith et al. ............. 73/999.999 |
| 4,421,656 A | 12/1983 | Donatelli ......................... 507/127 |
| 4,422,338 A | 12/1983 | Smith ......................... 73/861.356 |
| 4,441,328 A | 4/1984 | Brister ............................. 62/53 |
| 4,533,123 A | 8/1985 | O'leary ........................... 261/61 |
| 4,535,597 A | 8/1985 | Missimer et al. ............... 62/55.5 |
| 4,597,267 A | 7/1986 | Forrest ........................... 62/55.5 |
| 4,597,699 A | 7/1986 | Ramunas ......................... 409/232 |
| 4,634,050 A | 1/1987 | Shippee ......................... 239/14.2 |
| 4,642,994 A | 2/1987 | Barclay ............................... 62/3 |
| 4,729,664 A | 3/1988 | Kamiwano ..................... 366/230 |
| 4,789,104 A | 12/1988 | Anderson ........................ 239/455 |
| 4,829,770 A | 5/1989 | Hashimoto ....................... 62/3.1 |
| 4,849,611 A | 7/1989 | Whitney et al. ................ 219/538 |
| 4,934,196 A | 6/1990 | Romano ....................... 73/861.356 |
| 4,951,474 A | 8/1990 | DiNovo et al. .................. 62/114 |
| 4,975,415 A | 12/1990 | Gusman et al. ................ 505/425 |
| 5,019,761 A | 5/1991 | Kraft .......................... 318/568.11 |
| 5,076,930 A | 12/1991 | Rubin ............................. 210/634 |
| 5,099,650 A | 3/1992 | Crunkleton ......................... 62/6 |
| 5,105,843 A | 4/1992 | Condron et al. ................ 137/13 |
| 5,124,466 A | 6/1992 | Azechi ........................... 556/425 |
| 5,125,427 A | 6/1992 | Cantu et al. ...................... 137/13 |
| 5,324,159 A | 6/1994 | Nowobilski et al. ........... 414/301 |
| 5,352,304 A | 10/1994 | DeArdo et al. ................. 148/336 |
| 5,357,756 A | 10/1994 | Lubell ............................... 62/3.1 |
| 5,385,025 A | 1/1995 | Kellett ............................. 62/50.1 |
| 5,403,089 A | 4/1995 | Kuo et al. ....................... 366/132 |
| 5,522,419 A | 6/1996 | Sand ............................... 137/216 |
| 5,527,330 A | 6/1996 | Tovey ............................. 606/167 |
| 5,550,044 A | 8/1996 | Kosak et al. .................... 435/177 |
| 5,582,239 A | 12/1996 | Tsunoda et al. ................ 165/76 |
| 5,618,475 A | 4/1997 | Johnson et al. ................ 264/10 |
| 5,665,277 A | 9/1997 | Johnson et al. ................... 264/6 |
| 5,738,772 A | 4/1998 | Bartasis et al. ................ 204/406 |
| 5,743,095 A | 4/1998 | Gschneidner et al. .......... 62/3.1 |
| 5,743,637 A | 4/1998 | Ogier .......................... 366/163.2 |
| 5,778,919 A | 7/1998 | Petrone ............................ 62/3.1 |
| 5,787,722 A | 8/1998 | Jenkins ........................... 62/305 |
| 5,836,167 A * | 11/1998 | Clouston ............... F16L 55/103 62/293 |
| RE36,244 E | 7/1999 | Matthews ................. 166/250.01 |
| 5,944,686 A | 8/1999 | Patterson et al. ............... 604/22 |
| 5,993,167 A | 11/1999 | Mochizuki ..................... 417/174 |
| 6,041,621 A | 3/2000 | Olszewski et al. .............. 62/613 |
| 6,041,811 A | 3/2000 | Walter et al. .................. 137/334 |
| 6,070,416 A | 6/2000 | Germain et al. .................. 62/63 |
| 6,105,388 A | 8/2000 | Acharya ........................... 62/612 |
| 6,129,290 A | 10/2000 | Nikkanen ....................... 239/2.2 |
| 6,141,972 A * | 11/2000 | Evans .................... F16L 55/103 138/97 |
| 6,143,211 A | 11/2000 | Mathiowitz et al. .............. 264/4 |
| 6,148,619 A * | 11/2000 | Evans .................... F25B 19/00 165/46 |
| 6,164,078 A | 12/2000 | Lak et al. ....................... 62/47.1 |
| 6,183,573 B1 | 2/2001 | Fujiwara et al. .............. 148/336 |
| 6,185,953 B1 | 2/2001 | Sada et al. ..................... 62/324.4 |
| 6,212,891 B1 | 4/2001 | Minta et al. .................... 62/50.7 |
| 6,301,923 B1 | 10/2001 | Bonaquist et al. ............. 62/402 |
| 6,348,431 B1 | 2/2002 | Even ............................... 502/325 |
| 6,354,091 B1 | 3/2002 | Hemmes ........................... 62/64 |
| 6,363,729 B1 | 4/2002 | Brahmbhatt et al. ........... 62/51.1 |
| 6,446,441 B1 | 9/2002 | Dean ................................. 62/3.1 |
| 6,450,775 B1 | 9/2002 | Hutchinson et al. ......... 417/198 |
| 6,464,148 B1 | 10/2002 | Costa et al. ..................... 239/2.2 |
| 6,467,274 B2 | 10/2002 | Barclay et al. ................... 62/3.1 |
| 6,526,759 B2 | 3/2003 | Zimm et al. ...................... 62/3.1 |
| 6,548,264 B1 | 4/2003 | Tan et al. ....................... 435/7.21 |
| 6,568,429 B2 | 5/2003 | Lundman ......................... 138/91 |
| 6,589,366 B1 | 7/2003 | Gschneidner et al. ........ 148/301 |
| 6,623,761 B2 | 9/2003 | Hassan ........................... 424/489 |
| 6,658,864 B2 | 12/2003 | Thomas et al. ................... 62/63 |
| 6,684,112 B1 | 1/2004 | Cheng ............................. 700/28 |
| 6,708,511 B2 | 3/2004 | Martin ............................ 62/201 |
| 6,710,020 B2 | 3/2004 | Tenne et al. .................... 508/103 |
| 6,722,145 B2 | 4/2004 | Podtchereniaev et al. ..... 62/217 |
| 6,726,934 B1 | 4/2004 | Prokop ........................... 424/500 |
| 6,739,137 B2 | 5/2004 | Minovitch ......................... 62/3.1 |
| 6,826,915 B2 | 12/2004 | Wada et al. ....................... 62/3.1 |
| 6,843,065 B2 | 1/2005 | Flynn ............................... 62/156 |
| 6,870,047 B2 | 3/2005 | Kleiber et al. ................. 536/25.4 |
| 6,962,164 B2 | 11/2005 | Lull et al. ......................... 137/2 |
| 7,013,668 B2 | 3/2006 | Kyees ............................. 62/390 |
| 7,028,768 B2 | 4/2006 | Aler et al. ...................... 165/219 |
| 7,036,598 B2 | 5/2006 | Skjaerseth et al. ............ 166/339 |
| 7,062,926 B2 | 6/2006 | Clulow et al. .................... 62/74 |
| 7,066,730 B2 | 6/2006 | Macaluso ....................... 432/225 |
| 7,069,981 B2 | 7/2006 | Valensa et al. ................. 165/164 |
| 7,083,800 B1 | 8/2006 | Terren et al. ................... 424/401 |
| 7,111,467 B2 | 9/2006 | Apparao et al. ................. 62/79 |
| 7,114,340 B2 | 10/2006 | Pecharsky et al. .............. 62/3.1 |
| 7,121,344 B2 | 10/2006 | Fenton et al. .................. 166/339 |
| 7,160,525 B1 | 1/2007 | Peng et al. ....................... 423/1 |
| 7,185,501 B2 | 3/2007 | Steinbach ......................... 62/79 |
| 7,218,523 B2 | 5/2007 | Hamman ....................... 361/718 |
| 7,234,310 B2 | 6/2007 | Flynn et al. .................... 62/114 |
| 7,235,212 B2 | 6/2007 | Kuehmann et al. ............ 420/38 |
| 7,259,101 B2 | 8/2007 | Zurcher et al. ................ 438/700 |
| 7,263,852 B2 | 9/2007 | Bacchus ......................... 62/305 |
| 7,272,951 B2 | 9/2007 | Kyees ............................. 62/390 |

(56) References Cited

U.S. PATENT DOCUMENTS

| | | | |
|---|---|---|---|
| 7,273,479 B2 | 9/2007 | Littrup et al. | 606/21 |
| 7,332,351 B2 | 2/2008 | Tan et al. | 436/524 |
| 7,378,065 B2 | 5/2008 | Filippi et al. | 422/198 |
| 7,407,600 B2 | 8/2008 | Eaton et al. | 252/73 |
| 7,413,725 B2 | 8/2008 | El-Shall et al. | 423/594.14 |
| 7,415,830 B2 | 8/2008 | Wyatt et al. | 62/6 |
| 7,441,412 B2 | 10/2008 | Jensen | 62/121 |
| 7,461,691 B2 | 12/2008 | Vinegar et al. | 166/60 |
| 7,481,064 B2 | 1/2009 | Kitanovski et al. | 62/3.1 |
| 7,497,086 B2 | 3/2009 | Atkins et al. | 62/50.1 |
| 7,498,005 B2 | 3/2009 | Yadav | 423/21.1 |
| 7,521,394 B2 | 4/2009 | Xie et al. | 502/350 |
| 7,524,481 B2 | 4/2009 | Tenne et al. | 423/561.1 |
| 7,546,873 B2 | 6/2009 | Kim et al. | 166/245 |
| 7,562,831 B2 | 7/2009 | Costa et al. | 239/2.2 |
| 7,585,349 B2 | 9/2009 | Xia et al. | 75/371 |
| 7,596,955 B2 | 10/2009 | Muller et al. | 62/3.1 |
| 7,603,865 B2 | 10/2009 | Shin et al. | 62/3.1 |
| 7,621,976 B2 | 11/2009 | Hampden-Smith | 75/338 |
| 7,648,597 B2 | 1/2010 | Nagao et al. | 148/547 |
| 7,683,098 B2 | 3/2010 | Yadav | 516/34 |
| 7,707,898 B2 | 5/2010 | Oddie | 73/861.92 |
| 7,727,463 B2 | 6/2010 | Arai et al. | 420/104 |
| 7,730,777 B2 | 6/2010 | Anzai et al. | 73/204.11 |
| 7,740,287 B2 | 6/2010 | Eide | 285/261 |
| 7,781,060 B2 | 8/2010 | Li et al. | 428/402 |
| 7,783,384 B2 | 8/2010 | Kraft | 700/245 |
| 7,785,998 B2 | 8/2010 | Millward | 438/591 |
| 7,807,112 B2 | 10/2010 | Denes et al. | 422/186.04 |
| 7,834,468 B2 | 11/2010 | Dutta | 247/788 |
| 7,883,606 B2 | 2/2011 | Parkansky et al. | 204/178 |
| 7,921,657 B2 | 4/2011 | Littrup et al. | 62/64 |
| 8,048,236 B2 | 11/2011 | Shull et al. | 148/121 |
| 8,052,958 B2 | 11/2011 | Lee et al. | 423/632 |
| 8,099,964 B2 | 1/2012 | Saito et al. | 62/3.1 |
| 8,104,293 B2 | 1/2012 | Barve et al. | 62/3.1 |
| 8,763,411 B2 | 7/2014 | Wray et al. | 62/67 |
| 9,010,132 B2 | 4/2015 | Wray et al. | 62/77 |
| 2002/0139125 A1 | 10/2002 | Kunkel et al. | 62/64 |
| 2004/0020642 A1 | 2/2004 | Vinegar et al. | 166/245 |
| 2004/0244498 A1 | 12/2004 | Chen et al. | 73/861.19 |
| 2005/0092483 A1 | 5/2005 | Vinegar et al. | 166/60 |
| 2005/0288873 A1 | 12/2005 | Urdaneta et al. | 137/487.5 |
| 2006/0228554 A1 | 10/2006 | Tan et al. | 428/404 |
| 2006/0269463 A1 | 11/2006 | Lee et al. | 423/263 |
| 2007/0080054 A1 | 4/2007 | Parkansky et al. | 204/164 |
| 2007/0144181 A1 | 6/2007 | Kitanovsk et al. | 62/3.1 |
| 2008/0048047 A1 | 2/2008 | Zurecki et al. | 239/8 |
| 2008/0145641 A1 | 6/2008 | Li et al. | 428/313.9 |
| 2008/0286374 A1 | 11/2008 | Wang et al. | 424/489 |
| 2009/0019860 A1 | 1/2009 | Sakurada et al. | 62/3.1 |
| 2009/0029064 A1 | 1/2009 | Truesdale et al. | 427/544 |
| 2009/0040716 A1* | 2/2009 | Fedorov | F28D 15/00 361/694 |
| 2009/0104269 A1 | 4/2009 | Graham et al. | 424/489 |
| 2009/0158749 A1 | 6/2009 | Sandeman et al. | 62/3.1 |
| 2009/0158890 A1 | 6/2009 | Garbar et al. | 75/332 |
| 2009/0203196 A1 | 8/2009 | Kim et al. | 438/478 |
| 2009/0215255 A1 | 8/2009 | Millward | 438/591 |
| 2009/0217675 A1 | 9/2009 | Kobayashi et al. | 62/3.1 |
| 2009/0281671 A1 | 11/2009 | Duan et al. | 700/282 |
| 2009/0282948 A1 | 11/2009 | Xia et al. | 75/255 |
| 2010/0055170 A1 | 3/2010 | Lee | 424/451 |
| 2010/0071383 A1 | 3/2010 | Zhang et al. | 62/3.1 |
| 2010/0087337 A1 | 4/2010 | Dewitt | 506/27 |
| 2010/0139455 A1 | 6/2010 | Tiley | 75/351 |
| 2010/0267549 A1 | 10/2010 | Finley | 502/100 |
| 2010/0311859 A1 | 12/2010 | Van De Belt et al. | 522/81 |
| 2011/0052496 A1 | 3/2011 | Cid-Arregui | 424/9.1 |
| 2011/0056240 A1* | 3/2011 | Malik | F16L 55/103 62/657 |
| 2011/0060062 A1 | 3/2011 | Wang et al. | 521/50 |
| 2011/0085229 A1 | 4/2011 | Lavrentovich et al. | 359/315 |
| 2011/0091560 A1 | 4/2011 | Smith et al. | 424/489 |
| 2011/0165086 A1 | 7/2011 | Lee et al. | 424/9.32 |
| 2011/0218364 A1 | 9/2011 | Porter et al. | 586/343 |
| 2011/0229576 A1 | 9/2011 | Trogler et al. | 424/490 |
| 2011/0287262 A1 | 11/2011 | Berkland | 428/402 |
| 2011/0308259 A1 | 12/2011 | Wray et al. | 62/3.3 |
| 2012/0017614 A1* | 1/2012 | Clancy | C09K 5/041 62/114 |
| 2012/0064022 A1 | 3/2012 | Wray | 424/70.12 |
| 2012/0290051 A1* | 11/2012 | Boyden | A61N 5/025 607/113 |
| 2013/0062555 A1* | 3/2013 | Olson | B82Y 30/00 252/75 |
| 2014/0190663 A1 | 7/2014 | Wray et al. | 156/96 |
| 2015/0075632 A1 | 3/2015 | Wray et al. | 137/13 |
| 2015/0176929 A1 | 6/2015 | Wray et al. | F26F 13/06 |

FOREIGN PATENT DOCUMENTS

| | | |
|---|---|---|
| EP | 2141188 | 1/2010 |
| GB | 1 584 189 | 2/1981 |
| WO | WO 82/01408 | 4/1982 |
| WO | WO 97/11326 | 3/1997 |
| WO | WO 99/47588 | 9/1999 |
| WO | WO 2011/159355 | 12/2011 |
| WO | WO 2013/090828 | 6/2013 |

OTHER PUBLICATIONS

Espacenet website, English language abstract of German Patent Publication No. DE 39 03 009, "Device for freezing pipelines through which media flow, in particular water conduits (water piping)," Published on Sep. 8, 1990 [online][retrieved on Mar. 6, 2013] Retrieved from:<URL:worldwide.espacenet.com/publicationDetails/biblio?CC=DE&NR=3903009&KC=&FT=E&locale=en_EP, 2 pages.

Gedik et al., "Magnetic refrigeration technology applications on near-room temperature," 5th International Advanced Technologies Symposium (IATS'09), held on May 13-15, 2009, Karabuk, Turkey, pp. 1887-1893.

Gschneidner et al., "Recent developments in magnetic refrigeration," Materials Science Forum, vols. 315-317, pp. 69-76 (1999).

Southwestern Petroleum Short Course, "Cryogenic valve offers oil and gas industry options for surface flow line and well pressure control," Published 2011 [online][retrieved on Oct. 20, 2011] Retrieved from:<URL:swpshortcourse.org/program/abstracts/28-cryogenic-valve-offers-oil-and-gas-industry-options-surface-flow-line-and-well-, 1 page.

Partial International Search Report, issued Feb. 13, 2012, in connection with International Patent Application No. PCT/US2011/001083, 2 pages.

International Search Report and Written Opinion, issued Jun. 4, 2012, in connection with International Patent Application No. PCT/US2011/001083, 23 pages.

Response to Written Opinion submitted Sep. 3, 2012, in connection with International Patent Application No. PCT/US2011/001083, 47 pages.

Written Opinion, issued Feb. 5, 2013, in connection with in connection with International Patent Application No. PCT/US2011/001083, 5 pages.

Response to Written Opinion, submitted Mar. 5, 2013, in connection with in connection with International Patent Application No. PCT/US2011/001083, 36 pages.

Letter/Written Disclosure of the Information Disclosure Statement for the above-referenced application, mailed on Sep. 4, 2015, 2 pages.

Machine-generated English translation of Chinese Patent Publication No. CN101525530, published Sep. 9, 2009, available at http://www.google.com/patents/CN101525530A?cl=en, [accessed Aug. 18, 2015], 3 pages.

Response to International Search Report and Written Opinion, submitted Nov. 28, 2013, in connection with International Patent Application No. PCT/US2012/069925, 39 pages.

(56) References Cited

OTHER PUBLICATIONS

Written Opinion, issued Jan. 17, 2014, in connection with in connection with International Patent Application No. PCT/US2012/069925, 8 pages.
Response to Written Opinion, submitted Feb. 25, 2014, in connection with International Patent Application No. PCT/US2012/069925, 33 pages.
Examination Report, issued Jun. 29, 2015, and translation, in connection with Taiwanese Patent Application No. 101145569, 16 pages.
Letter/Written Disclosure of the Supplemental Information Disclosure Statement for the above-referenced application, filed herewith on Aug. 5, 2016, 2 pages.
Examination Report, issued Jun. 7, 2016, in connection with Taiwan Patent Application No. 105100260 [English language translation and original document in Chinese], 16 pages.
Letter/Written Disclosure of the Supplemental Information Disclosure Statement for the above-referenced application, filed herewith on Feb. 24, 2016, 2 pages.
Response, filed Oct. 22, 2015, to Examination Report, issued Jun. 29, 2015, in connection with Taiwanese Patent Application No. 101145569 [English instructions and response as in Chinese], 39 pages.
Notice of Allowance, dated Dec. 18, 2015, in connection with corresponding Tawainese Patent Application No. 101145569 [English translation and original document in Chinese], 3 pages.
Letter/Written Disclosure of the Information Disclosure Statement for the above-referenced application, mailed on Sep. 20, 2013, 2 pages.
Certified English Language translation of German Patent Publication No. DE 39 03 009, 19 pages.
International Preliminary Report on Patentability, issued Apr. 9, 2013, in connection with International Patent Application No. PCT/US2011/001083, 18 pages.
Partial International Search Report, issued May 3, 2013, in connection with International Patent Application No. PCT/US2012/069925, 5 pages.
Response to Communication persuant to Rules 161(1) and 162, submitted Jun. 27, 2013, in connection with European Patent Application No. 11740742.9, 21 pages.
International Search Report and Written Opinion, issued Sep. 2, 2013, in connection with International Patent Application No. PCT/US2012/069925, 16 pages.

\* cited by examiner

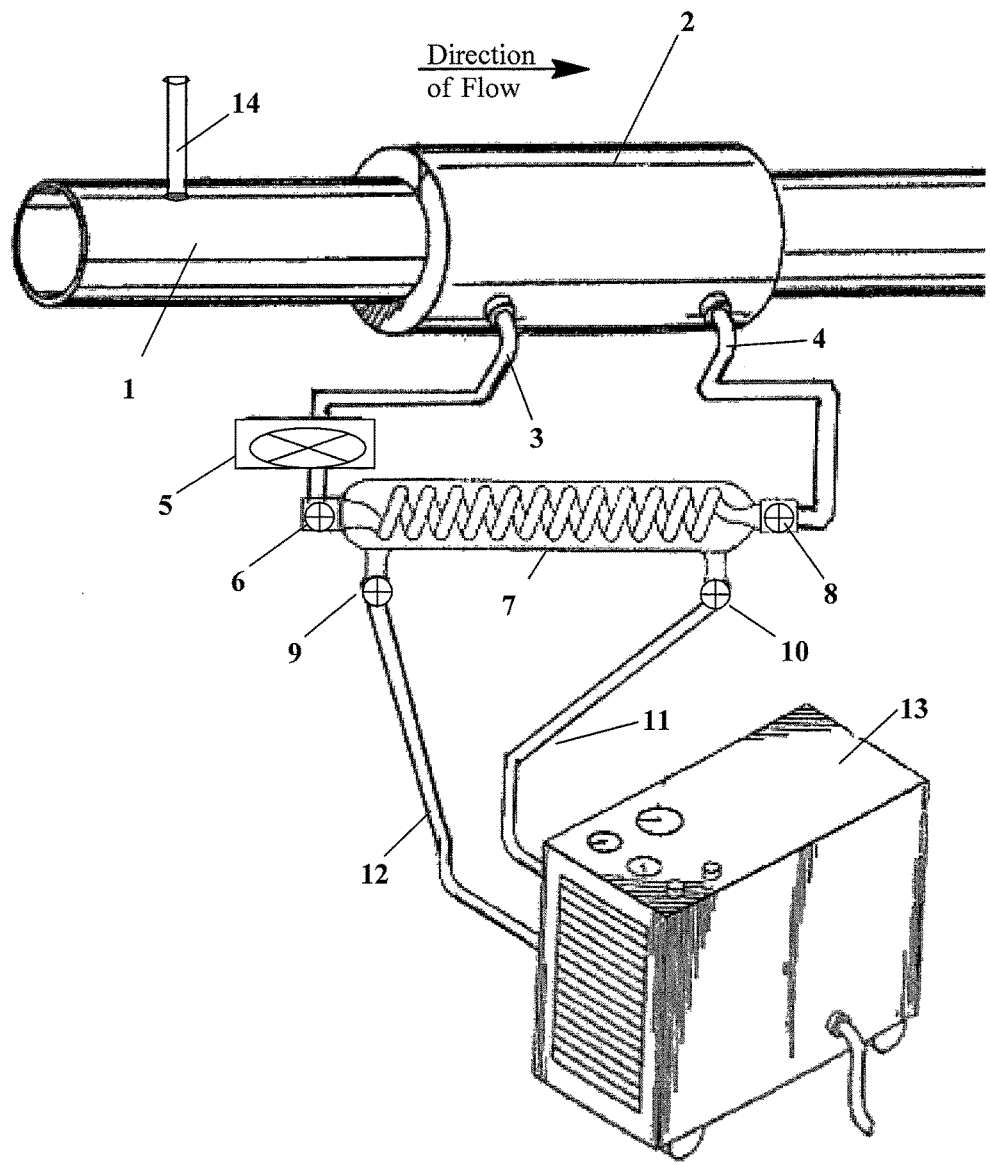

CRYOGENIC INJECTION COMPOSITIONS, SYSTEMS AND METHODS FOR CRYOGENICALLY MODULATING FLOW IN A CONDUIT

RELATED APPLICATIONS

Benefit of priority is claimed to U.S. Provisional Application No. 61/617,536 to Daniel X. Wray, entitled "METHODS OF CRYOGENICALLY MODULATING FLOW IN A CONDUIT," filed Mar. 29, 2012, and to U.S. Provisional Application No. 61/600,577 to Daniel X. Wray, entitled "CRYOGENIC INJECTION COMPOSITIONS, SYSTEMS AND METHODS FOR CRYOGENICALLY MODULATING FLOW IN A CONDUIT," filed Feb. 17, 2012, and to U.S. Provisional Application No. 61/576,362 to Daniel X. Wray, entitled "CRYOGENIC INJECTION COMPOSITIONS, SYSTEMS AND METHODS FOR CRYOGENICALLY MODULATING FLOW IN A CONDUIT," filed Dec. 16, 2011.

This application also is related to corresponding International Application No. PCT/US2012/069925, filed the same day herewith, entitled "CRYOGENIC INJECTION COMPOSITIONS, SYSTEMS AND METHODS FOR CRYOGENICALLY MODULATING FLOW IN A CONDUIT," which also claims priority to U.S. Provisional Application Ser. Nos. 61/617,536; 61/600,577 and 61/576,362.

The subject matter of each of the above-referenced applications is incorporated by reference in its entirety.

FIELD

This invention relates generally to reversibly modulating flow of a fluid through a conduit. Provided are compositions, methods and systems to introduce a cryogenic injection composition into a fluid within a conduit such that at least a portion of the temperature of the fluid is reduced to a temperature below which at least a portion of the fluid becomes a solid thereby reversibly plugging the conduit. Also provided are methods of reversibly preventing flow in a conduit. Also provided are methods and systems for cooling or freezing a conduit and a fluid therein using a pressurized fluid cryogen as a thermal transfer fluid for controlled removal of thermal energy from a thermal conducting metal conduit and a fluid contained therein.

BACKGROUND

Metal conduits, such as gas, water and oil pipelines, can fail due to age, fatigue, corrosion, abuse, neglect and when used in the environment, natural forces that can fracture or rupture the pipe. There have been many attempts in the past to provide an effective method to stopper or plug a broken conduit, such as a pipe, carrying a gas, water or oil, in order to permit repairs to be made to the broken conduit. For example, U.S. Pat. No. 5,778,919 describes inflatable stoppers that can be placed in a pipeline and inflated in order to stop gas flowing through a pipeline while repairing the pipeline. U.S. Pat. No. 6,568,429 describes inflatable plugs that can be used to isolate defined sections of a conduit. U.S. Pat. No. 4,013,097 describes an apparatus for damming the flow of fluid in a pipeline, where the apparatus contains an inflatable bladder. The device is placed within a pipe and the bladder is inflated, thereby sealing the pipeline. U.S. Pat. No. 6,041,811 describes a mechanical plug for forming an ice barrier in a pipeline. U.S. Pat. No. 4,370,862 describes an apparatus and method for freezing a slug of liquid in a section of a large diameter fluid transmission line that includes application of a liquid cooling fluid that evaporates in response to the transfer of heat from the transmission line.

The drawbacks of these and other known intervention systems include the time and cost connected with known well intervention techniques, and in particular in connection with intervention in sub-sea wells, and the possible fracture or damage of the conduit.

Accordingly, a need exists for compositions, methodologies and devices that allow for reversibly plugging or stopping the flow of a fluid through a conduit.

SUMMARY

Among the objects herein, provided are compositions, methodologies and devices and systems for reversibly plugging or stopping the flow of a fluid through a conduit.

Provided are cooling and freezing systems and methods for removal of thermal energy from a thermal conducting metal conduit and a fluid contained therein. The system allows for the in situ formation of a reversible plug that can stop the flow of fluid through a conduit. The devices, systems and methods described herein include an efficient heat sink for effective heat transfer from a flowing fluid in a conduit, resulting in rapid formation of a frozen plug of fluid.

Provided are compositions, methods and systems to introduce a cryogenic injection composition into a fluid within a conduit such that at least a portion of the temperature of the fluid is reduced to a temperature below which at least a portion of the fluid becomes a solid thereby reversibly plugging the conduit.

Also provided are methods and systems for cooling or freezing a conduit and a fluid therein using a pressurized fluid cryogen as a thermal transfer fluid for controlled removal of thermal energy from a thermal conducting metal conduit and a fluid contained therein.

Provided herein are cryogenic injection compositions that contain a fluid cryogen and particles. The particles can include or be of a material selected from among a metal, a glass, a metal-coated glass, an oxide, a plastic, a metal-coated plastic, a ceramic, corian, diatomaceous earth, fiberglass, foam glass, gypsum, magnesite, magnesia fibers, mineral fibers, nylon, perlite, foamed plastic, expanded polystyrene, polyurethane, porcelain, PTFE, PVC, pyrex glass, silica, fused silica, amorphous silica, vermiculite, crushed stone, and sand and combinations thereof. The particles can contain or be of or be coated with a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The particles can be of or contain or be coated with an oxide, such as an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

Also provided are cryogenic injection compositions that contain particles of a material or containing a material having a high specific heat, such as graphite (including porous graphite and sintered graphite), fused silica, ground granite, silver, gold, tungsten, zinc, copper, and iron. The particles can have a density that allows the particles to be suspended or easily resuspended in the injection composition. The particles can be hollow. The particles can be microparticles having a diameter less than 100 µm, such as having a diameter between 1 µm and 10 µm. The particles can be nanoparticles, such as having a diameter less than 1000 nm. The particles can be of any shape, such as a shape selected from among cubes, flakes, granules, cylinders, rings, rods, needles, prisms, disks, fibers, pyramids, spheres, spheroids, prolate spheroids, oblate spheroids, ellipsoids, ovoids and random non-geometric shapes and combinations of these shapes.

The cryogenic injection composition provided herein can contain particles having a uniform surface geometry, or having a non-uniform surface geometry, such as a jagged or rough surface, or a combination thereof. The particles can have a specific surface area in a range from at or about 0.1 $m^2/g$ to at or about 500 $m^2/g$. The cryogenic injection composition can contain an amount of particles that is in the range of at or about 0.05% to at or about 90% based on the weight of the cryogenic injection composition. The particles can have a unimodal or bimodal or polymodal particle size distribution.

Also provided are cryogenic injection compositions containing a liquid cryogen that boils at a temperature colder than −100° C. The cryogen can be selected from among liquid nitrogen, liquid oxygen, liquid helium, liquid neon, liquid methane, liquid natural gas, liquid argon, liquid nitrous oxide, liquid carbon dioxide, liquid Freon and combinations thereof. The cryogen can be present in the range of 1% to 99% based on the weight of the injection composition. The cryogenic injection composition also can include a solvent. The solvent can be selected from among acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichloro-benzene, o-dichlorobenzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, m-xylene, p-xylene and combinations thereof. The solvent can contain water.

Also provided herein are thermal transfer systems for modulating thermal energy of a thermally conducting conduit containing a fluid. The thermal transfer system can include a liquid cryogen thermal transfer fluid; a jacket in thermal communication with the conduit; a pump; a refrigeration device; and a circuit through which the liquid cryogen thermal transfer fluid flows. An exemplary thermal transfer system is depicted in FIG. 1. In the thermal transfer systems provided herein, the circuit containing the thermal transfer fluid is in thermal communication with the refrigeration device. The circuit can be configured so that it passes through or is enveloped by an evaporator chamber of a refrigeration device. The pump of the thermal transfer system circulates the liquid cryogen thermal transfer fluid through the jacket and through the evaporator chamber of the refrigeration device. The jacket can include a thermal transfer surface of a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel, aluminum and any combination or alloy thereof. The thermal transfer systems provided herein also can include an injector for introducing a cryogenic injection composition provided herein into the fluid in the conduit.

Also provided are methods for temporarily preventing the flow of fluid in a pipeline, the methods including the steps of activating a thermal transfer system as described herein attached to the pipeline so that it is in thermal contact with at least one portion of the pipeline and activating an injector that when activated introduces a cryogenic injection composition provided herein into the fluid in the pipeline, where the thermal transfer system and injection of the cryogenic injection composition remove sufficient thermal energy to cause the fluid in the pipeline to form a plug that prevents fluid from flowing through the pipeline. The injector can be positioned so that the introduction of the cryogenic injection composition into the fluid within the conduit cools the fluid before the fluid reaches the area of the pipeline to which the jacket of the thermal transfer system is attached. The thermal transfer system generally is activated for a sufficient time to form a frozen plug of fluid that prevents flow of the fluid through the conduit, and can be maintained in the active state in order to maintain a frozen plug of fluid securely attached to the inner wall of the pipeline, thereby preventing flow of fluid past the plug in the pipeline.

In the methods provided herein, the jacket of the thermal transfer system can be attached to an intact conduit and the thermal transfer system can be activated as an emergency shut off mechanism to prevent flow in the conduit in case of failure or breach of the conduit. The jacket also can be attached to a breached or broken conduit and the thermal transfer system can be activated as an emergency shut off mechanism. In order to melt the plug, the methods can include as a step increasing the temperature of the jacket so that it donates thermal energy to the conduit, thereby melting the frozen plug and restoring flow of the fluid through the pipe.

Also provided are methods for temporarily preventing the flow of oil in an oil well, comprising the steps of activating a jacket of the thermal transfer system described herein attached to a portion of the producing tubular in the oil well so that the jacket is in thermal contact with at least one portion of the producing tubular and activating an injector attached to a portion of the producing tubular so that when activated the injector introduces a cryogenic injection composition provided herein into the oil in the producing tubular, where the injection of the cryogenic injection composition provided herein into the oil reduces the temperature of the oil before it comes into contact with the area of the producing tubular to which the jacket is attached, and the thermal transfer device extracts sufficient thermal energy from the oil or a component thereof freezes and forms a plug that reversibly attaches to the side walls of the producing tubular.

Provided herein are methods for modulating flow of a fluid in a conduit. The methods include as steps activating a heat transfer system affixed to at least a portion of the conduit to remove thermal energy from the conduit and the fluid within the conduit, and activating an injection device affixed to the conduit to introduce into the fluid within the conduit a material selected from among a surface active agent, a cryogen and frozen beads containing particles of a thermally conductive material or a combination thereof. Injecting the material into the fluid within the conduit introduces negative thermal energy into the flowing fluid within the conduit or reduces thermal energy in the fluid, precipitating or freezing at least a portion of the fluid, and thereby reducing or eliminating the flow of fluid through the conduit.

In the methods provided herein, the injection device can introduce a cryogen or a surfactant or a combination thereof into the fluid within the conduit. The injection device also can introduce, simultaneously or sequentially, frozen beads containing particles of a thermally conductive material into the fluid within the conduit. The frozen beads contain particles of a thermally conductive material and a frozen solvent. The solvent can be selected to have a melting point below the initial temperature of the fluid flowing within the conduit, so that when the frozen beads are introduced into the fluid within the conduit, the frozen solvent melts, withdrawing thermal energy from the fluid within the conduit. Exemplary solvents that can be included in the frozen solvent coating include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, iso-amyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, water, m-xylene, p-xylene and combinations thereof.

The beads can include a surface active agent. The surface active agent can be selected from among an anionic surfactant, a cationic surfactant, a zwitterionic surfactant, a non-ionic surfactant and a silicone surfactant or a combination thereof. When the frozen solvent of the beads melts, the particles of a thermally conductive material are released, creating nucleation sites in the fluid and localized modulation in fluid temperature and viscosity. The particles of a thermally conductive material can include a material selected from among carbon fibers, carbon nanostructures, e.g., carbon nanotubes, carbon buckyballs, carbon nanoribbons and carbon nanowires and combinations thereof, polyacetylene fibers, aluminum silicon carbide, aluminum graphite, aluminum nitride, silicon nitride ceramic and combinations thereof. The particles of a thermally conductive material can include a material selected from among copper, brass, beryllium, cadmium, cobalt, chrome nickel steel, gold, graphite, silver, iridium, iron, lead, magnesium, molybdenum, nickel, platinum, tin, tungsten, zinc, carbon steel, stainless steel and any combination or alloy thereof. The particles of a thermally conductive material can include an oxide selected from among an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof. In particular, the frozen beads can contain carbon nanotubes or polyacetylene fibers or a combination thereof and frozen ethanol. The particles can be hollow or can include an entrapped gas for buoyancy.

The particles of thermally conductive material can have a diameter less than 100 µm or between 1 µm and 10 µm or can have a diameter less than 1000 nm. The particles of thermally conductive material can have any shape, such as cubes, flakes, granules, cylinders, rings, rods, needles, prisms, disks, fibers, pyramids, spheres, spheroids, prolate spheroids, oblate spheroids, ellipsoids, ovoids and random non-geometric shapes and combinations of these shapes. The particles of thermally conductive material can have a uniform surface geometry, such as a smooth surface, or can have a non-uniform surface geometry, such as a rough or jagged surface.

The release of the cold particles of a thermally conductive material into the fluid within the conduit can result in the precipitation of at least some portion of the fluid within the conduit onto the wall of the conduit or onto previously frozen fluid attached to a wall of the conduit. The release of the cold particles of a thermally conductive material also can result in the precipitation of at least some portion of the fluid onto the particles to form coated particles followed by precipitation of the coated particles onto the wall of the conduit or onto previously frozen fluid attached to a wall of the conduit.

The heat transfer system can include any heat transfer system known in the art. An exemplary heat transfer system can include a detachable housing having side portions for enclosing a section of the conduit and end portions for engaging in sealing relation with opposite ends of the conduit section, the side and end portions defining a cooling chamber when assembled around the conduit, the cooling chamber being operable when filled by discharging cryogen from a refrigerant supply module into the chamber, which confines a volume of the cryogen at least a portion of which is in its liquid phase in intimate contact with the exterior surface of the section of conduit enclosed by the housing, the detachable housing including an inlet port for admitting the cryogen from the refrigerant supply module into the cooling chamber and an exhaust port for discharging the spent cryogen out of the cooling chamber. The side portions of the detachable housing can include a first cylindrical half shell and a second cylindrical half shell, the first and second shells each including longitudinally extending flange portions which cooperate to permit mating engagement of the shells to each other to form a closed structure, the end portions of the housing comprising radially extending flange portions for mating engagement with opposite ends of the conduit section enclosed by the housing.

The side and end portions further can include a layer of thermal insulation for thermally insulating the cooling chamber. The layer of thermal insulation can include a material selected from among polyurethane foam, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, porcelain, PTFE, PVC, pyrex glass, sand, silica aerogel, styrofoam, urethane foam, vermiculite and vinyl ester and combinations thereof.

The inlet port can include a first inlet for admitting a flow of the cryogenic fluid into a first region of the cooling chamber and a second inlet for admitting a flow of the cryogen into a second region of the cooling chamber. The inlet port also can include a fluid distribution header within the cooling chamber attached to an inlet port, the header having multiple fluid discharge openings disposed therein and in fluid communication with the inlet port, where the fluid discharge openings discharge multiple streams of the cryogen into the first and second regions of the cooling chamber, and onto the enclosed surfaces of the conduit within the first and second cooling chamber regions.

The heat transfer system can include a refrigerant supply module. The refrigerant supply module can include a reservoir containing a supply of the cryogen; pipes or tubes for providing fluid communication between the reservoir and the inlet port; valves for controlling the rate of cryogen flow into the cooling chamber; pipes or tubes for providing fluid communication between the reservoir and the injector device; and valves for controlling the rate of cryogenic flow to the injector device. The cryogen can be selected from among liquid argon, liquid nitrogen, liquid oxygen, liquid helium, liquid neon, liquid methane, liquid natural gas, liquid nitrous oxide, liquid carbon dioxide, liquid Freon and combinations thereof.

The heat transfer system can include a refrigeration system that contains a compressor, a condenser, a filter drier and a heat exchange unit. The compressor can be a reciprocating compressor, a rotary compressor, a screw compressor, a scroll compressor or a combination of any of these compressors. The thermal transfer system can include a refrigeration system that includes a vapor compression refrigeration system, a heat exchange unit, a magnetic refrigeration unit, a cryogenic cooling and absorption system or a combination thereof.

The fluid within the conduit can include any fluid transported through conduits or pipes. The fluid can be a liquid, a gas or combinations thereof. An exemplary liquid fluid is a hydrocarbon, such as a petroleum, or crude oil or produced oil from an oil well. Produced oil typically can contain some amount of water. Thus, the fluid can include crude oil, alone or in combination with water. The conduit can be a pipeline, such as a surface pipeline, a buried pipeline or an under-sea pipeline, including a sea-floor pipeline.

The injector device can include two or more injectors. The injector device can inject a surfactant and a cryogenic fluid simultaneously or consecutively into the fluid within the conduit. The injector device can inject a surfactant and cryogenic injection composition containing frozen beads containing particles of a thermally conductive material simultaneously or consecutively into the fluid within the conduit.

The activated thermal transfer system and the activated injector device remove sufficient thermal energy to cause the fluid in the pipeline to form a plug that prevents the fluid from flowing past the plug, thereby temporarily preventing the flow of fluid through the conduit. The thermal transfer system and injector device can be attached to an intact conduit and the thermal transfer system and injector can be activated to prevent flow in the conduit in order to perform routine maintenance on the conduit. The thermal transfer system and injector device can be attached to an intact conduit and the thermal transfer system and injector can be activated as an emergency shut off mechanism to prevent flow in the conduit in case of failure or breach of the conduit. The thermal transfer system and injector device can be attached to a breached or broken conduit and the thermal transfer system and injector can be activated as an emergency shut off mechanism.

The methods provided herein further can include identifying a breach site in a conduit; attaching the thermal transfer system to an intact area of the conduit before the breach; attaching before the thermal transfer system the injector device; and activating the thermal transfer system and the injector device until a frozen plug of fluid forms that prevents flow of the fluid through the conduit.

In the method provided herein, particularly in methods that result in formation of a frozen plug that prevents flow of fluid through the conduit, the method further can include as a step increasing the temperature of the thermal transfer system in order to transfer thermal energy to the conduit, thereby at least partially melting the frozen plug and releasing at least a portion of the plug from the wall of the conduit and thereby restoring flow of the fluid through the conduit.

Other objects, features and advantages of the compositions, systems and methods described herein will become apparent to those skilled in the art from the following detailed description. It is to be understood, however, that the detailed description, while indicating certain embodiments of the devices, systems and methods described herein, are given by way of illustration and not limitation. Many changes and modifications within the scope of the present invention may be made without departing from the spirit thereof.

DETAILED DESCRIPTION

Brief Description of the Figures

FIG. 1 is a schematic illustration of an embodiment of a thermal energy transfer system.

Item 1 is a conduit.
Item 2 is a jacket in thermal communication with conduit 1.
Item 3 is a cold supply port.
Item 4 is a warm return vent.
Item 5 is a pump.
Items 6, 8, 9 and 10 are valves.
Item 7 is an evaporator chamber of a refrigeration unit.
Items 11 and 12 are pipes or tubing connecting the evaporator chamber 7 to the refrigeration unit 13.
Item 13 is a refrigeration unit.
Item 14 in an injector.

A. DEFINITIONS

Unless defined otherwise, all technical and scientific terms used herein have the same meaning as is commonly understood by one of skill in the art to which the inventions belong.

All patents, patent applications, published applications and publications, websites and other published materials referred to throughout the entire disclosure herein, unless noted otherwise, are incorporated by reference in their entirety. In the event that there are a plurality of definitions for terms herein, those in this section prevail. Where reference is made to a URL or other such identifier or address, it is understood that such identifiers can change and particular information on the internet can come and go, but equivalent information can be found by searching the internet. Reference thereto evidences the availability and public dissemination of such information.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "particle" refers to a small mass that can be composed of any material, such as a metal, e.g., thermally conductive metals including silver, gold, copper, iron and aluminum, alumina, silica, sand, glass, metal-coated glass, metal-coated plastic or combinations thereof, and can be of any shape, including cubes, flakes, granules, cylinders, rings, rods, needles, prisms, disks, fibers, pyramids, spheres, spheroids, prolate spheroids, oblate spheroids, ellipsoids, ovoids and random non-geometric shapes. The particles can be isotropic or anisotropic. Typically the particles can have a diameter or width or length less than 100 microns, typically between 1 nm to 10 microns.

As used herein, the term "diameter" refers to a diameter, as that term is known in the art, and includes a measurement of width or length of an anisotropic particle. As used throughout the specification, diameter refers to D90 diameter, which means that 90% of the particles have a diameter of this value or less.

As used herein, a "nanoparticle" refers to a particle with a characteristic length (e.g., diameter) in the range of about 1 nm to about 1,000 nm. The characteristic length of the nanoparticles can be less than 100 nm. In other embodiments, the characteristic length of the nanoparticles can be less than 300 nm, 500 nm, 700 nm, or less than 900 nm.

As used herein, a "microparticle" refers to a particle with a characteristic length greater than 1,000 nm and less than about 10 microns.

As used herein, "D50" refers to the median value of particle diameter. For example if D50=1 µm, there are 50% particles larger than 1 µm and 50% smaller than 1 µm.

As used herein, "D90" refers to the 90% value of particle diameter. For example if D90=1 µm, 90% of the particles are smaller than 1 µm.

In the examples, and throughout this disclosure, all parts and percentages are by weight (wt %) and all temperatures are in ° C., unless otherwise indicated.

As used herein, "specific surface area" is defined as the ratio of the total particle surface area versus the total particle volume.

As used herein, a "conduit" is a channel, tube, duct or pipe for conveying fluids.

As used herein, "fluid" refers to gases, liquids, supercritical fluids and materials that flow, optionally containing dissolved species, solvated species and/or particulate matter. Fluids also refer to multiple fluids of different types present together. In this context, fluid refers to any form of liquid or pumpable material such as gas, petroleum, drill fluid, cement, concrete or resin coated sand.

As used herein, the term "thermal energy" refers to power that produces heat.

As used herein, "thermal communication" refers to heat transfer between bodies that are in contact or that are integrally connected by a medium that transmits thermal energy. Such communication generally involves radiation, conduction, convection or a combination thereof. Thermal communication may involve fluid communication (e.g., convection or conduction) or may not involve fluid communication (e.g., radiation).

As used herein, the term "thermal contact" refers to an arrangement that provides good thermal communication from one surface to another and does not necessarily denote the absence of an intermediate layer between the two surfaces. The terms "thermal contact" includes any coupling between one component and another component that enables relatively efficient transfer of heat between the components. The components can be directly thermally contacted with each other, or they may be indirectly contacted (such as through a thermally conductive layer, block or conduit).

As used herein, the term "thermal transfer" refers to conveying thermal energy by one object to another.

As used herein, a "thermal transfer device" is a device that conveys thermal energy to an object with which it is in thermal communication.

As used herein, "fluid communication" refers to communication that involves the transfer of a fluid. Fluid communication can involve thermal communication (e.g., the transfer of a fluid from one point to another, where both points are not at the same temperature) or may not involve thermal communication (e.g., the transfer of a fluid from one point to another, where both points are at the same temperature).

As used herein, the term "cooling rate" refers to how fast thermal energy is removed from an object. A value for cooling rate can be obtained by dividing the difference between the temperature at which cooling is started and the final cooling temperature by the time for reaching the final cooling temperature from the start of cooling. Generally, cooling rate refers to the decrease in temperature of an object over time. The cooling rate can be adjusted by control of the rate at which thermal energy is removed from the object. The details of heat exchange are well known to those in the art.

As used herein, the term "cryogen" refers to any substance having a boiling point below −25° C. Exemplary cryogens include liquid nitrogen, liquid nitrous oxide, liquid methane, liquid natural gas, or liquid or solid carbon dioxide, chlorodifluoro-methane, or Freon®, or any number of other refrigerants or fluids with a high thermal energy transfer capacity and low boiling point, as are commonly known to those skilled in the art. Cryogens can readily induce a temperature differential when applied to an object.

As used herein, the term "cryogen liquid" refers to a cryogenic fluid in liquid phase. In some instances, cryogenic liquids are liquefied gases that have a normal boiling point below −238° F. (−150° C.). For example, liquid argon has a boiling point of −302.6° F. (−185.9° C.) and liquid nitrogen has a boiling point of −321° F. (−196° C.).

As used herein, the term "cryogenic" refers to cooling media that are used at a temperature of −40° C. or colder.

As used herein, the term "thermally conductive" refers to the property of a material to transfer or pass thermal energy or heat to another material or through itself. Thus, a thermally conductive material readily transfers thermal energy, either by conduction, convection or radiation, to another material or through itself. In some instances, thermally conductive materials have a thermal conductivity of at least 1 Watt/m° C. and often greater.

As used herein, the term "thermally non-conductive" refers to the inability of a material to transfer or pass thermal energy or heat to another material or through itself. Thus, a thermally non-conductive material does not readily transfer thermal energy to another material or through itself. A thermally non-conductive material is a thermally insulating material. In some instances, thermally non-conductive materials have a thermal conductivity less than 1 Watt/m° C.

As used herein, "thermal conductivity," $\lambda_1$, is defined as the quantity of heat that will traverse a medium of unit thickness and cross-sectional area per unit time, under the influence of an applied temperature gradient. Values of $\lambda_1$ are usually in the range of $250$–$400 \times 10^{-6}$ cal/cm s K, but some liquids with a high degree of association, such as may occur with hydrogen bonding, have higher conductivities. Devices for measuring thermal conductivity are well known in the art (e.g., U.S. Pat. No. 4,283,935). Thermal conductivity is the quantity of heat transmitted, due to unit temperature gradient, in unit time under steady conditions in a direction normal to a surface of unit area.

As used herein, the term "refrigeration" refers to the removal of heat from an object or fluid (gas or liquid).

As used herein, the term "refrigerant" refers to any heat transfer medium, particularly a fluid medium, that is suitable for cooling applications. A refrigerant can be a cryogenic fluid in liquid phase, such as liquid argon or liquid nitrogen.

As used herein, the term "crude oil" or "petroleum" refers to oil recovered from below the earth's surface and that remains untreated or unrefined. Crude oil generally contains a mixture mainly of pentanes and heavier hydrocarbons that may be contaminated with sulphur compounds, is recovered or recoverable at a well from an underground reservoir, and generally is liquid at the conditions under which its volume is measured or estimated. Crude oil is referred to as "heavy" if its density is 900 kg/m$^3$ or greater, and is referred to as "light" or "conventional" if it has a density of less than 900 kg/m$^3$.

As used herein, the term "upstream" refers to a position of an object relative to fluid flow that is in the direction toward a reference point. For example, an object that is positioned in a flow circuit upstream of a heat exchange unit is on the side of the heat exchange unit that fluid enters into the heat exchange unit.

As used herein, the term "downstream" refers to a position of an object relative to fluid flow that is in the direction away from a reference point. For example, an object that is positioned in a flow circuit downstream of a heat exchange unit is on the side of the heat exchange unit that fluid exits the heat exchange unit.

As used herein, the term "thermal monitoring unit" refers to a temperature sensor.

As used herein, the term "% based on the weight of the composition" refers to mass % or (w/w) %.

As used herein, the term "specific heat" or "specific heat capacity" refers to the amount of heat required to change a unit mass of a substance by one degree in temperature. Specific heat at constant pressure is denoted $c_p$ and specific heat at constant volume is demoted $c_v$. Specific heat generally is set forth as cal·g$^{-1}$ or J·g$^{-1}$·K$^{-1}$.

As used herein, the term "heat of fusion" refers to the amount of heat required to convert a unit mass of a solid at its melting point into a liquid without an increase in temperature.

As used herein, the term "heat of sublimation" refers to the amount of energy required to convert a solid at constant pressure directly into a gas without passing through a liquid phase.

As used herein, the term "surface active agent" refers to a chemical, particularly an organic chemical, that when added to a liquid changes the properties of that liquid at a surface. The liquid can be any fluid.

As used herein, the term "surfactant" refers to surface active agent molecules that absorb at the air/water, oil/water and/or oil/water interfaces, substantially reducing their surface energy. The term "detergent" is often used interchangeably with the term "surfactant." Surfactants generally are classified depending on the charge of the surface active moiety, and can be categorized as cationic, anionic, nonionic and amphoteric surfactants.

Surfactants can be amphiphilic in that they have both hydrophilic (water loving, lipophobic, oleophobic) and hydrophobic (water hating, lipophilic, oleophilic) moieties. The hydrophobic portion of the molecule is non-polar, and can contain aliphatic or aromatic hydrocarbon residues or combinations thereof. The hydrophilic part of a surfactant can include polar groups that can interact strongly with water, hydroxyl, carboxyl and ionic groups. Because of their dual nature, surface active agents are able to form unique surfactant structures (e.g., micelles, mixed micelles, and vesicles) in solution that tends to minimize or eliminate contact between their hydrophobic moieties and the aqueous environment. In some instances, a surface active agent can provide essentially a hydrophobic core to which greases, oils, hydrocarbons can dissolve or solubilize.

As used herein, the term "silicone emulsifier" or "silicone surfactant" refers to a surface active agent that includes at least one Si atom. The term "silicone emulsifier" includes organosiloxane polymers containing a polymeric backbone that includes repeating siloxy units that can have cyclic, linear or branched repeating units, e.g., dialkylsiloxy units, such as dimethylsiloxy units. A hydrophilic portion of an organosiloxane generally can be achieved by substitution onto the polymeric backbone of a radical that confers hydrophilic properties to a portion of the molecule. The hydrophilic radical can be substituted on a terminus of the polymeric organosiloxane, or on any one or more repeating units of the polymer. In general, the repeating dialkylsiloxy, such as dimethylsiloxy, units of modified polydimethylsiloxanes are lipophilic in nature due to the methyl groups, and confer lipophilicity to the molecule. In addition, longer chain alkyl radicals, hydroxy-polypropyleneoxy radicals, or other types of lipophilic radicals can be substituted onto the siloxy backbone to confer further lipophilicity and organo-compatibility. If the lipophilic portion of the molecule is due in whole or part to a specific radical, this lipophilic radical can be substituted on a terminus of the polymer, or on any one or more repeating units of the polymer.

B. CRYOGENIC INJECTION COMPOSITIONS

Commonly owned co-pending U.S. patent application Ser. No. 13/161,411, published as U.S. Pat. Appln. Pub. No. 20110308259 (the entire disclosure of which is incorporated by reference herein) describes methods, devices and systems for extraction of thermal energy from a heat conducting metal conduit. In some embodiments described in U.S. patent application Ser. No. 13/161,411, a cryogen is injected into a fluid within a conduit to increase the rate of thermal energy dissipation from the fluid within the conduit.

Provided herein is a cryogenic injection composition that contains a fluid cryogen and particles, such as particles of a thermally conductive material, including frozen beads containing a frozen solvent and particles of a thermally conductive material, the injection composition improving the removal of thermal energy from a fluid within a conduit. The introduction of the cryogenic injection composition can increase the rate of thermal energy dissipation from the fluid within the conduit than that observed with injection of cryogen alone. The particles in the cryogenic injection composition can reduce the Leidenfrost effect associated with a liquid cryogen, such as liquid argon, liquid nitrogen and liquid helium. The Leidenfrost effect is a phenomenon observed in liquids in contact or in very close contact with a mass significantly hotter than the liquid's boiling point. When the liquid is in close proximity to a mass significantly hotter than the liquid's boiling point, the liquid boils and produces an insulating vapor layer that keeps that liquid from boiling rapidly. Including the particles in the cryogenic injection composition reduces or eliminates the Leidenfrost effect of the cryogen when the cryogenic injection composition comes into contact with the fluid within the conduit.

The particles, such as of a thermally conductive material, including frozen beads containing a frozen solvent and particles of a thermally conductive material, also can assist in the transfer of thermal energy out of the fluid within the conduit, accelerating the decrease in temperature of the fluid and its solidification and freezing and/or formation of a frozen plug. The particles, such as of a thermally conductive material, including frozen beads containing a frozen solvent and particles of a thermally conductive material, also can serve as nucleation sites upon which or due to which the reduced-temperature fluid can solidify. The increase in the number of potential nucleation sites in the fluid as the thermal energy of the fluid is decreased can accelerate the formation of multiple portions of at least partially solidified solid fluid within the conduit. The multiple portions of at least partially solidified solid fluid can colloid with a wall of the conduit, adhere (such as by freezing to a pre-cooled conduit, e.g., as described in U.S. Pat. Appl. Pub. No. 20110308259) to the wall and thereby accelerate the rate of formation of a frozen plug of fluid in the conduit. The multiple portions of at least partially solidified fluid within the conduit also can collide with each other to form larger aggregates, and in some instances the proliferation of collisions of aggregates can be sufficient to cause formation of a frozen plug in the conduit in significantly less time than when a cryogen alone is injected into the fluid in a conduit. The introduction of the cryogenic injector fluid containing particles having high heats of fusion or high heats of sublimation can result in the transfer of negative thermal energy (due to the adsorption of thermal energy by the cryogenic injector fluid, particularly enhanced by the absorption of thermal energy by the particles in the composition) into the system, creating nucleation sites for freezing or at least increasing the viscosity of the flowing fluid in the conduit such that the resulting frozen or viscous particles precipitate on the wall of the heat exchanger attached to the conduit. The combination of the heat exchanger removing thermal energy from the conduit and its contents from the outside-in, and the introduction of negative thermal energy into the fluid within the conduit by injecting the cryogenic injection composition results in a rapid removal of thermal energy from the fluid and formation and building of frozen fluid onto the walls of the conduit, resulting in the formation of a frozen plug in the conduit. The particles in the cryogenic injection composition or within the frozen beads can contain a material having high latent heat of sublimation, such as dry ice, to remove thermal energy from the fluid in the conduit. The sublimation and vaporization of the carbon dioxide particles absorbs latent heat of sublimation and vaporization from the fluid in the conduit thereby cooling the fluid.

The particles thus can promote thermal energy transfer out of a flowing fluid within a conduit, promoting nucleation sites for freezing at least a portion of the flowing fluid, the resulting frozen fluid particles, agglomerating with other frozen particles or precipitation directly to form frozen fluid on the walls of the conduit. This thermal transfer, particularly to a cooled conduit, such as can be achieved by the activation of a thermal transfer system attached to the conduit, can promote adhesion of the plug to the walls of the conduit as well as increasing the rate of deposition of frozen fluid within the conduit onto the conduit wall and subsequently onto layers of frozen fluid. The thermal transfer also can be used in reverse to help to dislodge the plug from the walls of the conduit to restore flow of fluid in the conduit by transferring thermal energy from the thermal transfer unit to the conduit and the fluid in order to partially melt and dislodge the frozen plug from the inside surface of the conduit and restore flow of fluid through the conduit.

Also provided are methods of cryogenically modulating flow in a conduit that include injecting into a fluid within the conduit a surfactant, a cryogen and frozen beads containing a frozen solvent and particles of a thermally conductive material. The introduction of these materials improves the removal of thermal energy from a fluid within a conduit and increases the rate of thermal energy dissipation from the fluid within the conduit than that observed with injection of cryogen alone.

The frozen beads containing particles of thermally conductive material can assist in the transfer of thermal energy out of the fluid within the conduit, accelerating the decrease in temperature of the fluid and its solidification and freezing. Melting of the frozen beads removes thermal energy from the fluid within the conduit. In addition, melting of the frozen solvent releases the particles frozen in the bead, such as particles of thermally conductive material, which can serve as nucleation sites upon which or due to which the reduced-temperature fluid can cause localized modulation in fluid temperature and viscosity and can result in solidification of at least a portion of the fluid and thereby trigger formation of a frozen plug. The increase in the number of potential nucleation sites in the fluid as the thermal energy of the fluid is decreased can accelerate the formation of multiple portions of at least partially solidified solid fluid within the conduit. The multiple portions of at least partially solidified solid fluid can colloid with a wall of the conduit, adhere (such as by freezing to a pre-cooled conduit, e.g., as described in U.S. Pat. Appl. Publ. No. 20110308259) to the wall and thereby accelerate the rate of formation of a frozen plug of fluid in the conduit. The multiple portions of at least partially solidified fluid within the conduit also can collide with each other to form larger aggregates, and in some instances the proliferation of collisions of aggregates can be sufficient to cause formation of a frozen plug in the conduit in significantly less time than when a cryogen alone is injected into the fluid in a conduit.

The introduction of surfactant into the fluid within the conduit tends to provide a more uniform frozen fluid. The frozen beads can include surfactant and particles having high heats of fusion or high heats of sublimation, which results in the transfer of negative thermal energy (due to the adsorption of thermal energy by the cryogenic injector fluid, particularly enhanced by the absorption of thermal energy by the particles in the composition) into the system, creating nucleation sites for freezing or at least increasing the viscosity of the flowing fluid in the conduit such that the resulting frozen or viscous particles precipitate on the wall of the heat exchanger attached to the conduit.

The combination of the heat transfer system attached to the conduit and removing thermal energy from the conduit and its contents from the outside-in, and the introduction of negative thermal energy into the fluid within the conduit by injecting the cryogen, surfactant and frozen beads containing particles of thermally conductive material results in a rapid removal of thermal energy from the fluid and formation and building of frozen fluid onto the walls of the conduit, resulting in the formation of a frozen plug in the conduit. The frozen beads can contain a material having high latent heat of sublimation, such as dry ice, to remove thermal energy from the fluid in the conduit. The sublimation and vaporization of the carbon dioxide particles absorbs latent heat of sublimation and vaporization from the fluid in the conduit thereby cooling the fluid.

The frozen beads thus can promote thermal energy transfer out of a flowing fluid within a conduit, promoting nucleation sites for freezing at least a portion of the flowing fluid, the resulting frozen fluid particles, agglomerating with other frozen particles or precipitation directly to form frozen fluid on the walls of the conduit. This thermal transfer, particularly to a cooled conduit, as can be achieved by the activation of a thermal transfer system attached to the conduit, can promote adhesion of the plug to the walls of the conduit as well as increasing the rate of deposition of frozen fluid within the conduit onto the conduit wall and subsequently onto layers of frozen fluid. The thermal transfer also can be used in reverse to help to dislodge the plug from the walls of the conduit to restore flow of fluid in the conduit by transferring thermal energy from the thermal transfer unit to the conduit and the fluid within the conduit in order to partially melt and dislodge the frozen plug from the surface of the conduit and restore flow of fluid through the conduit.

1. Particles

The particles included in the cryogenic injection composition can be of or include any material, e.g., a metal, a glass, a metal-coated glass, an oxide, a plastic, a metal-coated plastic, a ceramic, corian, diatomaceous earth, fiberglass, foam glass, gypsum, magnesite, magnesia fibers, mineral fibers, nylon, perlite, foamed plastic, expanded polystyrene, polyurethane, porcelain, PTFE, PVC, pyrex glass, vermiculite, crushed stone, and sand and combinations thereof. The particles can include a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The particles can be coated with a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof.

The particles can include an oxide. The oxides can include an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

The particles can be of a material or contain a material having high specific heat. The particles also can be selected to be of a material or contain a material having a high volumetric heat capacity. For example, the particles can be of a material or contain a material having a volumetric heat capacity greater than 1, particularly materials having a volumetric heat capacity greater than about 1.5. Examples of such materials include graphite (including porous graphite and sintered graphite), fused silica, ground granite, silver, gold, tungsten, zinc, copper, and iron. The cryogenic injection composition can include an amount of particles of a material having high specific heat in the range of 0.05% to at or about 90%, or 0.1% to 85%, or 1% to 80%, or 5% to 75%, or 10% to 70%, or 15% to 65%, or 20% to 60%, or 25% to 50%, or 5% to 25% based on the weight of the injection composition.

The particles of the cryogenic injection composition can be selected to have a density that allows the particles to be suspended or easily resuspended in the injection composition. For example, hollow particles, such as metal-coated hollow glass beads, that are buoyant in the liquid cryogen can be selected. Further, the particles can be selected so that their density can be supported by the liquid cryogen. For example, the density of liquid argon is 1430 kg/m$^3$, the density of liquid nitrogen is 808 kg/m$^3$, the density of liquid oxygen is 1155 kg/m$^3$, the density of liquid methane is 162 kg/m$^3$, and the density of liquid helium is 147 kg/m$^3$. Decreasing the size of the particle, e.g., using a microparticle or a nanoparticle, can result in particles that are suspended or easily resuspended in the injection composition.

The size of the particles, as measured by its characteristic length (e.g., diameter) is less than 100 μm, typically between 50 nm and 10 μm. The particles can be selected to be nanoparticles, such as particles having a diameter between 50 and 1000 nm, particularly particles having a D50 between 90 nm and 500 nm, or greater than 100 nm, or less than 1000 nm, or less than 900 nm, or less than 800 nm. The particles also can be selected to be microparticles, such as having a diameter of 100 μm or less, or a diameter of 1 micron or greater, as described above. For ease of reference herein in the general descriptions, both microparticles and nanoparticles will be referred to as particles unless otherwise specified.

The particles of the cryogenic injection composition can be selected to be any desired size and/or shape. For example, the particles can be cubes, flakes, granules, cylinders, rings, rods, needles, prisms, disks, fibers, pyramids, spheres, spheroids, prolate spheroids, oblate spheroids, ellipsoids, ovoids or random non-geometric shapes or any combinations of these shapes. The size and/or shape of the particles can be selected to select a surface area of the particle, e.g., to maximize surface area, or otherwise facilitate nucleation or formation of multiple instances of frozen fluid within the conduit. For example, one way to increase the specific surface area is to select particles that have a less uniform surface geometry. The more irregular or jagged the particle surface geometry, the greater will be the ratio of surface area to volume of that particle. Another way to increase the specific surface area is to decrease the particle size. For example, particles having a specific surface area in a range from at or about 0.1 m$^2$/g to at or about 500 m$^2$/g can be used. The particles also can be selected to have a specific surface area of less than 400 m$^2$/g, or less than 300 m$^2$/g, or less than 200 m$^2$/g, less than 100 m$^2$/g.

The cryogenic injection composition can include an amount of particles in the range of 0.05% to 90% based on the weight of the injection composition. The amount of particles that can be included in the injection composition can depend on the geometry of the particles and their packing in the fluid. The uniformity of the size distribution of the particles also can influence particle packing and thus the amount of particles that can be incorporated, particularly at higher concentrations (e.g., above 75% by weight of the injection composition). Single and bimodal particle size distributions are both acceptable. A combination of particles resulting in a non-uniform particle size distribution also can be used. The cryogenic injection composition can include an amount of particles where the total weight of the particle is in the range of 0.05% to at or about 90%, or 0.1% to 85%, or 1% to 80%, or 5% to 75%, or 10% to 70%, or 15% to 65%, or 20% to 60%, or 25% to 50%, or 5% to 25% based on the weight of the injection composition. The cryogenic injection composition can include an amount of particles that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5% or 50% based on the weight of the injection composition.

Methods of making nanoparticles and microparticles are well known in the art (e.g., see U.S. Pat. Nos. 7,834,468; 7,621,976; 7,521,394; 7,498,005; 7,413,725; 7,332,351; 7,259,101; 7,160,525; 6,870,047; 6,726,934; 6,623,761; 6,548,264; 5,665,277; and 5,618,475; and U.S. Pat. Appl. Pub. Nos. US2011/0218364; US2011/0091560; US2010/0267549; US2010/0139455; US2010/0087337; US2009/0158890; US2009/0029064; US2007/0080054 and US2006/0228554, the description of each of which is incorporated by reference herein in its entirety). Methods of making hollow nanoparticles and hollow microparticles are known in the art (e.g., see U.S. Pat. Nos. 8,052,958; 7,972,437; 7,883,606; 7,781,060; 7,585,349; 7,524,481; and 6,710,020; and U.S. Pat. Appl. Pub. Nos. US20110287262; US20110229576; US20110165086; US20110060062; US20110052496; US20100055170; US20090282948; US20090203196; US20080286374; US20080145641 and US20060269463).

The cryogenic injection compositions provided herein include a cryogen and particles, such as microparticles or nanoparticles, that facilitate thermal energy transfer out of a fluid within a conduit. The particles to be included in the cryogenic injection composition can be selected based on their specific heat capacity. For example, the particles can be selected to have a specific heat capacity $c_p$ that is greater than 0.1 $J \cdot g^{-1} K^{-1}$, or greater than 0.5 $J \cdot g^{-1} K^{-1}$, or greater than 1 $J \cdot g^{-1} K^{-1}$, or greater than 2 $J \cdot g^{-1} K^{-1}$. The particles can be selected to have a specific heat capacity between about 0.25 $J \cdot g^{-1} K^{-1}$ and 2.5 $J \cdot g^{-1} K^{-1}$, or between about 0.2 $J \cdot g^{-1} K^{-1}$ and 2 $J \cdot g^{-1} K^{-1}$, or between about 0.1 $J \cdot g^{-1} K^{-1}$ and 1 $J \cdot g^{-1} K^{-1}$. In particular, the particles can be selected to have a specific heat capacity greater than about 0.7 $J \cdot g^{-1} K^{-1}$.

For example, the particles can be microparticles or nanoparticles containing or coated with paraffin wax ($c_p$ of 2.5 $J \cdot g^{-1} K^{-1}$), or frozen water ($c_p$ of 2.11 $J \cdot g^{-1} K^{-1}$), or lithium ($c_p$ of 3.58 $J \cdot g^{-1} K^{-1}$), or solid polyethylene ($c_p$ of 2.3 $J \cdot g^{-1} K^{-1}$), or beryllium ($c_p$ of 1.82 $J \cdot g^{-1} K^{-1}$), or aluminum ($c_p$ of 0.897 $J \cdot g^{-1} K^{-1}$), or glass ($c_p$ of 0.84 $J \cdot g^{-1} K^{-1}$), or crushed granite ($c_p$ of 0.79 $J \cdot g^{-1} K^{-1}$), or graphite ($c_p$ of 0.71 $J \cdot g^{-1} K^{-1}$), or silica ($c_p$ of 0.70 $J \cdot g^{-1} K^{-1}$), or titanium ($c_p$ of 0.52 $J \cdot g^{-1} K^{-1}$), or iron ($c_p$ of 0.45 $J \cdot g^{-1} K^{-1}$), or chromium ($c_p$ of 0.45 $J \cdot g^{-1} K^{-1}$), or zinc ($c_p$ of 0.387 $J \cdot g^{-1} K^{-1}$), or copper ($c_p$ of 0.385 $J \cdot g^{-1} K^{-1}$), or silver ($c_p$ of 0.233 $J \cdot g^{-1} K^{-1}$), or cadmium ($c_p$ of 0.231 $J \cdot g^{-1} K^{-1}$), or tin ($c_p$ of 0.227 $J \cdot g^{-1} K^{-1}$), or tungsten ($c_p$ of 0.134 $J \cdot g^{-1} K^{-1}$), or gold ($c_p$ of 0.129 $J \cdot g^{-1} K^{-1}$), or bismuth ($c_p$ of 0.123 $J \cdot g^{-1} K^{-1}$) or combinations thereof. The particles can be carbon nanotubes or carbon fullerenes. The particles can be or contain solid carbon dioxide, which has a heat of sublimation of 25.2 kJ/mol or 570 $J \cdot g^{-1}$.

The cryogenic injection composition containing particles, such as microparticles or submicron particles, including nanoparticles, of or containing a high specific heat capacity material, can be made in situ using any method known in the art for adding particles to a fluid stream. An exemplary method is the use of a venturi pump, such as a fluid jet eductor. In such systems, flowing fluids are passed through piping configurations that cause a pressure differential sufficient to draw in particles, such as the microparticles or nanoparticles, to be mixed with the flowing fluid, such as a cryogen of the cryogenic injection composition provided herein. Jet eductor systems are well known in the art (e.g., see U.S. Pat. Nos. 4,165,571; 5,522,419; 5,743,637; 5,993,167; and 6,450,775) and can be modified to be used with the cryogen fluids of the cryogenic injection compositions described herein.

An exemplary eductor can be configured to include a nozzle, which can direct a fluid, such as cryogen, to form a jet; a venturi structure, and an air gap between the nozzle and the air gap. In use the fluid jet passes across the air gap and enters the venturi structure. The venturi structure includes an inlet, a side passage for delivering the particles into the fluid jet and a chamber where the particles are entrained and mixed with the fluid by the flow of the fluid.

The particulate material to be mixed with the cryogen fluid to form the cryogenic injection compositions provided herein can be supplied to the venturi structure via a tube, pipe or chute having a discharge end located near the inlet of the venturi structure, where a vacuum (negative pressure) created by the high velocity fluid flow therein acts to draw the particulate matter from the tube, pipe or chute into the venturi structure. One method of controlling the amount of particles added to the cryogen fluid is to include a metering device, such as auger barrel, to regulate the amount of particles flowing through the auger and into the venturi mixing chamber by means of a variable speed motor driving the auger. Any metering device or flow regulation devices known in the art can be used to meter the amount of particles that are added to the flowing fluid and thereby to regulate the amount of particles added to the cryogen fluid flowing through the eductor to form the cryogenic injection compositions.

In some instances, the particles to be included in the cryogenic injection compositions contain or are frozen water. Methods of forming microparticles are well known in the art (e.g., see U.S. Pat. No. 6,143,211; U.S. Pat. Appl. Pub. No. US20090104269 and International Patent Application Pub. WO1999047588). Such methods can be adapted to make frozen microparticles of or containing water. In an exemplary method, an aqueous solution optionally containing a nonionic, ionic or zwitterionic surface active agent or combination thereof can be dispersed with mixing into a nonaqueous organic liquid, or sprayed as micro-droplets into or unto the surface of a nonaqueous organic liquid that is at a temperature of 0° C., where the nonaqueous organic liquid has a freezing point well below 0° C. and preferably is immiscible with water. The mixing speed or droplet formation conditions are modulated to produce frozen microparticles of ice having a particle size of less than 1 mm, or less than 0.5 mm or less than 0.1 mm. Examples of nonaqueous organic liquids that can be used for formation of the microparticles of water are benzene, ethyl acetate, propyl acetate, butyl acetate, cyclohexanol, ether, methylethyl ketone, petroleum ether, n-hexane, heptane, cyclohexane, naphtha, isopropyl biphenyl, terpene, toluene, xylene, hexamethyl disiloxane, octamethyl cyclotetrasiloxane, diphenyl tetramethyl disiloxane and trimethylsiloxy end-blocked polydimethylsiloxane fluids.

The water microparticles can be separated from the solvent and added to the cryogen fluid to form the cryogenic injection composition, or the solvent containing the water microparticles can be used to deliver the water microparticles to the eductor for mixing with the fluid cryogen to produce the cryogenic injection composition. The amount of ice microparticles that is added to the fluid cryogen to form the cryogenic injection composition can be modulated directly when the water microparticles are separated from the solvent, or the amount can be modulated by controlling the concentration of the microparticles dispersed in the nonaqueous solvent and/or by metering the amount of solvent containing the ice microparticles into the eductor.

Methods of forming particles of frozen water are well known in the art (e.g., see U.S. Pat. Nos. 7,562,831; 7,062, 926; and 6,129,290). The size of the frozen water particles can vary from between 1-30 microns to 0.01 to 0.1 microns (e.g., see U.S. Pat. No. 6,129,290). Generally, frozen microparticles of water can be produced by discharging water droplets into a body of air within a controlled environment chamber, which body of air is maintained at a temperature and humidity at least during particle formation such as to freeze the water droplets discharged into the air, the surface of the controlled environment chamber including coolant pipes or other means of maintaining the temperature of the environment chamber below the melting point of the frozen particles, generally with the surface temperature of the controlled environment chamber being at a lower temperature than the air temperature within the controlled environment chamber.

The air temperature within the controlled environment chamber can be varied to produce different sizes of particles or particles of different densities. For example, a typical combination of temperature and humidity can be a temperature of the air of −15° C. with a relative humidity of between 90% and 95% or an air temperature of around −5° C. with a relative humidity below 100% but somewhat in excess of 95%. The water particles or droplets discharged into the closed environment chamber can be produced by any droplet forming apparatus known in the art, such as a "snow gun" that usually is configured to discharge a mixture of cold air and water particles into a cooled body of air to form snow or frozen water particles. Such "snow guns" are commercially available and are well-known in the art (e.g., see U.S. Pat. Nos. 7,562,831; 7,062,926; and 6,129,290).

In some embodiments, the controlled environment chamber is cooled via discharge of a cryogen within the chamber. The discharge of the cryogen can be via a constant flow of liquid cryogen into the chamber. The vented gas of the cryogen from the chamber can contain and convey the microparticles of frozen water, and the vented gas can be directed into the inlet of the venturi structure of an eductor, thereby providing a method of in situ formation of microparticles of water and their delivery into a stream of cryogen liquid to form the cryogenic injection compositions provided herein. The amount of frozen water microparticles added to the liquid cryogen to form the cryogenic injection composition can be modulated by the rate of formation of the frozen water microparticles in the controlled environment chamber or the rate of discharge of the frozen water microparticles from the controlled environment chamber into the eductor or via a metering device or any combination thereof.

Such methods can be modified to produce a partial or complete frozen water layer on the surface of a nanoparticle or microparticle. For example, the air temperature within the controlled environment chamber can be reduced to a temperature of about −5° C. or −10° C. or −15° C. with a relative humidity of between 95% and 100%. The particles to receive a partial or complete coating of ice are cooled to a temperature of less than −20° C. and fluidized by agitation with a dry gas source, such as dry compressed air, or nitrogen or argon gas, so that the cold particles are delivered to the controlled environment as suspended particles in the gas. As the particles enter the high humidity of the controlled environment chamber, water vapor condenses on the surface of the cold particles, forming at least a partial coating of frozen water on the surface of the particles. The flow of the gas containing the particles to be coated can be modulated to increase or decrease the amount of particles entering the controlled environment chamber, thereby varying the amount of water that can condense on the particles. The relative humidity of the controlled environment chamber and the temperature of the air within the controlled environment chamber or both can be modulated to modify the amount of water that can condense on the particles.

The particles that can be processed to include a complete or partial frozen water coating can contain or be of a material selected from among a metal, a glass, a metal-coated glass, an oxide, a plastic, a metal-coated plastic, a ceramic, corian, diatomaceous earth, fiberglass, foam glass, gypsum, magnesite, magnesia fibers, mineral fibers, nylon, perlite, foamed plastic, expanded polystyrene, polyurethane, porcelain, PTFE, PVC, pyrex glass, silica, fused silica, amorphous silica, vermiculite, crushed stone, and sand and combinations thereof. The frozen-water coated particles can contain or be of a thermally conductive material, such as copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The frozen-water coated particles can be of or contain an oxide, such as an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

Surfactants can be included in the water to be frozen to form frozen water microparticles or to form a frozen water partial or complete coating on a nanoparticle or microparticle of another material. Surfactants can act to reduce the surface tension of the water, thereby facilitating formation of fine water droplets. Any surfactant known in the art can be used, including cationic, anionic, non-ionic and zwitterionic surfactants, including silicone surfactants. Exemplary surfactants are discussed in the art (e.g., see U.S. Pat. Nos. 3,760,598; 4,634,050; 6,464,148; and 7,562,831). Nuclei, such as inorganic and organic dust particles, including clay minerals, also can be added the water to enable the water to freeze at higher temperatures, e.g., at −10° C. or −5° C. or even higher.

In some instances, the particles to be included in the cryogenic injection compositions can include frozen beads that can contain particles of a thermally conductive material alone or in combination with a solvent. The thermally conductive material can include, e.g., copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The particles can include an oxide. The oxides can include an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

The particles of a thermally conductive material within or on the surface of the frozen beads can include a material selected from among carbon fibers, carbon nanostructures, polyacetylene fibers, aluminum silicon carbide, aluminum graphite, aluminum nitride, silicon nitride ceramic and combinations thereof. Exemplary carbon nanostructures include carbon nanotubes, carbon buckyballs, carbon nanoribbons and carbon nanowires and combinations thereof.

The frozen beads can include a material having high specific heat. The beads can include particles selected to be of a material or contain a material having a high volumetric heat capacity. For example, the beads can contain particles of a material having a volumetric heat capacity greater than 1, particularly materials having a volumetric heat capacity greater than about 1.5. Examples of such materials include graphite, fused silica, ground granite, silver, gold, tungsten, zinc, copper, and iron. The frozen beads can include particles selected to have a specific heat capacity $c_p$ that is, e.g., greater than 0.1 $J \cdot g^{-1} K^{-1}$, or greater than 0.5 $J \cdot g^{-1} K^{-1}$, or greater than 1 $J \cdot g^{-1} K^{-1}$, or greater than 2 $J \cdot g^{-1} K^{-1}$. The frozen beads can include particles can be selected to have a specific heat capacity between about 0.25 $J \cdot g^{-1} K^{-1}$ and 2.5 $J \cdot g^{-1} K^{-1}$, or between about 0.2 $J \cdot g^{-1} K^{-1}$ and 2 $J \cdot g^{-1} K^{-1}$, or between about 0.1 $J \cdot g^{-1} K^{-1}$ and 1 $J \cdot g^{-1} K^{-1}$. In particular, the frozen beads can include particles can be selected to have a specific heat capacity greater than about 0.7 $J \cdot g^{-1} K^{-1}$.

For example, the frozen beads can include particles of or coated with paraffin wax ($c_p$ of 2.5 $J \cdot g^{-1} K^{-1}$), or frozen water ($c_p$ of 2.11 $J \cdot g^{-1} K^{-1}$), or lithium ($c_p$ of 3.58 $J \cdot g^{-1} K^{-1}$), or solid polyethylene ($c_p$ of 2.3 $J \cdot g^{-1} K^{-1}$), or beryllium ($c_p$ of 1.82 $J \cdot g^{-1} K^{-1}$), or aluminum ($c_p$ of 0.897 $J \cdot g^{-1} K^{-1}$), or glass ($c_p$ of 0.84 $J \cdot g^{-1} K^{-1}$), or crushed granite ($c_p$ of 0.79 $J \cdot g^{-1} K^{-1}$), or graphite ($c_p$ of 0.71 $J \cdot g^{-1} K^{-1}$), or silica ($c_p$ of 0.70 $J \cdot g^{-1} K^{-1}$), or titanium ($c_p$ of 0.52 $J \cdot g^{-1} K^{-1}$), or iron ($c_p$ of 0.45 $J \cdot g^{-1} K^{-1}$), or chromium ($c_p$ of 0.45 $J \cdot g^{-1} K^{-1}$), or zinc ($c_p$ of 0.387 $J \cdot g^{-1} K^{-1}$), or copper ($c_p$ of 0.385 $J \cdot g^{-1} K^{-1}$), or silver ($c_p$ of 0.233 $J \cdot g^{-1} K^{-1}$), or cadmium ($c_p$ of 0.231 $J \cdot g^{-1} K^{-1}$), or tin ($c_p$ of 0.227 $J \cdot g^{-1} K^{-1}$), or tungsten ($c_p$ of 0.134 $J \cdot g^{-1} K^{-1}$), or gold ($c_p$ of 0.129 $J \cdot g^{-1} K^{-1}$), or bismuth ($c_p$ of 0.123 $J \cdot g^{-1} K^{-1}$) or combinations thereof. The frozen beads can include particles of carbon nanotubes or carbon fullerenes. The frozen beads can include particles of solid carbon dioxide, which has a heat of sublimation of 25.2 kJ/mol or 570 $J \cdot g^{-1}$. The frozen beads can be hollow or can include entrapped gases in order to allow the frozen beads to be suspended or easily resuspended in the injection composition. Decreasing the size of the frozen beads can result in particles that are suspended or easily resuspended and thus can facilitate injection into the fluid within the conduit.

A typical size of the particles of thermally conductive material contained in the frozen beads, as measured by its characteristic length (e.g., diameter) is between 50 nm and 10 µm. The particles of thermally conductive material contained in the frozen beads can be selected to be nanoparticles, such as particles having a diameter between 50 and 1000 nm, particularly particles having a $D_{50}$ between 90 nm and 500 nm, or greater than 100 nm, or less than 1000 nm, or less than 900 nm, or less than 800 nm. The particles of thermally conductive material contained in the frozen beads also can be selected to be microparticles, such as having a diameter of 1 micron or greater.

The particles of thermally conductive material contained in the frozen beads can be selected to be any desired size and/or shape. For example, the particles can be cubes, flakes, granules, cylinders, rings, rods, needles, prisms, disks, fibers, pyramids, spheres, spheroids, prolate spheroids, oblate spheroids, ellipsoids, ovoids or random non-geometric shapes or any combinations of these shapes.

The size and/or shape of the particles of thermally conductive material contained in the frozen beads can be selected to select a surface area of the particle, e.g., to maximize surface area, or otherwise facilitates nucleation or formations of multiple instances of frozen fluid within the conduit. For example, one way to increase the specific surface area is to select particles that have a less uniform surface geometry. The more irregular or jagged the particle surface geometry, the greater will be the ratio of surface area to volume of that particle. Another way to increase the specific surface area is to decrease the particle size. For example, particles having a specific surface area in a range from at or about 0.1 $m^2/g$ to at or about 500 $m^2/g$ can be used. The particles of thermally conductive material contained in the frozen beads also can be selected to have a specific surface area of less than 400 $m^2/g$, or less than 300 $m^2/g$, or less than 200 $m^2/g$, less than 100 $m^2/g$.

The frozen beads can include a solvent. The solvent can include any known solvent. Exemplary solvents include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol; propylene glycol, pyridine, toluene, thiophene, trichloroethylene, water, m-xylene, p-xylene and combinations thereof.

The amount of solvent in the frozen beads can be in the range of 0.05% to 85%, or 0.5% to 75%, or 1% to 50%, or 5% to 50%, or 5% to 25% based on the weight of the frozen bead. The frozen beads can include an amount of solvent that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5% or 75% based on the weight of the frozen beads.

The amount of frozen beads injected into the fluid within the conduit can be in the range of 0.05% to 95%, or 0.1% to 85%, or 0.5% to 75%, or 1% to 50%, or 5% to 50%, or 5% to 25%, based on the weight of the fluid. The amount of frozen beads injected into the fluid within the conduit can be 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5% or 50% based on the weight of the cryogen injected into the fluid.

Because flow rates through conduits can vary, it often is convenient to express the amount of fluid in barrels (or bbl, where bbl=42 US gallons or about 159 L). The amount of frozen beads added to the fluid within the conduit can be in the range of 0.01 to 150 pounds/bbl or in the range of 0.1 to 125 pounds/bbl or in the range of 0.5 to 100 pounds/bbl or in the range of 1 to 75 pounds/bbl. or in the range of 1.5 to 50 pounds/bbl.

In some instances, the frozen beads can contain frozen water. In an exemplary method, an aqueous solution optionally containing a nonionic, ionic or zwitterionic surface active agent or combination thereof can be dispersed with and sprayed as micro-droplets unto the surface of frozen beads that are at a temperature of 0° C. or less. For example, the air temperature within a controlled environment chamber can be reduced to a temperature of about −5° C. or −10° C. or −15° C. with a relative humidity of between 95% and 100%. The frozen beads to receive a partial or complete coating of ice are cooled to a temperature of less than −20° C. and fluidized by agitation with a dry gas source, such as dry compressed air, or nitrogen or argon gas, so that the frozen beads are delivered to the controlled environment as suspended particles in the gas. As the frozen beads enter the high humidity of the controlled environment chamber, water vapor condenses on the surface of the frozen beads, forming at least a partial coating of frozen water on the surface of the frozen beads. The flow of the gas containing the frozen beads to be coated can be modulated to increase or decrease the amount of frozen beads entering the controlled environment chamber, thereby varying the amount of water that can condense on the frozen beads. The relative humidity of the controlled environment chamber and the temperature of the air within the controlled environment chamber or both can be modulated to modify the amount of water that can condense on the frozen beads.

Surfactants can be included in the frozen beads or in the water to be frozen to form a frozen water partial or complete coating on the frozen beads containing particles of a thermally conductive material. Surfactants can act to reduce the surface tension of the water, thereby facilitating formation of fine water droplets. Any surfactant known in the art can be included in the frozen beads or the water to coat the frozen beads, including cationic, anionic, non-ionic and zwitterionic surfactants, including silicone surfactants. Exemplary surfactants are discussed in the art (e.g., see U.S. Pat. Nos. 3,760,598; 4,634,050; 6,464,148; and 7,562,831) and discussed below. Nuclei, such as inorganic and organic dust particles, including clay minerals and diatomaceous earth, also can be added to the water to enable the water to freeze at higher temperatures, e.g., at −10° C. or −5° C. or even higher.

When the cryogenic injection compositions are to be used in environments of high pressure, such as underwater, particularly in deep-sea applications, latent heat can be drawn from the fluid inside the conduit by a liquid cryogen, but the liquid cryogen cannot be converted into a gas, and thus thermal transfer from the fluid in the conduit to the liquid cryogen is not as high as can be achieved under lower pressure conditions. In order to address this potential decrease or loss of heat transfer ability of the injection composition, the frozen beads can include particles having a high latent heat of fusion, or a high heat of sublimation, such as solid particles of carbon dioxide. The particles can be of any size or geometry, and preferably the particles are micron or submicron in size. Inclusion of the particles having a high latent heat of fusion or heat of sublimation in the frozen beads injected into the fluid within the conduit results in a higher thermal transfer capacity per mass of fluid than can be achieved under the same high pressure conditions without the particles of a high latent heat of fusion material or heat of sublimation material. When frozen beads containing the particles of a high latent heat of fusion material is introduced into the fluid within the conduit, the frozen beads absorb thermal energy, particularly heat of fusion, and release the particles of a high latent heat of fusion material, which absorb additional thermal energy, absorbing sufficient thermal energy from the fluid to transition the fluid in the conduit from a liquid state to a solid state.

Frozen beads can be prepared by any method known in the art. For example, spheres or beads can be prepared by creating a slurry of the thermally conducting particles, such as carbon nanostructures or polyacetylene fibers (see U.S. Pat. Nos. 4,020,265; 3,928,516; 3,933,722; 3,816,374; 3,852,235; and 3,709,863) in a solvent, such as water, ethanol and isopropanol or constant boiling propanol (containing water not removed by distillation) and other optional ingredients, such as surfactants, and then dropping measured quantities of the slurry into a cryogenic liquid such as liquid nitrogen or argon, and collecting the frozen beads that form. Other methods are known in the art (see, e.g., U.S. Pat. Nos. 6,354,091; 6,348,431; 5,550,044; 4,975,415; and 3,516,935).

2. Cryogen in the Cryogenic Injection Compositions

The cryogen in the cryogenic injection composition can be any substance or composition that can result in the production of very low temperatures. The cryogen can be a liquid that boils at a temperature colder than −25° C., or colder than −40° C., or colder than −100° C., or colder than −110° C., or colder than −120° C., or colder than −130° C., or colder than −140° C., or colder than −150° C., or colder than −160° C. For example, liquid argon has a boiling point of about −186° C. The cryogen can be liquid nitrogen, liquid oxygen, liquid helium, liquid neon, liquid methane, liquid natural gas, liquid argon, liquid nitrous oxide, liquid carbon dioxide, liquid Freon® or combinations thereof. In particular, the cryogen is liquid argon or liquid nitrogen or a combination thereof.

The cryogenic injection composition can include an amount of cryogen in the range of 1% to 99%, or 2% to 95%, or 3% to 90%, of 4% to 85%, or 5% to 75%, or 10% to 70%, or 15% to 65%, or 20% to 60%, or 25% to 50%, or 5% to 25% based on the weight of the injection composition. The cryogenic injection composition can include an amount of cryogen that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5%, 75%, 75.5%, 76%, 76.5%, 77%, 77.5%, 78%, 78.5%, 79%, 79.5%, 80%, 80.5%, 81%, 81.5%, 82%, 82.5%, 83%, 83.5%, 84%, 84.5%, 85%, 85.5%, 86%, 86.5%, 87%, 87.5%, 88%, 88.5%, 89%, 89.5%, 90%, 90.5%, 91%, 91.5%, 92%, 92.5%, 93%, 93.5%, 94%, 94.5%, 95%, 95.5%, 96%, 96.5%, 97%, 97.5%, 98%, 98.5%, 99% or 99.5% based on the weight of the injection composition.

The amount of cryogen injector composition added to the fluid within the conduit can be in the range of 0.01 to 150 pounds/bbl or in the range of 0.05 to 100 pounds/bbl or in the range of 0.1 to 125 pounds/bbl or in the range of 0.5 to 100 pounds/bbl. or in the range of 1 to 75 pounds/bbl.

3. Optional Components in the Cryogenic Injection Compositions

The cryogenic injection composition also can contain a solvent that is compatible with the particles contained in the injection composition. Examples of solvents that can be included in the injection composition include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, m-xylene, p-xylene and combinations thereof. The solvent can include water. The amount of solvent in the cryogenic injection composition can be in the range of 0.05% to 85%, or 0.5% to 75%, or 1% to 50%, or 5% to 50%, or 5% to 25% based on the weight of the injection composition. The cryogenic injection composition can include an amount of solvent that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5%, 25%, 25.5%, 26%, 26.5%, 27%, 27.5%, 28%, 28.5%, 29%, 29.5%, 30%, 30.5%, 31%, 31.5%, 32%, 32.5%, 33%, 33.5%, 34%, 34.5%, 35%, 35.5%, 36%, 36.5%, 37%, 37.5%, 38%, 38.5%, 39%, 39.5%, 40%, 40.5%, 41%, 41.5%, 42%, 42.5%, 43%, 43.5%, 44%, 44.5%, 45%, 45.5%, 46%, 46.5%, 47%, 47.5%, 48%, 48.5%, 49%, 49.5%, 50%, 50.5%, 51%, 51.5%, 52%, 52.5%, 53%, 53.5%, 54%, 54.5%, 55%, 55.5%, 56%, 56.5%, 57%, 57.5%, 58%, 58.5%, 59%, 59.5%, 60%, 60.5%, 61%, 61.5%, 62%, 62.5%, 63%, 63.5%, 64%, 64.5%, 65%, 65.5%, 66%, 66.5%, 67%, 67.5%, 68%, 68.5%, 69%, 69.5%, 70%, 70.5%, 71%, 71.5%, 72%, 72.5%, 73%, 73.5%, 74%, 74.5% or 75% based on the weight of the injection composition.

The cryogenic injection composition also can contain one or more surfactants. Any amphoteric, anionic, cationic, zwitterionic, non-ionic surfactant or silicone surfactant can be included in the cryogenic injection composition. Exemplary amphoteric surfactants include betaines, sulphobetaines, imidazoline betaines and alkyl amido propyl betaines. Exemplary nonionic surfactants include ethoxylated nonionic surfactants selected from among condensation products of ethylene oxide with aliphatic alcohols having from 8 to 22 carbon atoms in either straight or branched chain configuration as well as condensation products of ethylene oxide with nonyl phenol, phenol, butyl phenol, di-nonyl phenol, octyl phenol or other phenols, sorbitan esters and amine oxides, ethoxylated $C_{10}$-$C_{20}$ alcohols, fatty acids, fatty amines or glyceryl esters, alkyl polyglycosides, methyl glucoside esters, as well as blends of such nonionic surfactants. Other exemplary non-ionic surfactants include Tergitol NP-9® (Dow Chemical Co., Midland, Mich.), a nonionic, nonylphenol ethoxylate surfactant, Tergitol NP-33 [9016-45-9] Synonyms: alpha(nonylphenyl)-omega-hydroxypoly(oxy-1,2-ethanediyl); antarox; Nonylphenoxypoly(ethyleneoxy)ethanol; nonylphenyl polyethyleneglycol ether, nonionic; nonylphenyl polyethylene glycol ether; PEG-9 nonyl phenyl ether; POE (10) nonylphenol; POE (14) nonylphenol; POE (15) nonyl phenol; POE(15) Nonyl Phenyl Ether; POE(18) Nonyl Phenyl Ether; POE (20) nonylphenol; POE(20) Nonyl Phenyl Ether; POE (30) nonylphenol; POE (4) nonylphenol; POE (5) nonylphenol; POE (6) nonylphenol; POE (8) nonylphenol; polyethylene glycol 450 nonyl phenyl ether; polyethylene glycol 450 nonyl phenyl ether, nonionic surfactant; polyethylene glycols mono(nonylphenyl)ether; polyethylene mono (nonylphenyl)ether glycols; polyoxy-ethylene (10) nonylphenol; polyoxyethylene (14) nonylphenol; polyoxyethylene (1.5) nonyl phenol; polyoxyethylene (20) nonylphenol; polyoxyethylene (30) nonylphenol; polyoxyethylene (4) nonylphenol; polyoxyethylene (5) nonylphenol; polyoxyethylene (6) nonylphenol; polyoxyethylene (8) nonylphenol; Polyoxyethylene (9) Nonylphenyl Ether; polyoxyethylene(n)-nonylphenyl ether; Polyoxyethylene nonylphenol; POE nonylphenol; Protachem 630; Sterox; Surfionic N; T-DET-N; Tergitol NP; Tergitol NP-14; Tergitol NP-27; Tergitol NP-33; Tergitol NP-35; Tergitol NP-40; Tergitol NPX; Tergitol TP-9; Tergitol TP-9 (non-ionic); Triton N; Triton X; Dowfax 9N; ethoxylated nonylphenol; glycols, polyethylene, mono(nonyl-phenyl)ether; Igepal CO; Igepal CO-630; macrogol nonylphenyl ether; Makon; Neutronyx 600; Nonipol NO; nonoxinol; nonoxynol; Nonoxynol-15; Nonoxynol-18; Nonoxynol-20; nonyl phenol ethoxylate; nonylphenol polyethylene glycol ether; nonylphenol, polyoxyethylene ether; nonyl-phenoxypoly-ethoxyethanol; non-ionic surfactants having a polyalkylene oxide polymer as a portion of the surfactant molecule, such as chlorine-, benzyl-, methyl-, ethyl-, propyl-, butyl- and other similar alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ethers; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers including an ethylene oxide/propylene oxide block copolymer such as those commercially available under the trademark PLURONIC® (BASF-Wyandotte).

Exemplary anionic surfactants include alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulfo-succinates, alkyl ether sulfates, linear and branched ether sulfates and mixtures thereof.

Exemplary cationic surfactants include arginine methyl esters, alkanolamines and alkylenediamides, and mixtures thereof. Other exemplary cationic surface active agents include but are not limited to homopolymers and copolymers derived from free radically polymerizable acrylic or methacrylic ester or amide monomers. The copolymers can contain one or more units derived from acrylamides, methacrylamides, diacetone acryl-amides, acrylic or methacrylic acids or their esters, vinyl lactams such as vinyl pyrrolidone or vinyl caprolactam, and vinyl esters. Exemplary polymers include copolymers of acrylamide and dimethyl amino ethyl methacrylate quaternized with dimethyl sulfate or with an alkyl halide; copolymers of acrylamide and methacryloyl oxyethyl trimethyl ammonium chloride; the copolymer of acrylamide and methacryloyl oxyethyl trimethyl ammonium methosulfate; copolymers of vinyl pyrrolidone/dialkyl-aminoalkyl acrylate or methacrylate, optionally quaternized, such as the products sold under the name GAFQUAT™ by International Specialty Products; the dimethyl amino ethyl methacrylate/vinyl caprolactam/vinyl pyrrolidone terpolymers, such as the product sold under the name GAFFIX™ VC 713 by International Specialty Products; the vinyl pyrrolidone/methacryl-amidopropyl dimethylamine copolymer, marketed under the name STYLEZE™ CC 10 by International Specialty Products; and the vinyl pyrrolidone and quaternized dimethyl amino propyl methacrylamide copolymers such as the product sold under the name GAFQUAT™ HS100 by International Specialty Products; quaternary polymers of vinyl pyrrolidone and vinyl imidazole such as the products sold under the trade name Luviquat® (product designation FC 905, FC 550, and FC 370) by BASF; acetamidopropyl trimonium chloride, behenamidopropyl dimethylamine, behenamido-propyl ethyldimonium ethosulfate, behentrimonium chloride, cetethyl morpholinium ethosulfate, cetrimonium chloride, cocoamidopropyl ethyl-dimonium ethosulfate, dicetyl-dimonium chloride, dimethicone hydroxypropyl trimonium chloride, hydroxyethyl behenamidopropyl diammonium chloride, quaternium-26, quaternium-27, quaternium-53, quaternium-63, quaternium-70, quaternium-72, quaternium-76 hydrolyzed collagen, PPG-9 diethylammonium chloride, PPG-25 diethylammonium chloride, PPG-40 diethylmonium chloride, stearalkonium chloride, stearamidopropyl ethyl dimonium ethosulfate, steardimonium hydroxypropyl hydrolyzed wheat protein, steardimonium hydroxypropyl hydrolyzed collagen, wheat germamido-propalkonium chloride, wheat germamidopropyl ethyldimonium ethosulfate, polymers and copolymers of dimethyl diallyl ammonium chloride, such as Polyquaternium-4, Polyquaternium-6, Polyquaternium-7, Polyquaternium-10, Polyquaternium-11, Polyquarternium-16, Polyquaternium-22, Polyquaternium-24, Polyquaternium-28, Polyquaternium-29, Polyquaternium-32, Polyquaternium-33, Polyquaternium-35, Polyquaternium-37, Polyquaternium-39, Polyquaternium-44, Polyquaternium-46, Polyquaternium-47, Polyquaternium-52, Polyquaternium-53, Polyquarternium-55, Polyquaternium-59, Polyquaternium-61, Polyquaternium-64, Polyquaternium-65, Polyquaternium-67, Polyquaternium-69, Polyquaternium-70, Polyquaternium-71, Polyquaternium-72, Polyquaternium-73, Polyquaternium-74, Polyquaternium-76, Polyquaternium-77, Polyquaternium-78, Polyquaternium-79, Polyquaternium-80, Polyquaternium-81, Polyquaternium-82, Polyquaternium-84, Polyquaternium-85, Polyquaternium-87, PEG-2-cocomonium chloride, and mixtures thereof; polyalkylene-imines such as polyethyleneimines, polymers containing vinyl pyridine or vinyl pyridinium units, condensates of polyamines and epichlorhydrins; quaternary polyurethanes; salts of a primary, secondary, or tertiary fatty amine, optionally polyoxyalkylenated; a quaternary ammonium salt derivative of imidazoline, or an amine oxide; mono-, di-, or tri-alkyl quaternary ammonium compounds with a counterion such as a chloride, methosulfate, tosylate, including, but not limited to, cetrimonium chloride, dicetyidimonium chloride and behentrimonium methosulfate.

Silicone surfactants also can be used. For example, in some embodiments, the silicone surfactant includes a surface active polydiorganosiloxane, such as described in U.S. Pat. No. 4,421,656. In some embodiments, the silicone surfactant can be selected from among dimethicone copolyols and alkyl dimethicone copolyols and blends thereof. Examples of such silicone surfactants include the blends of dimethicone copolyol and cyclomethicone, such as sold by Dow Corning (Midland, Mich.) under the name DC3225C or DC2-5225C, a polyalkyl polyether polysiloxane copolymer having an alkyl radical containing from 5 to 22 carbon atoms, such as cetyl dimethicone copolyol, such as that sold under the name Abil® EM-90 by EVONIK Goldschmidt GmbH (Essen, Germany), the mixture of dimethicone copolyol and cyclopentasiloxane (85/15), such as that sold under the name Abil® EM-97 by Goldschmidt, linear-type polyether-modified silicone emulsifiers, including methyl ether dimethicones, such as PEG-3 methyl ether dimethicones, PEG-9 methyl ether dimethicones, PEG-10 methyl ether dimethicones, PEG-11 methyl ether dimethicones, and butyl ether dimethicones (available from Shin-Etsu (Akron, Ohio); branched-type polyether-modified silicone emulsifiers, such as PEG-9 polydimethylsiloxyethyl dimethicone (Shin-Etsu), alkyl co-modified branched-type polyether silicones, such as lauryl PEG-9 polydimethylsiloxyethyl dimethicone (Shin-Etsu), silicones containing polyalkylene oxide groups, such as the commercially available emulsifier Silwet® 7001, manufactured by Momentive Performance Materials (Albany, N.Y.), Dow Corning FG-10, Silwet® L-77 (polyalkylene oxide modified heptamethyl trisiloxane containing a methyl end group and 1 pendant group and having an average molecular weight of 645) and Silwet® L-7608 (polyalkylene oxide modified heptamethyl trisiloxane containing a hydrogen end group and one pendant group and having an average molecular weight of 630) available from Momentive Performance Materials; Lambent™ MFF-199-SW (containing a hydrogen end group and one pendant polyethylene oxide group and having an average molecular weight between 600 to 1000) available from Lambent Technologies Inc. (Gurnee, Ill.); silicone copolyol based carboxylate esters, such as SW-CP-K (containing a phthalate end group and one polyethylene oxide pendant group and having an average molecular weight between 800 and 1100) and Lube CPI (containing a phthalic acid end group and 3 to 5 pendant groups and having an average molecular weight between 2900 and 5300) available from Lambent Technologies Inc.; alkyl-dimethicone copolyol type surfactants, such as described in U.S. Pat. No. 7,083,800, including such silicone emulsifiers commercially sold under the names "Abil® WE 09", "Abil® WS 08" and "Abil® EM 90" (EVONIK Goldschmidt GmbH, Essen, Germany) and cationic silicone emulsifiers, such as described in U.S. Pat. No. 5,124,466.

Anionic surfactants include, but are not limited to, one or more of a carboxylate such as, without limitation, alkylcarboxylates (e.g., carboxylic acid and/or its salts), polyalkoxycarboxylates (e.g., polycarboxylic acid and/or its salts), alcohol ethoxylate carboxylates, nonylphenol ethoxylate carboxylates, or combinations thereof; sulfonates such as, without limitation, alkylsulfonates, alkylbenzenesulfonates (e.g., dodecyl benzene sulfonic acid and/or its salts), alkylarylsulfonates, sulfonated fatty acid esters, or combinations thereof; sulfates such as, without limitation, sulfated alcohols, sulfated alcohol ethoxylates, sulfated alkylphenols, alkylsulfates, sulfosuccinates, alkylether sulfates, or combinations thereof; phosphate esters such as, without limitation, alkyl-phosphate esters; or combinations thereof. Exemplary anionic surfactants include sodium alkylarylsulfonate, alpha-olefinsulfonate, fatty alcohol sulfates and combinations thereof.

Exemplary amphoteric surfactants (or zwitterionic surfactants) include, but are not limited to, imidazoline derivatives, betaines, imidazolines, sultaines, propionates, amine oxides or combinations thereof, including imidazolinium betaine, dimethylalkyl lauryl betaine, alkylglycine, and alkyldi(aminoethyl)glycine.

The surfactant can be present as a coating on at least a portion of the particles in the composition. The surfactant can be included in the cryogenic injection composition and the amount of surfactant can depend on the composition of the fluid or the rate of flow of the fluid or the size of the conduit or combinations thereof. For example, the amount of surfactant that can be included in the cryogenic injection composition can be between about 0.1% and about 25% based on the weight of the composition. In some applications, the amount of surfactant in the composition can be between 0.2% and 10%, or between 0.5% and 5%, or between 0.001% and 1%. The cryogenic injection composition can include an amount of surfactant that is 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, 15%, 15.5%, 16%, 16.5%, 17%, 17.5%, 18%, 18.5%, 19%, 19.5%, 20%, 20.5%, 21%, 21.5%, 22%, 22.5%, 23%, 23.5%, 24%, 24.5% or 25% based on the weight of the composition.

4. Preparation of the Cryogenic Injection Compositions

The cryogenic injection composition can be prepared by any method of mixing a fluid with a particle known in the art. Methods of preparing dispersions of microparticles or nanoparticles are well known in the art (e.g., see U.S. Pat. Nos. 7,807,112; 7,785,998 and 7,683,098; and U.S. Pat. Appl. Pub. No. US2011/0085229; US2010/0311859; and US2009/0215255, the disclosure of each of with is hereby incorporated by reference). For example, a cryogenic injection composition as provided herein can be made by introducing the particles to be included in the injection composition into a pressurizable mixing tank. The tank can include cryogen-compatible mixers to stir the liquid cryogen with the particles to disperse the particles in the cryogen. The mixing tank can be adapted to include recirculating hoses that include in-line mixers (such as are commercially available from Silverson, Admix, Fluko and other suppliers) compatible with the cryogen and able to withstand cryogenic temperatures to insure thorough mixing of the cryogen with the particles and to assist in dispersion of the particles throughout the cryogen in the composition. Mixing devices, including in-line mixers, are well known in the art (e.g., U.S. Pat. Nos. 5,738,772; 5,076,930; 4,729,664 and 4,533,123).

The cryogenic injection composition also can be made in situ by providing an injector tube in which the particles are introduced into the liquid cryogen via a one-way ball valve as the liquid cryogen flows past the ball valve, metering in the particles into the cryogen liquid prior to its introduction into the fluid within the conduit.

C. METHODS OF INJECTION OF THE CRYOGENIC INJECTION COMPOSITIONS

The cryogenic injection compositions provided herein can be injected into a fluid within a conduit to reversibly modulate the flow of the fluid through the conduit. An injector device can be used to inject the cryogenic injection composition across a well casing, delivering the cryogenic injection composition into the fluid in the conduit, and reducing the temperature of the fluid (see commonly owned U.S. patent application Ser. No. 13/161,411, published as U.S. Pat. Appl. Publ. No. 20110308259). Passages in the well casing can be provided for the injection devices to be positioned to direct the ejection of the cryogenic injection composition directly into the fluid in the producing tubular when the injector system is activated. For example, the last piece of casing of the first string (or two or more of the strings, which have larger diameter bores) of the well casing can include tubing for injection of the cryogenic injection composition into the fluid. Tubes or conduits that can be used to deliver the cryogenic injection composition to the cryogenic injector module can be fabricated into each layer of casing and the casings then can be aligned to produce the passageways to deliver the cryogenic injection composition to the cryogenic injector module before placing into the well hole. The tubing to convey the cryogenic injection composition also can be incorporated into an annular space formed between two concentric pipes. The pipes of the casing also can be fabricated to include one or more channels in the walls of the pipe to serve as channels for delivery of the cryogenic injection composition. Such channels in the walls of the pipe can be fabricated by any method known to those skilled in the art. For example, the pipes can be made via injection molding to include the desired channels for delivery of cryogen to the injectors. A channel for delivery of the cryogenic injection composition can be within an inner annulus of the well casing or in a gun-drilled channel in the well casing.

The cryogenic injection compositions provided herein can be used alone or in conjunction with the CryoPlug cryo-thermodynamic valve system described in commonly owned co-pending U.S. Pat. Appl. Publ. No. 20110308259 (the entire disclosure of which is incorporated herein by reference). The cryogenic injection compositions provided herein can be used with any system adapted to cool at least a portion of a conduit and a fluid therein (e.g., see U.S. Pat. Nos. 7,546,873; 5,836,167; 4,441,328 and 4,370,862).

D. METHODS OF CRYOGENICALLY MODULATING FLOW IN A CONDUIT

Provided herein are methods of cryogenically modulating flow in a conduit. The methods include injecting into a fluid within the conduit a cryogenic injection composition, such as a composition containing a surfactant, a cryogen and frozen beads containing a frozen solvent and particles of a thermally conductive material. The introduction of the cryogenic injection composition improves the removal of thermal energy from a fluid within a conduit and increases the rate of thermal energy dissipation from the fluid within the conduit than that observed with injection of cryogen alone.

For example, the frozen beads containing particles of thermally conductive material can assist in the transfer of thermal energy out of the fluid within the conduit, accelerating the decrease in temperature of the fluid and its solidification and freezing. Melting of the frozen beads removes thermal energy from the fluid within the conduit. In addition, melting of the frozen solvent releases the particles of thermally conductive material, which can serve as nucleation sites upon which or due to which the reduced-temperature fluid can solidify and thereby trigger formation of a frozen plug. The increase in the number of potential nucleation sites in the fluid as the thermal energy of the fluid is decreased can accelerate the formation of multiple portions of at least partially solidified solid fluid within the conduit. The multiple portions of at least partially solidified solid fluid can colloid with a wall of the conduit, adhere (such as by freezing to a pre-cooled conduit, e.g., as described in U.S. Pat. Appl. Publ. No. 20110308259) to the wall and thereby accelerate the rate of formation of a frozen plug of fluid in the conduit. The multiple portions of at least partially solidified fluid within the conduit also can collide with each other to form larger aggregates, and in some instances the proliferation of collisions of aggregates can be sufficient to cause formation of a frozen plug in the conduit in significantly less time than when a cryogen alone is injected into the fluid in a conduit.

The introduction of surfactant into the fluid within the conduit tends to provide a more uniform frozen fluid. The frozen beads can include surfactant and particles having high heats of fusion or high heats of sublimation, which results in the transfer of negative thermal energy (due to the adsorption of thermal energy by the cryogenic injector fluid, particularly enhanced by the absorption of thermal energy by the particles in the composition) into the system, creating nucleation sites for freezing or at least increasing the viscosity of the flowing fluid in the conduit such that the resulting frozen or viscous particles precipitate on the wall of the heat exchanger attached to the conduit.

The combination of the heat transfer system attached to the conduit and removing thermal energy from the conduit and its contents from the outside-in, and the introduction of negative thermal energy into the fluid within the conduit by injecting the cryogen, surfactant and frozen beads containing particles of thermally conductive material results in a rapid removal of thermal energy from the fluid and formation and building of frozen fluid onto the walls of the conduit, resulting in the formation of a frozen plug in the conduit. The frozen beads can contain a material having high latent heat of sublimation, such as dry ice, to remove thermal energy from the fluid in the conduit. The sublimation and vaporization of the carbon dioxide particles absorbs latent heat of sublimation and vaporization from the fluid in the conduit thereby cooling the fluid.

The frozen beads thus can promote thermal energy transfer out of a flowing fluid within a conduit, promoting nucleation sites for freezing at least a portion of the flowing fluid, the resulting frozen fluid particles, agglomerating with other frozen particles or precipitation directly to form frozen fluid on the walls of the conduit. This thermal transfer, particularly to a cooled conduit, as can be achieved by the activation of a thermal transfer system attached to the conduit, can promote adhesion of the plug to the walls of the conduit as well as increasing the rate of deposition of frozen fluid within the conduit onto the conduit wall and subsequently onto layers of frozen fluid. The thermal transfer also can be used in reverse to help to dislodge the plug from the walls of the conduit to restore flow of fluid in the conduit by transferring thermal energy from the thermal transfer unit to the conduit and the fluid within the conduit in order to partially melt and dislodge the frozen plug from the surface of the conduit and restore flow of fluid through the conduit.

1. Heat Transfer System

The methods provided herein include as a step activating a heat transfer system attached to at least a portion of the conduit from which thermal energy is to be extracted. Any heat transfer system known in the art can be used. Examples of such heat transfer systems include those described in U.S. Pat. Appl. Publ. No. 20110308259 and in U.S. Pat. Nos. 3,498,071; 3,623,337; 3,695,301; 3,742,723; 4,112,706; 4,220,012; 4,267,699; 4,370,862; 4,441,328; 5,836,167; 7,546,873 and GB1584189.

The configuration of the heat transfer system can vary. The heat transfer system can include an annular chamber affixed around the conduit to form a cooling zone through which thermal energy is extracted from the conduit and the fluid therein. The heat transfer system can be cooled by refrigeration techniques known in the art, or via exposure to a cryogen, such as liquified air or inert gases such as argon, nitrogen, neon or krypton or by a combination thereof. A particular heat transfer system is described in U.S. Pat. Appl. Publ. No. 20110308259.

An exemplary heat transfer system can include a detachable housing having side portions for enclosing a section of the conduit and end portions for engaging in sealing relation with opposite ends of the conduit section, the side and end portions defining a cooling chamber when assembled around the conduit, the cooling chamber being operable when filled by discharging cryogen from a refrigerant supply module into the chamber, which confines a volume of the cryogen at least a portion of which is in its liquid phase in intimate contact with the exterior surface of the section of conduit enclosed by the housing, the detachable housing including an inlet port for admitting the cryogen from the refrigerant supply module into the cooling chamber and an exhaust port for discharging the spent cryogen out of the cooling chamber. The side portions of the detachable housing can include a first cylindrical half shell and a second cylindrical half shell, the first and second shells each including longitudinally extending flange portions which cooperate to permit mating engagement of the shells to each other to form a closed structure, the end portions of the housing comprising radially extending flange portions for mating engagement with opposite ends of the conduit section enclosed by the housing.

Activation of the heat transfer system results in extraction of thermal energy from, or input of negative thermal energy to, the conduit and fluid therein. In some applications, activation of the heat transfer system includes delivery of a refrigerant, such as a cryogen, to the heat transfer system. In some applications, activation of the heat transfer system includes providing negative thermal energy to the heat transfer system from a refrigeration system. Any refrigeration system known in the art can be used to generate negative thermal energy for the heat transfer system. Examples of refrigeration systems include vapor compression refrigeration systems, especially with a single stage or rotary compressor, heat exchange units, magnetic refrigeration, cryogenic cooling and absorption systems. Heat exchange units are well known in the art (e.g., see U.S. Pat. Nos. 7,441,412; 7,407,600; 7,378,065; 7,272,951; 7,263,852; 7,069,981; 7,028,768; 7,013,668; 6,185,953; 5,787,722 and 5,582,239). Magnetic refrigeration is a cooling technology based on the magnetocaloric effect. Devices that use magnetic refrigeration are well known in the art (e.g., see U.S. Pat. Nos. 7,603,865; 7,596,955; 7,481,064 and 7,114,340, and U.S. Pat. Pub. Nos. US20100071383, US20090217675, US20090158749, US20090019860 and US20070144181). Electric thermal transfer devices, such as a Peltier device (e.g., see U.S. Pat. No. 7,218,523) also can be used as a heat exchange unit. Cryogenic cooling systems also are known in the art (e.g., see U.S. Pat. Nos. 7,921,657; 7,415,830; 7,273,479; 7,185,501 and 6,658,864).

Activation of the heat transfer system can include providing a refrigerant or a cryogen to the device, or providing power to or otherwise turning on a Peltier device or magnetic refrigeration device. The temperature of the heat transfer system and the temperature along and/or within the conduit can be monitored with thermal monitoring devices or other temperature sensors such as thermocouples. The thermal monitoring devices can be coupled to and provide inputs to a computer module.

The source of negative thermal energy, or cooling power, such as a refrigeration unit or refrigerant supply module, can be positioned so that it is in close vicinity to the conduit from which thermal energy is to be extracted. By positioning, e.g., a refrigeration unit in close proximity to the conduit, the length of hoses or pipes from the refrigeration unit to the heat transfer system can be minimized. For example, if the conduit to be frozen is located on the seabed, prior art cooling sources generally are located on a ship or platform on the surface and are connected to the cooling unit via hoses or pipes, which can be difficult to maintain during periods of rough seas. Instead, the source of negative thermal energy, or cooling power, such as a refrigeration unit or refrigerant supply module, can be positioned so that it is in close vicinity to the conduit from which thermal energy is to be extracted. For sub-surface ocean environments, a submersible housing can be used to enclose the source of negative thermal energy, e.g., a refrigeration unit.

The methods provided herein can be used sub-sea and topside on the surface. The methods can be performed manually or can be configured to be remotely controlled, such as by a computer programmed with appropriate software. The heat transfer system can include thermal monitoring devices that can be attached to one or more points of the conduit to monitor a thermal gradient and can be included at the interface between the heat transfer system and the conduit to monitor the temperature at the interface. A computer that controls or is in communication with the heat transfer system and the thermal monitoring devices can monitor the thermal gradient and/or rate of thermal exchange and control either or both in order to minimize or eliminate thermal stress on the conduit. Remote control of the heat transfer system could include, e.g., start up and shut down of the refrigeration unit and valve actuation. The system also can include temperature and pressure monitoring devices, which can be monitored or accessed remotely via a computer.

When the method is used underwater, such as on the ocean floor, a fully submersible refrigeration unit can be used. Control of the submerged refrigerator system can be provided from the surface, e.g. from a vessel or platform, such as by attached wires or cables that can provide power, communication and monitoring between the thermal energy extraction system and the surface. The refrigeration unit can be enclosed in a pressure vessel or housing to minimize exposure to water and to allow regulation of the pressure within the vessel or housing. The refrigeration unit and its compressor drive motor can be powered by a supply from a surface vessel or platform or via batteries or a submerged generating system.

2. Injection Device

The methods provided herein include as a step activating an injection device attached to the conduit. Any device configured to enable introduction of a material through the conduit into the fluid therein can be used. The injector devices can include injectors fitted with nozzles for directional application or dispersal of the cryogenic injection composition. Examples of injection devices are described in U.S. Pat. Nos. and 5,403,089. Examples of flow nozzles and injection devices are described in, e.g., U.S. Pat. Nos. 4,095,747; 4,350,027; 4,789,104; 5,105,843; 5,385,025; 5,527,330; 5,944,686; 6,070,416; 6,164,078; 6,363,729 and 7,740,287 and U.S. Pat. Appl. Pub. Nos. 2002-0139125, 2008-0048047 and 2011-0308259. A particular injection device is described in U.S. Pat. Appl. Publ. No. 2011-0308259.

The injection device can include one or more activatable valves that can modulate the flow of material to and/or through the injectors of the injection device(s). The injection device also can include remotely activatable solenoid valves between the source of the material to be injected into the fluid through the injectors and the injectors. For example, a modulating valve that regulates the flow of cryogenic injection composition from a supply module to and through the injector(s) can be included in the injection device. The material to be injected through the injector(s) and into the fluid within the conduit can be conveyed to the injection device using any appropriate tubing or piping, including insulated tubing or piping. For example, a cryogenic injection composition can be transported from a supply module to the injection device via insulated pipes, such as by use of jacketed high density polyethylene, polyurethane and/or fiberglass reinforced polyester resin insulated pipe, vacuum jacketed pipe or dual concentric prestressed pipe (e.g., see U.S. Pat. Nos. 3,530,680; 3,693,665; 3,865,145 and 4,219,224).

The injection device can include a venturi pump, such as a fluid jet eductor. In such systems, flowing fluids can be passed through piping configurations that cause a pressure differential sufficient to draw in particles, such as frozen beads, to be mixed with the flowing fluid, such as a cryogen or a solvent or a combination thereof. Jet eductor systems are well known in the art (e.g., see U.S. Pat. Nos. 4,165,571; 5,522,419; 5,743,637; 5,993,167; and 6,450,775) and can be modified to be used with the cryogen fluids described herein. An exemplary eductor can be configured to include a nozzle, which can direct a fluid, such as cryogen, to form a jet; a venturi structure, and an air gap between the nozzle and the air gap. In use the fluid jet passes across the air gap and enters the venturi structure. The venturi structure includes an inlet, a side passage for delivering the frozen beads into the fluid jet and a chamber where the particles are entrained and mixed with the fluid by the flow of the fluid.

The frozen beads or other particles can be supplied to the venturi structure via a tube, pipe or chute having a discharge end located near the inlet of the venturi structure, where a vacuum (negative pressure) created by the high velocity fluid flow therein acts to draw the particulate matter from the tube, pipe or chute into the venturi structure. One method of controlling the amount of frozen beads or other particles added to fluid within the conduit is to include a metering device, such as auger barrel, to regulate the amount of frozen beads flowing through the auger and into the venturi mixing chamber by means of a variable speed motor driving the auger. Any metering device or flow regulation devices known in the art can be used to meter the amount of particles that are added to the flowing fluid and thereby to regulate the amount of particles, e.g., frozen beads, added to the cryogen or other fluid flowing through the eductor.

The injectors of the injection device, tubing and/or pipes can be made of any material appropriate for the conditions under which they are to be used. For example, for deep sea drilling applications, the tubing or piping can be engineered to resist the high water pressures that exist at depths of deep sea drilling, including depths of about 7,000 feet under water. Those skilled in the art can select the proper material and thickness or design of the piping or tubing for such applications. The piping or tubing can include radial or lateral reinforcements to withstand collapse under the pressure of the water pressures that exist at deep sea drilling depths. The piping or tubing can be manufactured to be of a thickness such that the piping or tubing is resistant to reformation or crushing by the water pressure at sea depths of deep sea drilling. Exemplary materials include stainless steel, aluminum, copper, or cryogenically compatible polymers, such as fiber-reinforced epoxy composites and ultra-high molecular weight polyethylene. The injectors, tubing or pipes also can be of an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463. When activated, the injectors of the injection device introduce a material into the fluid within the conduit.

The tubing or piping can be constructed for ambient pressures or for high pressure environments. The tubing or piping can be insulated to minimize thermal contamination from the surrounding environment. Any technique known to those of skill in the art for insulating piping can be used. The tubing or piping can be encircled or enveloped in a non-thermally conductive material. The tubing or piping can be enclosed in a thermal isolation means. The thermal isolation means can include a covering fabricated of or containing a thermally non-conducting material. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

The injectors of the injection device can be configured so that the injector is in contact with the fluid within the conduit when it injects material into the fluid. The injectors of the injection devices can be configured so that the injector is not in contact with the fluid in the conduit. For example, the injector can be an opening in the side of the conduit, such as an opening in the side of a flow tubular. The injector can comprise a port through which a material, such as a cryogen or frozen beads or surfactant or any combination thereof, or a cryogenic injector composition, is introduced into the conduit so that the cryogen or frozen beads or surfactant of combination thereof or the cryogenic injector composition comes into contact with the fluid within the conduit. The injector of the injection unit can include an isolation mechanism for controlling the introduction of the material into the fluid in the conduit. Any isolation mechanism known in the art can be used. In some embodiments, a check valve can be included in the injector of the injection device. The check valve can be used as an isolation mechanism and/or can be used to prevent the back flow of fluid in the conduit, such as oil in the flow tubular, into the injection device.

Any valve that is operative at cryogenic temperatures can be used. Not all embodiments require a check valve. For example, in embodiments where the supply module delivers the cryogenic injection composition at a greater pressure than the expected internal pressure of the conduit or tubular, once the flow of cryogenic injection composition from the supply module to the injector is stopped, a check valve would not be required. A check valve can be included as part of the apparatus used to activate the valve. The injection device can be isolated from the conduit or tubular by a manually or remotely operated valve suitable to contain the type and pressure of fluid in the conduit.

The injection device can include a plurality of injectors. Individual injectors can be activated independently from other injectors. For example, an injector of surfactant can be activated in combination with the cryogen injector, injecting a surfactant into the fluid within the conduit simultaneously with a cryogen. An injector of surfactant can be activated prior to activation of a cryogen injector, introducing surfactant into the fluid within the conduit before injection of the cryogen into the fluid. An injector of surfactant can be activated after activation of an injector introducing frozen beads, introducing surfactant into the fluid within the conduit after injection of the frozen beads into the fluid. An injector of surfactant can be activated prior to activation of an injector introducing the cryogenic injection composition, introducing surfactant into the fluid within the conduit before injection of the cryogenic injection composition into the fluid.

The introduction of a material, such as a surface active agent or frozen beads or a cryogen or a cryogenic injection composition or a combination thereof can be controlled by a mechanical valve that can be opened and closed. The valve can be controlled manually or remotely, such as by including a computer operated or electrically activatable valve. When activated, the valve opens to introduce the material into the fluid within the conduit.

Flow rate meters can be included in the injection device(s), or in the pipes or tubing that deliver material to the injection device(s) or any combination thereof. The flow rate meters can be in communication with a computer module. Data from the flow rate meters can be used to determine the flow of material through the injection device(s), and can be used to modulate the rate of flow of material into the fluid within the conduit, either manually or automatically by computer control. Flow rate meters can be included throughout the path of fluid communication from the material supply module to the exit point of the material from the injectors of the injection device into the fluid for determination of rate of flow of material through the system. Any flow meter known in the art can be used in the system. The flow meter can include a paddle wheel flow meter, a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

Passages in a well casing can be provided for the injection devices to be positioned to direct the introduction of material, such as cryogen, frozen beads, surfactants, cryogenic injection compositions or combinations thereof into the fluid in a conduit, e.g., a producing tubular, when the injection system is activated. Tubes, pipes or conduits that can be used to deliver material to be injected into the fluid to the injection device can be fabricated into each layer of casing and the casings then can be aligned to produce the passageways to deliver the material to the injection device. The tubing or pipes conveying the material to be injected can be incorporated into an annular space formed between two concentric pipes.

The injection device can include other components, such as flow-control metering valves, an isolation valve, an emergency shut-off valve, an over-pressure valve, a diverter valve, heating units, thermal monitoring devices and a computer module for automation of the device or any attached components. The computer module can be in communication with and/or in control of heating units, valves, flow rate meters and thermal monitoring devices. A computer processor of the computer module can control flow-control metering valves to provide a flow of material, e.g., frozen beads or a cryogenic injection composition, through an injector of the injection device into the fluid within the conduit.

3. Frozen Beads

The methods provided herein can include introducing frozen beads into the fluid within the conduit from which thermal energy is to be extracted. The frozen beads can contain particles, e.g., of a thermally conductive material and a solvent. The thermally conductive material can include, e.g., copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. The particles can include an oxide. The oxides can include an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

The particles of a thermally conductive material within or on the surface of the frozen beads can include a material selected from among carbon fibers, carbon nanostructures, polyacetylene fibers, aluminum silicon carbide, aluminum graphite, aluminum nitride, silicon nitride ceramic and combinations thereof. Exemplary carbon nanostructures include carbon nanotubes, carbon buckyballs, carbon nanoribbons and carbon nanowires and combinations thereof.

The frozen beads can include a material having high specific heat. The beads can include particles selected to be of a material or contain a material having a high volumetric heat capacity. For example, the beads can contain particles of a material having a volumetric heat capacity greater than 1, particularly materials having a volumetric heat capacity greater than about 1.5. Examples of such materials include graphite, fused silica, ground granite, silver, gold, tungsten, zinc, copper, and iron. The frozen beads can include particles selected to have a specific heat capacity $c_p$ that is, e.g., greater than 0.1 $J \cdot g^{-1} K^{-1}$, or greater than 0.5 $J \cdot g^{-1} K^{-1}$, or greater than 1 $J \cdot g^{-1} K^1$, or greater than 2 $J \cdot g^{-1} K^{-1}$. The frozen beads can include particles can be selected to have a specific heat capacity between about 0.25 $J \cdot g^{-1} K^{-1}$ and 2.5 $J \cdot g^{-1} K^1$, or between about 0.2 $J \cdot g^{-1} K^{-1}$ and 2 $J \cdot g^{-1} K^{-1}$, or between about 0.1 $J \cdot g^{-1} K^{-1}$ and 1 $J \cdot g^{-1} K^{-1}$. In particular, the frozen beads can include particles can be selected to have a specific heat capacity greater than about 0.7 $J \cdot g^{-1} K^{-1}$.

For example, the frozen beads can include particles of paraffin wax ($c_p$ of 2.5 $J \cdot g^{-1} K^{-1}$), or frozen water ($c_p$ of 2.11 $J \cdot g^{-1} K^{-1}$), or lithium ($c_p$ of 3.58 $J \cdot g^{-1} K^{-1}$), or solid polyethylene ($c_p$ of 2.3 $J \cdot g^{-1} K^{-1}$), or beryllium ($c_p$ of 1.82 $J \cdot g^{-1} K^{-1}$), or aluminum ($c_p$ of 0.897 $J \cdot g^{-1} K^{-1}$), or glass ($c_p$ of 0.84 $J \cdot g^{-1} K^{-1}$), or crushed granite ($c_p$ of 0.79 $J \cdot g^{-1} K^{-1}$), or graphite ($c_p$ of 0.71 $J \cdot g^{-1} K^{-1}$), or silica ($c_p$ of 0.70 $J \cdot g^{-1} K^{-1}$), or titanium ($c_p$ of 0.52 $J \cdot g^{-1} K^{-1}$), or iron ($c_p$ of 0.45 $J \cdot g^{-1} K^{-1}$), or chromium ($c_p$ of 0.45 $J \cdot g^{-1} K^{-1}$), or zinc ($c_p$ of 0.387 $J \cdot g^{-1} K^{-1}$), or copper ($c_p$ of 0.385 $J \cdot g^{-1} K^{-1}$), or silver ($c_p$ of 0.233 $J \cdot g^{-1} K^{-1}$), or cadmium ($c_p$ of 0.231 $J \cdot g^{-1} K^{-1}$), or tin ($c_p$ of 0.227 $J \cdot g^{-1} K^{-1}$), or tungsten ($c_p$ of 0.134 $J \cdot g^{-1} K^{-1}$), or gold ($c_p$ of 0.129 $J \cdot g^{-1} K^{-1}$), or bismuth ($c_p$ of 0.123 $J \cdot g^{-1} K^{-1}$) or combinations thereof. The frozen beads can include particles can be carbon nanotubes or carbon fullerenes. The frozen beads can include particles can be or contain solid carbon dioxide, which has a heat of sublimation of 25.2 kJ/mol or 570 $J \cdot g^{-1}$. The frozen beads can be hollow or can include entrapped gases in order to allow the frozen beads to be suspended or easily resuspended in the injection composition. Decreasing the size of the frozen beads can result in particles that are suspended or easily resuspended and thus can facilitate injection into the fluid within the conduit.

A typical size of the particles, e.g., of thermally conductive material contained in the frozen beads, as measured by its characteristic length (e.g., diameter) is between 50 nm and 10 μm. The particles of thermally conductive material contained in the frozen beads can be selected to be nanoparticles, such as particles having a diameter between 50 and 1000 nm, particularly particles having a $D_{50}$ between 90 nm and 500 nm, or greater than 100 nm, or less than 1000 nm, or less than 900 nm, or less than 800 nm. The particles of thermally conductive material contained in the frozen beads also can be selected to be microparticles, such as having a diameter of 1 micron or greater.

The particles of thermally conductive material contained in the frozen beads can be selected to be any desired size and/or shape. For example, the particles can be cubes, flakes, granules, cylinders, rings, rods, needles, prisms, disks, fibers, pyramids, spheres, spheroids, prolate spheroids, oblate spheroids, ellipsoids, ovoids or random non-geometric shapes or any combinations of these shapes.

The size and/or shape of the particles of thermally conductive material contained in the frozen beads can be selected to select a surface area of the particle, e.g., to maximize surface area, or otherwise facilitates nucleation or formations of multiple instances of frozen fluid within the conduit. For example, one way to increase the specific surface area is to select particles that have a less uniform surface geometry. The more irregular or jagged the particle surface geometry, the greater will be the ratio of surface area to volume of that particle. Another way to increase the specific surface area is to decrease the particle size. For example, particles having a specific surface area in a range from at or about 0.1 $m^2/g$ to at or about 500 $m^2/g$ can be used. The particles of thermally conductive material contained in the frozen beads also can be selected to have a specific surface area of less than 400 $m^2/g$, or less than 300 $m^2/g$, or less than 200 $m^2/g$, less than 100 $m^2/g$.

The frozen beads can include a solvent. The solvent can include any known solvent. Exemplary solvents include acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, water, m-xylene, p-xylene and combinations thereof.

The amount of solvent in the frozen beads can be in the range of 0.05% to 85%, or 0.5% to 75%, or 1% to 50%, or 5% to 50%, or 5% to 25% based on the weight of the frozen bead. The amount of frozen beads in the cryogenic injection composition injected into the fluid within the conduit can be in the range of 0.05% to 95%, or 1% to 90%, or 5% to 85%, or 10% to 70%, or 15% to 65%, or 20% to 60%, or 25% to 50%, or 25% to 75%, or 30% to 80%, or 40% to 90%, or 50% to 95%, based on the weight of the fluid.

Because flow rates through conduits can vary, it often is convenient to express the amount of fluid in barrels (or bbl, where bbl=42 US gallons or about 159 L). The amount of frozen beads added to the fluid within the conduit vie injection of the cryogenic injection composition can be in the range of 0.01 to 150 pounds/bbl or in the range of 0.1 to 125 pounds/bbl or in the range of 0.5 to 100 pounds/bbl or in the range of 1 to 75 pounds/bbl. or in the range of 1.5 to 50 pounds/bbl.

In some instances, the frozen beads can contain frozen water. In an exemplary method, an aqueous solution optionally containing a nonionic, ionic or zwitterionic surface active agent or combination thereof can be dispersed with and sprayed as micro-droplets unto the surface of frozen beads that are at a temperature of 0° C. or less. For example, the air temperature within a controlled environment chamber can be reduced to a temperature of about −5° C. or −10° C. or −15° C. with a relative humidity of between 95% and 100%. The frozen beads to receive a partial or complete coating of ice are cooled to a temperature of less than −20° C. and fluidized by agitation with a dry gas source, such as dry compressed air, or nitrogen or argon gas, so that the frozen beads are delivered to the controlled environment as suspended particles in the gas. As the frozen beads enter the high humidity of the controlled environment chamber, water vapor condenses on the surface of the frozen beads, forming at least a partial coating of frozen water on the surface of the frozen beads. The flow of the gas containing the frozen beads to be coated can be modulated to increase or decrease the amount of frozen beads entering the controlled environment chamber, thereby varying the amount of water that can condense on the frozen beads. The relative humidity of the controlled environment chamber and the temperature of the air within the controlled environment chamber or both can be modulated to modify the amount of water that can condense on the frozen beads.

Surfactants can be included in the frozen beads or in the water or solvent to be frozen to form a frozen water partial or complete coating on the frozen beads containing particles of a thermally conductive material. Surfactants can act to reduce the surface tension of the water, thereby facilitating formation of fine water droplets. Any surfactant known in the art can be included in the frozen beads or the water to coat the frozen beads, including cationic, anionic, non-ionic and zwitterionic surfactants, including silicone surfactants. Any surfactant known in the art also can be injected into the fluid within the conduit via the injection device. Exemplary surfactants are discussed in the art (e.g., see U.S. Pat. Nos. 3,760,598; 4,634,050; 6,464,148; and 7,562,831) and discussed above in a previous section. Any combination of surfactant described herein can be incorporated into the cryogenic injection composition or injected into the fluid within the conduit simultaneously with, before or after injection of the cryogenic injection composition. The amount of surfactant injected into the fluid within the conduit can vary and can depend on the composition of the fluid or the rate of flow of the fluid or the size of the conduit or combinations thereof and thus the exact amount of surfactant added depends somewhat on the circumstances. The amount of surfactant added can be expressed in terms of amount of surfactant added per gallon of or liter of fluid. The amount of fluid in a defined area of the conduit, such as the cooling zone under the attached heat transfer system, can be calculated using standard calculations. Because flow rates through conduits can vary, it often is convenient to express the amount of fluid in barrels or bbl. The amount of surfactant added to the fluid within the conduit, either by injecting a cryogenic injection composition containing frozen beads that include surfactant(s) or by injection of surfactant into the fluid within the conduit, can be in the range of 0.01 to 100 pounds/bbl or in the range of 0.1 to 75 pounds/bbl or in the range of 0.5 to 70 pounds/bbl or in the range of 1 to 60 pounds/bbl. or in the range of 2.5 to 50 pounds/bbl. Nuclei, such as inorganic and organic particles, including clay minerals and diatomaceous earth, also can be added to the beads.

When the methods are to be used in environments of high pressure, such as underwater, particularly in deep-sea applications, the frozen beads can include particles having a high latent heat of fusion, or a high heat of sublimation, such as solid particles of carbon dioxide. The particles can be of any size or geometry, and preferably the particles are micron or submicron in size. Inclusion of the particles having a high latent heat of fusion or heat of sublimation in the frozen beads injected into the fluid within the conduit results in a higher thermal transfer capacity per mass of fluid than can be achieved under the same high pressure conditions without the particles of a high latent heat of fusion material or heat of sublimation material. When frozen beads containing the particles of a high latent heat of fusion material are introduced into the fluid within the conduit, the frozen beads absorb thermal energy, particularly heat of fusion, and release the particles of a high latent heat of fusion material, which absorb additional thermal energy, absorbing sufficient thermal energy from the fluid to transition the fluid in the conduit from a liquid state to a solid state.

Methods of making nanoparticles and microparticles are well known in the art (e.g., see U.S. Pat. Nos. 7,834,468; 7,621,976; 7,521,394; 7,498,005; 7,413,725; 7,332,351; 7,259,101; 7,160,525; 6,870,047; 6,726,934; 6,623,761; 6,548,264; 5,665,277; and 5,618,475; and U.S. Pat. Appl. Pub. Nos. US2011/0218364; US2011/0091560; US2010/0267549; US2010/0139455; US2010/0087337; US2009/0158890; US2009/0029064; US2007/0080054 and US2006/0228554, the description of each of which is incorporated by reference herein in its entirety.

Frozen beads can be prepared by any method known in the art. For example, spheres or beads can be prepared by creating a slurry of the thermally conducting particles, such as carbon nanostructures or polyacetylene fibers (see U.S. Pat. Nos. 4,020,265; 3,928,516; 3,933,722; 3,816,374; 3,852,235; and 3,709,863) in a solvent, such as ethanol and isopropanol or constant boiling propanol (containing water not removed by distillation) and other optional ingredients, such as surfactants, and then dropping measured quantities of the slurry into a cryogenic liquid such as liquid nitrogen or argon, and collecting the frozen beads that form. Other methods are known in the art (see, e.g., U.S. Pat. Nos. 6,354,091; 6,348,431; 5,550,044; 4,975,415; and 3,516,935).

4. Heat Extraction

When the cryogenic injection compositions, devices and systems described herein are deployed, the thermal transfer systems can extract heat from the conduit, and can do so at a controlled rate so as not to cause thermal stress in the conduit. Over time, as the temperature of the conduit decreases, the decreased temperature will thicken and solidify the material within the conduit, such as water or oil or their combination to form a plug of the conduit. In some instances, the temperature of the conduit can be decreased to a temperature of between −20° C. to −100° C., or −30° C. to −100° C., or −50° C. to −100° C., or −20° C. to −90° C., −30° C. to −120° C., or −50° C. to −150° C., or −10° C. to −150° C. In some instances, the temperature of the conduit can be decreased to a temperature of −20° C. or lower, or −30° C. or lower, or −40° C. or lower, or −50° C. or lower. In some instances, the temperature of the conduit can be decreased to a temperature of −80° C. or lower, or −100° C. or lower, or −150° C. or lower, or −200° C. or lower. In some instances, the jacket attached to the conduit can reduce the temperature of the conduit and the fluid therein to a temperature between −40° C. and −60° C. or to a temperature between −20° C. and −250° C. or to a temperature between −30° C. and −240° C. or to a temperature between −40° C. and −220° C. or to a temperature between −50° C. and −200° C.

The thermal energy extraction from the fluid within the conduit and the conduit will slowly freeze layer upon layer of fluid, such as water or oil, within the frozen conduit from which thermal energy is to be extracted, reducing the inside diameter of the conduit and ultimately forming a plug that seals the conduit with the frozen plug. The plug can be maintained for a desired amount of time, e.g., until the conduit is repaired. The amount of time required for the thermal transfer system to freeze the conduit and for the frozen fluid within the conduit, such as water or oil, to accumulate and form a plug to prevent flow of the liquid through the conduit, will depend on the amount of negative thermal energy put into the system, or the rate of thermal energy extracted from the system. In some applications, such as in arctic locations or in deep sea drilling application, the ambient conditions can be very cold. In such applications, one would not need to chill the pipe and fluid therein a great deal in order to accumulate frozen fluid oil or water deposits or their combination on the interior of the conduit.

In the methods provided herein, a thermal transfer system can include a jacket that is attached to an intact conduit and is activated when necessary as an emergency shut off mechanism of the conduit in case of failure or breach of the conduit. In such instances, the system provided herein in prophylactic. The systems described herein also can be used to provide a means of preventing fluid flow through a breached or broken conduit. In such instances, the method can include identifying a breach site in a conduit; deploying a thermal transfer system, such as described herein, and attaching the jacket to a point below (relative to the direction of flow through the conduit) the fracture, breach or break in an intact area of the conduit; and activating the thermal transfer system for a sufficient time to form a frozen plug of fluid that prevents flow of the fluid through the conduit. In the methods provided herein, the thermal transfer system can be maintained in active thermal exchange until repairs can be made to the conduit.

5. Restoring Flow of Fluid in the Conduit

The methods can include as a step increasing the temperature of the thermal transfer system so that it donates thermal energy to the conduit and consequently the fluid within the conduit, thereby at least partially or completely melting the frozen plug and restoring flow of the fluid through the conduit.

In the warming phase of the methods provided herein, e.g., after repairs have been completed and it is desirous to remove the frozen plug and restore flow of fluid through the conduit, the temperature of the liquid cryogen thermal transfer fluid can be slowly raised. The temperature can be raised at a rate that does not subject the conduit to thermal stress and does not impact tensile or burst strength of the conduit. As the temperature of the liquid cryogen thermal transfer fluid increases, the temperature of the wall of the conduit increases. At a certain temperature, the frozen plug will begin to melt and detach from the inside surface of the conduit. Once the plug becomes detached from the inside surface of the conduit, fluid pressures within the conduit will dislodge the frozen plug, restoring flow of the fluid through the conduit.

In the warming phase of some of the methods provided herein, e.g., after repairs have been completed and it is desirous to remove the frozen plug and restore flow of fluid through the conduit, heaters within the jacket attached to the conduit can be asymmetrically activated, providing thermal energy to only one side of the conduit. The temperature of the heaters can be raised at a rate that does not subject the conduit to thermal stress and does not impact tensile or burst strength of the conduit. As the temperature of the conduit on one side of the frozen plug increases, the temperature of the wall of the conduit at the point of thermal energy application increases. At a certain temperature, the frozen plug will begin to melt at the point of thermal energy application and detach from the inside surface of the conduit at the point of thermal energy application. Once the plug becomes detached from the inside surface of the conduit at the point of thermal energy application, fluid will begin to flow through the gap between the conduit and the frozen plug still attached to the opposite side of the conduit. This results in an increasing flow of fluid past the plug until the plug melts or becomes completely detached. Once the plug is melted or becomes completely detached from the conduit, flow of the fluid through the conduit is restored.

Warming can be achieved by flowing a heat transfer fluid of a higher temperature than the conduit through the heat transfer system. The heat transfer system can include heating elements that when engaged and activated can increase the temperature of the conduit at the site of the frozen plug, thereby melting the plug or decreasing the adhesion of the plug to the conduit, thereby restoring flow through the conduit.

The heat transfer system can include heating devices that can be arranged to provide heat unilaterally or directionally to the conduit in the area of the plug of frozen fluid within the conduit. This directed application of thermal energy to the conduit in proximity to the frozen plug therein allows for directed melting of the plug, such as to form a channel through the plug through which liquid fluid can flow while the frozen plug remains adhered to the inner wall of the conduit. This prevents launching the frozen plug through the conduit, and permits controlled restoration of fluid flow through the conduit.

Any heating device known in the art can be used. For example, one or more discrete, spaced-apart heating units, such as described in U.S. Pat. No. 4,849,611 can be positioned throughout the jacket, thereby allowing directed thermal energy to be applied to the conduit adjacent to the frozen plug within. Other heating devices also can be positioned within the jacket, such as Curie temperature heaters, described in U.S. Pat. No. 7,461,691, or temperature limited heaters, as described in U.S. Pat. Pub. No. 2005-0092483, or conductor-in-conduit heat sources as described in U.S. Pat. Pub. No. 2004-0020642, or heater strips, as described in U.S. Pat. No. 3,793,716, or resistive heating strips, as described in U.S. Pat. No. 4,238,640. Other heating devices that can be used include those described in U.S. Pat. Nos. 7,066,730; 4,238,640; 3,971,416; and 3,814,574.

6. Controlled Rate of Freezing

Also provided are a method and system for controlled rate freezing of a fluid filled thermally conducting metal conduit. The presently disclosed system and method provide the ability to rapidly cool the conduit and the fluid contained therein via liquid cryogen thermal transfer fluid. The rapid cooling of the conduit can be achieved by precisely controlling and modulating the temperature of the liquid cryogen thermal transfer fluid being introduced to the system as a function of time. The method of controlled rate freezing of a conduit can include the steps of: (i) placing a thermal exchange unit in thermal contact with a conduit containing a fluid therein; (ii) activating the thermal exchange unit so that thermal energy is withdrawn from the conduit and the fluid therein and transferred to the thermal exchange unit; and (iii) promptly dissipating the heat absorbed by the thermal exchange unit so as to prevent recirculation of the heat from the thermal exchange unit back to the conduit.

The presently disclosed cryogenic injection compositions, systems and methods provide the ability to rapidly cool a thermally conductive conduit and a fluid contained in the conduit with a thermal exchange unit primarily via forced convective cooling using a laminar flow of liquid cryogen thermal transfer fluid in thermal communication with the thermally conductive conduit. In addition, the present system and method are capable of providing the rapid cooling of the conduit over a wide range of cooling rates and also can hold the temperature of the conduit at any prescribed temperature where specified so as to create and maintain a frozen plug of the fluid within the conduit without inducing thermal stress in the conduit.

The cooling of the conduit can be achieved by controlling and adjusting the temperature of the liquid cryogen thermal transfer fluid being introduced to the jacket in fluid communication with the conduit as a function of time. In one embodiment, the system can be adapted to provide a stepwise or quick drop in temperature to generate a higher degree of sub-cooling within the conduit thereby minimizing the exothermic effects of any phase transition (e.g., water-to-ice transformation) in the fluid in the conduit. The controlled rate freezing or cryogenic chilling system and methods provided herein can be adapted to provide a flow of liquid cryogen thermal transfer fluid to effect a ramp down of temperature of about $-5°$ C. per minute or of about $-10°$ C. per minute to provide rapid cooling of the conduit yet minimize any thermally induced stress in the conduit. The flow of liquid cryogen thermal transfer fluid can be increased to effect a ramp down of temperature of about $-15°$ C. per minute. The flow of liquid cryogen thermal transfer fluid can be increased to effect a ramp down of temperature of about $-20°$ C. per minute, or about $-25°$ C. per minute, or about $-30°$ C. per minute. Temperatures of the liquid cryogen thermal transfer fluid introduced to the jacket can be adjusted or modulated by modulating the refrigeration unit.

The ability to precisely control the cooling rate of the conduit can provide many benefits. Proper design of the freezing process can mitigate stresses and the present systems and methods allow for the precise control of the freezing process to achieve uniformity in the freezing process while minimizing thermally induced stress in the conduit.

7. Other Methods

Also provided are methods to form a temporarily frozen plug of fluid, such as oil or gas, in a conduit, such as a well or pipeline, in order to stop the flow of fluid through the conduit. In some methods, the plug serves to temporarily halt production in an oil well. In some instances, the oil well can be an above-ground pipeline, while in other instances, the oil well can be off-shore, and can be a deep sea oil well. In the systems and methods provided herein, the plug can be formed in situ and can be easily removed by allowing the plug to melt, passively or by controlled modulation of the temperature of the liquid cryogen thermal transfer fluid in the jacket in fluid communication with the conduit.

Provided is a method for temporarily preventing the flow of oil and/or gas in a pipeline, including an offshore well, that includes attaching a jacket containing a liquid cryogen thermal transfer fluid to the pipeline so that the jacket is in thermal contact with at least one portion of the pipeline, and installing an injector module that when activated injects a cryogenic injection composition provided herein into the fluid in the pipeline, such as directly into oil in a well. The injector device injects the cryogenic injection composition provided herein into the fluid to cool the fluid. In some embodiments, the injector device is located closest to the source of fluid flowing through the pipeline so that the injection of the cryogenic injection composition into the fluid cools the fluid before it reaches the area of the pipeline to which the jacket is attached. The thermal transfer systems provided herein containing the jacket can be activated for a sufficient time to form a frozen plug of fluid that prevents flow of the fluid through the conduit and to maintain the frozen plug securely attached to the inner wall of the pipeline, thereby preventing flow of fluid past the plug in the pipeline.

The jacket of the thermal transfer system can be attached to an intact conduit and the system can be activated as an emergency shut off mechanism of the conduit in case of failure or breach of the conduit above the point of attachment of the thermal transfer device. In such embodiments, the method serves as a prophylactic treatment for the prevention or minimization of oil spilled into the environment. The methods provided herein can prevent fluid flow through a breached or broken conduit. In such instances, the method includes identifying a breach site in a conduit; attaching a jacket of the thermal transfer device, such as described herein, to a point before (relative to the direction of flow through the conduit) the fracture, breach or break in an intact area of the conduit; attaching before (relative to the direction of flow through the jacket) the jacket an injector device; and activating the thermal transfer system or the injector or both for a sufficient time to form a frozen plug of fluid that prevents flow of the fluid through the conduit. In some methods, the thermal transfer system can be maintained in active thermal exchange until repairs can be made to the conduit. The method also can include increasing the temperature of the liquid cryogen thermal transfer fluid so that it donates thermal energy to the conduit, thereby melting the frozen plug and restoring flow of the fluid through the pipe.

Also provided are methods for temporarily isolating an oil well, the methods including the steps of activating a thermal transfer system attached to a portion of a producing tubular in an oil well so that it is in thermal contact with at least one portion of the producing tubular, and activating an injector module installed on the conduit so that when activated the injection device injects a cryogenic injection composition provided herein into the fluid, such as oil in the producing tubular, where the injection of the cryogenic injection composition into the oil reduces the temperature of the oil before the comes into contact with the area of the producing tubular to which the jacket of the thermal transfer system is attached, and the jacket extracts sufficient thermal energy from the oil that the oil or components in the oil freezes and forms a plug that reversibly attaches to the side walls of the producing tubular.

Also provided are methods to form a temporarily frozen plug of fluid, such as oil or gas, in a conduit, such as a well, in order to stop the flow of fluid through the conduit. In some methods, the plug serves to temporarily halt to production in an oil well. The oil well can be an above-ground pipeline, or the oil well can be off-shore, and can be a deep sea oil well. There are many times when the flow of a fluid through a conduit, such as oil through a well, needs to be stopped. For example, the flow of oil in offshore oil well during storm conditions, or while performing maintenance on wellheads, or as an emergency shut off in case of a catastrophic event in which the conduit is damaged or ruptured, requires the use of a plug of some sort to stop the flow. The cryogenic injection compositions provided herein can be used to form a thermally reversible plug in wells on the surface or at any depth, such as at about 250 feet below the mud line (i.e., 250 feet below the ocean floor) or in deep water applications, in which floating drill ships or semi-submersible rigs can operate in water depths of 6,000 feet or more. Accordingly, provided are methods of producing a frozen plug in a fluid, where the method includes introduction of a cryogenic injection composition provided herein into the fluid. The cryogenic injector fluid can be injected into the fluid until the fluid becomes viscous or until the fluid resists flow or the fluid begins to freeze or the fluid becomes solid.

E. HIGH PRESSURE ENVIRONMENTS

In some applications, the conduit containing a fluid the flow of which is to be modulated can be in an underwater location, and thus subject to higher than atmospheric pressure. For example, for deep sea drilling applications, high pressures exist at depths of deep sea drilling, including depths of about 7,000 feet or more under water. The methods provided herein can be used to introduce negative thermal energy into a fluid within a conduit at any pressure, such as at any depth underwater. The injection of the frozen beads introduces negative thermal energy into the fluid and does not rely on the heat of vaporization of a liquid cryogen. Injection of a surfactant into the fluid promotes more uniform thermal energy transfer throughout the fluid, particularly in a hydrocarbon-containing fluid. The cooling system can be used to form reversible frozen plugs in conduits, such as pipes, including large diameter (greater than 9", such as between 10" and 70") as well as sub-surface ocean pipes.

When the method is used underwater, such as on the ocean floor, the heat transfer system and/or injection device can be isolated from the environment. For example, the heat transfer system and/or injection device can be enclosed in a pressure vessel or housing to minimize or eliminate exposure to water and to allow regulation of the pressure within the vessel or housing. The heat transfer system and/or injection device can be configured for easy installation on a conduit by a diver or by a remotely operated device. For example, the heat transfer system and/or injection device can include a housing that allows automated attachment of the heat transfer system and/or injection device to the conduit. For example, the housing can include projections, depressions, connectors or hooks that can be engaged and manipulated by a robotic arm of a subsea vehicle, a remotely operated vehicle or other a remotely operable manipulation device. Robotic arm technology is well known in the art (see U.S. Pat. Nos. 5,019,761 and 7,783,384).

Any areas of the system exposed to the environment can be insulated to minimize heat gain to the conduit and/or fluid therein from the surrounding environment. Any thermally non-conducting material known to those of skill in the art suitable for the environment can be used as an insulator. Example of materials that are non-thermally conducting include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof and solid thermal insulators, such as silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof. For some applications, such as underwater applications, including deep sea drilling applications, the thermal non-conductor would be made of a solid material or a material resistant to deformation and/or structural failure under pressure. For example, the insulation can include a solid thermal insulator. Examples of solid thermal insulators (thermal non-conductors) include, e.g., silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof.

The micron or submicron frozen beads, particularly those containing a material having a high latent heat of fusion or latent heat of sublimation, can absorb thermal energy from the fluid within the conduit and melt, releasing the particles, such as particles of thermally conductive material and/or particles of material having a high latent heat of fusion or latent heat of sublimation. The released particles can act as nucleation sites for localized rheological changes and/or freezing of the fluid within the conduit. In addition, non-gas thermal energy transfer medium, such as micron or submicron particles of a material having a high latent heat of fusion, has a much higher thermo-conductivity than a gas thermal energy transfer medium. In an evaporative thermal energy transfer system such as can be established using a liquid cryogen, e.g., liquid nitrogen or liquid argon, the evaporation of the liquid cryogen into a gas is effective for thermal energy transfer, but the resulting gas can serve as an insulating layer, thereby reducing the effectiveness of thermal energy transfer.

Thermal energy can be transferred rapidly and efficiently out of the fluid within the conduit to the particles of high latent heat of fusion material, or particles high latent heat of sublimation material, or a combination thereof, resulting in an efficient high thermal energy transfer rate and thus potentially a higher freezing rate than can be achieved by a liquid-to-gas refrigerant phase change alone. The micron or submicron particles released from the frozen beads rapidly absorb thermal energy, and the absorption of thermal energy as latent energy for conversion from solid-to-liquid or solid-to-gas, depending on the composition of the particles, efficiently transfers thermal energy away from the fluid within the conduit and can be used to trigger formation of a solid plug of frozen fluid within the conduit. The micron or submicron particles released from the frozen beads increases the surface area available for thermal energy flux out of the fluid within the conduit. Thermal transfer rates, and ultimately freezing rates, can be increased by the extremely high surface to volume ratio of the frozen high latent heat of fusion or latent heat of sublimation particles contained in the frozen beads.

F. PRESSURIZED CRYOGEN AS THERMAL TRANSFER FLUID

Pipe freezing is an established technique for the temporary isolation of a section of a pipe, generally by placing a substance, such as water, or device in an area to be frozen, stopping flow of the fluid within the pipe and surrounding the pipe with a cooling medium. In some instances, a compressed liquid cryogen, typically liquid nitrogen or carbon dioxide, is used to freeze the pipe by allowing the liquid cryogen to vaporize upon contact with the conduit to absorb heat of the pipe and its contents. The resulting nitrogen or carbon dioxide gas generally is vented to the atmosphere. For each job, a sufficient supply of the cryogen, in liquid form, must be on hand to freeze the pipe. Use of liquid cryogens are attractive because the boiling point of most cryogens generally is below the temperature necessary to freeze the fluid in a pipe by forming a plug, generally of frozen water, and liquid cryogens generally provide high rates of heat extraction.

One of the problems associated with use of a cryogen to cool a pipe is the Leidenfrost effect observed with cryogenic liquids, such as liquid argon or liquid nitrogen. The Leidenfrost effect is a phenomenon observed in liquids in contact or in very close contact with a mass significantly hotter than the liquid's boiling point. When the liquid is in close proximity to a mass significantly hotter than the liquid's boiling point, the liquid boils and produces an insulating vapor layer that minimizes liquid insulated by the vapor layer from coming into contact with the warmer mass, thereby preventing that liquid from boiling and thus interferes with thermal transfer.

Another hurdle to using liquid cryogen fluids to directly cool a conduit is the formation of large temperature gradients and thermal stresses in the conduit, particularly in an area of direct application of the cryogen. Many pipes are made from ferritic steels have a tough-to-brittle transition temperature above the boiling point of many liquid cryogens. The thermal stress associated with the rapid cooling afforded by the cryogen can result in cracks or ruptures in the conduit. In addition, cryogenic fluid tanks can require a significant amount of human intervention to keep them operational.

Provided herein are methods and thermal transfer systems for cooling a conduit and a fluid therein using a pressurized liquid cryogen as a thermal transfer fluid. Instead of depending on the heat of vaporization of the liquid cryogen to rapidly cool the conduit, pressurized liquid cryogen is used as a non-combustible efficient heat transfer fluid that is cooled by any refrigeration method known in the art, including standard compression system methods. Because the systems and methods provided herein do not require vaporization of the liquid cryogen in order to directly cool the conduit, prior art problems associated with the Leidenfrost effect are avoided. The circulating liquid cryogen thermal transfer fluid removes thermal energy from the conduit, and the rate of removal of the thermal energy from the conduit and fluid contained therein can be done in a controlled manner, thereby minimizing or obviating thermal stress induction in the conduit.

In the systems and methods provided herein, a pressurized liquid cryogen is in thermal communication with the conduit. The pressurized liquid cryogen can surround and be in physical contact with at least a portion of the conduit. The pressurized liquid cryogen also can be containing in piping that surrounds and is in physical contact with at least a portion of the conduit. The pressurized liquid cryogen is in a recirculating circuit that includes a pump for circulating the liquid cryogen through the circuit and a jacket in thermal communication with the conduit. The jacket has a cold supply port and a warm return vent. The circuit also includes a cooling unit, through which the warmed liquid cryogen thermal transfer fluid from the jacket in thermal communication with the conduit enters, transferring heat away from the liquid cryogen thermal transfer fluid and thus cooling the liquid cryogen thermal transfer fluid, and the cooled liquid cryogen thermal transfer fluid is returned to the jacket via the cold supply port.

The cooling unit can include any heat exchange unit or refrigeration device or refrigeration system known in the art. The refrigeration systems can obviate the need for inventories of liquefied cryogens generally used in the prior art system, since the cryogen in the present systems and methods is contained in a recirculating loop. The is particularly advantageous for sub-sea applications and for freezing large diameter pipes and other operations that may require long periods of thermal extraction from the conduit in order to form a plug.

Examples of refrigeration systems include vapor compression refrigeration systems, especially with a single stage or rotary compressor, heat exchange, magnetic refrigeration, cryogenic cooling and absorption systems. Heat exchange units are well known in the art (e.g., see U.S. Pat. Nos. 7,441,412; 7,407,600; 7,378,065; 7,272,951; 7,263,852; 7,069,981; 7,028,768; 7,013,668; 6,185,953; 5,787,722 and 5,582,239). Magnetic refrigeration is a cooling technology based on the magnetocaloric effect. Devices that use magnetic refrigeration are well known in the art (e.g., see U.S. Pat. Nos. 7,603,865; 7,596,955; 7,481,064 and 7,114,340, and U.S. Pat. Pub. Nos. US20100071383, US20090217675, US20090158749, US20090019860 and US20070144181). Cryogenic cooling systems also are known in the art (e.g., see U.S. Pat. Nos. 7,921,657; 7,415,830; 7,273,479; 7,185, 501 and 6,658,864). Vapor-compression refrigeration systems are preferred. In some instance, a self-contained compressor driven refrigeration system is included in the system.

Generally, vapor-compression refrigeration systems include an evaporator, a compressor, a condenser, and an expansion device. A vapor-compression cycle re-uses refrigerant in multiple steps producing a cooling effect in one step and a heating effect in a different step. The cycle can be described simply as follows. Liquid refrigerant enters an evaporator through an expansion device, and the liquid refrigerant boils in the evaporator at a low temperature to form a gas and produce cooling. The low-pressure gas enters a compressor where the gas is compressed to raise its pressure and temperature. The higher-pressure (compressed) gaseous refrigerant then enters the condenser in which the refrigerant condenses and discharges its heat to the environment. The refrigerant returns to the expansion device through which the liquid expands from the higher-pressure level in the condenser to the low-pressure level in the evaporator, thus repeating the cycle.

In the methods and systems provided herein, the liquid cryogen heat transfer fluid can pass through the evaporation chamber of a vapor compression refrigeration system. An exemplary depiction is shown in FIG. 1. A conduit 1 is fitted with a jacket 2 through which the liquid cryogen heat transfer fluid flows, the flow of which can be regulated by pump 5 and valves 6 and 8. The jacket 2 can include instrumentation to monitor the temperature (conduit as well as heat transfer fluid and the jacket). It also can include a plug closure detection system, such as an acoustic based system known in the art. The jacket 2 can include thermal panels. Thermal panels can increase the heat transfer surface of the jacket 2. Thermal panels are commercially available in a variety of double and multi-wall forms with high surface-to-volume ratios.

The liquid cryogen heat transfer fluid circuit includes a coolant input port 3 into the jacket 2 and a warmed fluid vent 4 which subsequently is attached to the evaporation chamber 7 of refrigeration device 13 through a control valve 8. The evaporator chamber 7 as shown contains a single circuit, but could be divided into a plurality of circuits to ensure even cooling. The liquid cryogen heat transfer fluid passes through the evaporation chamber 7 and is cooled, and the cooled liquid cryogen heat transfer fluid passes control valve 6 prior to entering pump 5, via which the cycle repeats. The system can include tubing for fluid connection of the evaporation chamber with refrigeration unit and/or compressor and/or pumps to allow for flow of the liquid cryogen heat transfer fluid, and can include one or more flow-control metering valves that can control the flow of the liquid cryogen heat transfer fluid. The system also can include blow-out valves if excess pressure within the system occurs. Various vent valves also can be included in the system.

Passage of the heat transfer fluid through the evaporation chamber allows increased cooling efficiency as well as temperature control of the heat transfer fluid. The removal of thermal energy from the conduit and the fluid therein via the liquid cryogen thermal transfer fluid allows the control of the temperature of the thermal transfer fluid in contact with the conduit as well as the cooling rate to which the conduit is subjected. The liquid cryogen heat transfer fluid increases the usable temperature range of the system, since it has an extremely low boiling temperature and is capable of transferring thermal energy very efficiently. Cooling the liquid cryogen heat transfer fluid using, e.g., an evaporation chamber of a refrigeration device, or a heat-exchanger coil, and then circulating the chilled heat transfer fluid through the jacket on the conduit allows for controlled temperature freezes of the conduit and its contents.

The source of cooling power, such as a refrigeration unit, can be positioned so that it is in close vicinity to the conduit from which thermal energy is to be extracted. By positioning the refrigeration unit in close proximity to the conduit cooling system, the length of hoses or pipes from the refrigeration unit to the thermal extraction unit can be minimized. For example, if the conduit to be frozen is located on the seabed, prior art cooling sources generally are located on a ship or platform on the surface and are connected to the cooling unit via hoses or pipes, which can be difficult to maintain during periods of rough seas. Remote sources of cooling power also can be used.

The cooling system can be used to freezing plugs in conduits, such as pipes, including large diameter (greater than 9", such as between 10" and 70") as well as sub-surface ocean pipes. The cooling system includes a jacket that envelopes a section of the conduit, as discussed above. A recycling refrigeration unit is connected to the liquid cryogen heat transfer fluid circuit and the heat transfer fluid circuit passes through the evaporation chamber. For sub-surface ocean environments, a submersible housing can be used to enclose the refrigeration unit.

Also provided are methods for reversibly plugging a conduit. The method includes surrounding a portion of conduit with a jacket, wherein the jacket is part of a liquid cryogen heat transfer fluid circuit that passes through an evaporation chamber of a refrigeration unit, and decreasing the temperature of the heat transfer fluid until a plug is formed in the conduit. The liquid cryogen heat transfer fluid of a defined temperature or combination of temperatures is cycled through the jacket. The circuit of the liquid cryogen heat transfer fluid can be reversed, thereby allowing controlled melting of the plug and restoration of flow in the conduit. Alternatively, or in addition, electrical heaters can be incorporated on the jacket to warm the liquid cryogen heat transfer fluid and allow controlled melting of the plug and restoration of flow in the conduit.

The system is suitable for use both sub-sea and topside on the surface. Since the system can be used on above-ground conduit as well as on sub-ocean surface conduits, the system can be configured to be manually operated or to be remotely controlled, such as by a computer programmed with appropriate software. The thermal energy transfer system can be in communication with a computer module programmed to remotely operate the thermal extraction system. The system can include thermal monitoring devices that can be attached to one or more points of the conduit to monitor a thermal gradient and can be included at the interface between the jacket and the conduit to monitor the temperature at the interface. The system can include a computer that controls or is in communication with the jacket and the thermal monitoring devices. The system can monitor the thermal gradient and/or rate of thermal exchange and control either or both in order to minimize or eliminate thermal stress on the conduit. Remote control of the system could include start up and shut down of the refrigeration unit, motor speed adjustment and valve actuation. The system also can include temperature and pressure monitoring devices, which can be monitored or accessed remotely via the computer.

When the cooling system is to operated under water, such as on the ocean floor, a fully submersible refrigeration unit can be used. Control of the submerged refrigerator system can be provided from the surface, e.g. from a vessel or platform, such as by attached wires or cables that can provide power, communication and monitoring between the thermal energy extraction system and the surface. The refrigeration unit can be enclosed in a pressure vessel or housing to minimize exposure to water and to allow regulation of the pressure within the vessel or housing. The jacket can be configured for easy installation on a conduit by a diver or by a remotely operated device. The refrigeration unit and its compressor drive motor be powered by a supply from a surface vessel or platform or via batteries or a submerged generating system.

The thermal energy transfer device provided herein can include a housing that allows automated attachment of the thermal transfer device to the conduit. For example, the housing can include projections, depressions, connectors or hooks that can be engaged and manipulated by a robotic arm of a subsea vehicle, a remotely operated vehicle or other a remotely operable manipulation device. Robotic arm technology is well known in the art (see U.S. Pat. Nos. 5,019,761 and 7,783,384).

Areas of the system exposed to the environment generally are insulated to minimize heat gain to the freeze area from the surrounding environment. Any thermally non-conducting material known to those of skill in the art suitable for the environment can be used as an insulator. Example of materials that are non-thermally conducting include acrylic glass, bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester and combinations thereof and solid thermal insulators, such as silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof. For some applications, such as underwater applications, including deep sea drilling applications, the thermal non-conductor would be made of a solid material or a material resistant to deformation and/or structural failure under pressure. For example, the insulation can include a solid thermal insulator. Examples of solid thermal insulators (thermal non-conductors) include, e.g., silicon nitride ($Si_3N_4$), calcium silicate, low-density, high-purity silica ceramic, porous alumina, borosilicate glass, silica aerogel (foamed glass), ceramic/glass composites, fibrous refractory composite insulation, polyurea based aerogel, graphite, mullite, glass-filled silicone polymers or combinations thereof.

The conduit can be in any orientation with respect to the ground. For example, the conduit can be perpendicular to the ground, e.g., the general orientation of a producing oil well. The conduit also can be parallel to the ground, e.g., the general orientation of an over-ground transfer pipeline. The conduit also can be oriented at any angle with respect to a surface, with a flat ground considered to be horizontal at zero degrees of incline, and can be used in horizontal or directional drilling. For example, the conduit can be oriented between 1° and 89° from horizontal, such as 10°, 15°, 20°, 25°, 30°, 35°. 40°, 45°, 50°, 55°, 60°, 65°, 70°, 75°, 80° or 85° from horizontal.

The jacket can be a single continuous apparatus that encircles or envelops the conduit or can comprise 2, 3, 4 or more interconnecting segments, such as arcs, that when assembled and interconnected, substantially or completely encircle or envelop the outer diameter of the conduit. When the conduit is a pipe with a circular shape, the jacket can be a single complete circular apparatus, two interconnecting semi-circular segments or can include several arc segments that when connected or interconnected encircle the pipe.

The jacket can include a thermal conductor surface that is attached to or in thermal communication with the conduit. The thermal conductor surface can be made of any thermally conducting material known to those skilled in the art. Examples of such materials include copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof. In some instances, the thermally conductive material can be formed of a single metallic conductor or multiple metallic conductors. The solid thermal conductors can include substantially pure copper, copper alloys, substantially pure aluminum, aluminum alloys, substantially pure silver, silver alloys, substantially pure gold, and gold alloys and mixtures thereof.

With reference to the exemplary system depicted in FIG. 1, a quick-connect connection can be included on each of valves 9 and 10 to allow for quick set up or replacement of the refrigeration unit. Quick connect mechanisms are well known in the art (e.g., see U.S. Pat. No. 4,597,699). Valves 9 and 10 can prevent elements of the environment from entering the system. For example, the valves 9 and 10 can be designed to prevent air or water from entering the segments of the heat exchange units while the units are being installed around the conduit.

The jacket can include one or more thermally conducting fins. The thermal conducting fins can be positioned at any location near or in thermal contact with the conduit to increase the heat conducting area of the jacket, thereby allowing the thermal energy of the conduit and its contents to more rapidly transfer to the liquid cryogen heat transfer fluid. The thermal conducting fins can be positioned axially or longitudinally. The thermal conducting fins can be notched or perforated or both to prevent trapping of bubbles or formation of a dead space.

In some instances, the thermal conducting fins can be configured longitudinally or radially about the conduit. The length of the thermal conducting fins can be varied, and can include fins that extend the length of the space within the jacket, thereby creating one or more channels. One or more of the so formed channels can serve as a separate circuit for the to the liquid cryogen heat transfer fluid to pass through the jacket, thereby establishing a second (or more) liquid cryogen heat transfer fluid circuit. Multiple such channels also can be so formed, and the channels can be adjacent or staggered around the radius of the inner tubular or conduit. The multiple channels formed by the thermal conducting fins so configured can be used as separate circuits for the liquid cryogen heat transfer fluid to pass through the jacket and thus allow greater control of the freezing and/or warming and/or refreezing process within the jacket.

The jacket can be of any diameter or length. The selection of the diameter and length of the jacket can be predicated on the dimensions of the conduit to which the jacket is to be attached and from which thermal energy is to be extracted or the rate of flow of fluid flowing through the conduit or combinations thereof. For example, the outer diameter of tubing and piping encountered in many well applications can vary from 1 inch to 50 inches or more. The length of a single riser or flow tubular in some applications can vary from about 5 feet to about 100 feet or more, and many risers or flow tubulars can be interconnected, resulting in a pipeline that can span many thousands of feet or miles. A typical jacket can be of a length that is any portion of a riser or flow tubular, including 10%, 15%, 20%, 25%, 30%, 35%, 40%, 45%, 50%, 55%, 60%, 65%, 70%, 75%, 80%, 85%, 90%, 95% or 99%. The jacket can have a length of 2 feet, 3 feet, 4 feet, 5 feet, 6 feet, 7 feet, 8 feet, 9 feet, 10 feet, 11 feet, 12 feet, 13 feet, 14 feet, 15 feet, 16 feet, 17 feet, 18 feet, 19 feet, 20 feet, 21 feet, 22 feet, 23 feet, 24 feet, 25 feet, 26 feet, 27 feet, 28 feet, 29 feet, 30 feet, 31 feet, 32 feet, 33 feet, 34 feet, 35 feet, 36 feet, 37 feet, 38 feet, 39 feet, 40 feet, 41 feet, 42 feet, 43 feet, 44 feet, 45 feet, 46 feet, 47 feet, 48 feet, 49 feet, 50 feet, 55 feet, 60 feet, 65 feet, 70 feet, 75 feet, 80 feet, 85 feet, 90 feet, 95 feet, 100 feet, 200 feet, 300 feet, 400 feet, 500 feet, 600 feet, 700 feet, 800 feet, 900 feet, 1000 feet, 2000 feet, 3000 feet, 4000 feet, 5000 feet or a length between 2 feet and 5000 feet.

In some instances, the outer dimension of the jacket is selected so that the width of the channel formed between the inner surface of the jacket (which is in thermal communication with the conduit) and the outer surface of the jacket is between about 10% to about 500% of the diameter of the conduit. For example, in embodiments where the conduit is a pipe and the diameter of the pipe is 5 inches, the outer dimension of the heat exchange unit can be between about 5.5 inches and about 25 inches, producing a channel having a width of between about 0.5 and 20 inches.

In addition to cooling the conduit in order to form a thermal plug, such as a solid mass of ice or oil, the jacket can be used to controllably warm the conduit to ambient temperatures after repair of the conduit in order to melt the plug and restore flow while minimizing thermal stress to the conduit. Warming can be achieved by flowing liquid cryogen heat transfer fluid of a higher temperature than the conduit through the jacket. The jacket can include heating elements that when engaged and activated can increase the temperature of the conduit at the site of the plug, thereby melting the plug or decreasing the adhesion of the plug to the conduit, thereby restoring flow through the conduit.

The jacket can include heating devices arranged to provide heat unilaterally or directionally to the plug of frozen fluid formed within the conduit. This directed application of thermal energy to the conduit in proximity to the frozen plug therein allows for directed melting of the plug, such as to form a channel through the plug through which liquid fluid can flow. This prevents launching the frozen plug through the conduit, and permits controlled restoration of flow through the conduit. Any heating device known in the art can be used. For example, one or more discrete, spaced-apart heating units, such as described in U.S. Pat. No. 4,849,611 can be positioned throughout the jacket, thereby allowing directed thermal energy to be applied to the conduit adjacent to the frozen plug within. Other heating devices also can be positioned within the jacket, such as Curie temperature heaters, described in U.S. Pat. No. 7,461,691, or temperature limited heaters, as described in U.S. Pat. Pub. No. 2005-0092483, or conductor-in-conduit heat sources as described in U.S. Pat. Pub. No. 2004-0020642, or heater strips, as described in U.S. Pat. No. 3,793,716, or resistive heating strips, as described in U.S. Pat. No. 4,238,640. Other heating devices that can be used include those described in U.S. Pat. Nos. 7,066,730; 4,238,640; 3,971,416; and 3,814,574.

In the thermal extraction systems provided herein, the jacket can be constructed of a material resistant to any thermal stress. The liquid cryogenic heat transfer fluid contains or is liquid argon or liquid nitrogen or blends thereof. Blends of solvents with cryogens, such as liquid nitrogen or liquid helium or liquid argon or liquid neon, or with other liquified or solidified gases, such as carbon dioxide, can provide liquid cryogenic heat transfer fluids that can have a recirculating temperature range between −20° C. and −160° C.

With reference to the exemplary system depicted in FIG. 1, a cryogenic injection composition can be introduced into the fluid within the conduit 2 via use of an injector 14. The injector 14 can inject the cryogenic injection composition across a conduit wall, delivering the cryogenic injection composition into the fluid within the conduit 2. As the cryogenic injector fluid interacts with the fluid within the conduit, the cryogenic injection composition removes thermal energy from the fluid, reducing the temperature of the fluid. The injector can include one-way valves (not shown in FIG. 1) to prevent fluid from the conduit 2 from entering the injector 14 when the injector is in stand-by mode and not operating. When operating, the one-way valves can open and release the cryogenic injection composition through injector 14 directly into the fluid in the conduit 2. Because the pressure of the cryogenic injection composition exiting the injector 14 is sufficiently high, no fluid from the conduit 2 can enter into the injector 14.

The injector 14 for introducing the cryogenic injection composition into the fluid within the conduit 2 can be made of any material suitable for use at cryogenic temperatures and at the operating pressures. For example, the injector 14 can include tubing of aluminum, copper, stainless steel or cryogenically compatible polymers, such as fiber-reinforced epoxy composites and ultra-high molecular weight polyethylene or combinations of these materials. The injector can include tubing of an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463.

The injector 14 can be a tube or an opening in the side of the conduit 2. The injector 14 can include an isolation mechanism for controlling the introduction of the cryogenic injection composition into the fluid in the conduit. Any isolation mechanism known in the art can be used. In some embodiments, a check valve can be included in the injector 14. The check valve can be used as an isolation mechanism and/or can be used to prevent the back flow of fluid in the conduit 2 into the injector 14. Any cryogenic check valve that is operative at cryogenic temperatures can be used. The injector 14 can be isolated from the conduit 2 by a manually or remotely operated valve suitable to contain the type and pressure of fluid in the conduit.

The injector 14 can include other components, such as flow rate meters, flow-control metering valves, an isolation valve, an emergency shut-off valve, an over-pressure valve, a diverter valve, heating units, thermal monitoring devices and a computer module for automation of the system. The computer module can be in communication with and/or in control of heating units, valves, flow rate meters and thermal monitoring devices. A computer processor of the computer module can control flow-control metering valves to provide a flow of the cryogenic injection composition through the injector 14 into the fluid within the conduit 2.

The injector 14 and the liquid cryogenic injection composition thermal transfer fluid circuit and the refrigeration system can include tubing or piping constructed of a material and construction applicable for the environment in which the system is to be deployed. For example, for deep sea drilling applications, the tubing or piping can be engineered to resist the high water pressures that exist at depths of deep sea drilling, including depths of about 7,000 feet under water. Those skilled in the art can select the proper material and thickness or design of the piping or tubing for such applications. The piping or tubing can include radial or lateral reinforcements to withstand collapse under the pressure of the water pressures that exist at deep sea drilling depths. The piping or tubing can be manufactured to be of a thickness such that the piping or tubing is resistant to reformation or crushing by the water pressure at sea depths of deep sea drilling. The tubing can be constructed for ambient pressures and is insulated to minimize thermal contamination from the surrounding environment. For example, the injector 14 and any tubing or piping can be made of a material containing aluminum, copper, stainless steel, or cryogenically compatible polymers, such as fiber-reinforced epoxy composites and ultra-high molecular weight polyethylene or combinations of these materials. The injector 14 and any tubing or piping can be made of a material containing an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463.

The tubing can be thermally insulated from the environment using any technique known to those of skill in the art.

The tubing or piping can be encircled or enveloped in a non-thermally conductive material. The tubing or piping can be enclosed in a thermal isolation means. The thermal isolation means can include a covering fabricated of or containing a thermally non-conducting material. Examples of materials having low thermal conductivity include bitumen, cement, clay, concrete, ceramic filled corian, cork, cotton wool insulation, diatomaceous earth, epoxy, fiberglass, foam glass, glass pearls or beads, glass wool, gypsum, magnesite, magnesia insulation, mineral insulation, nylon, perlite, foamed plastic insulation, expanded polystyrene, polyurethane, porcelain, PTFE, PVC, pyrex glass, sand, silica aerogel, styrofoam, urethane foam, vermiculite, vinyl ester, non-thermally conducting gases that have a lower thermal conductivity than air, such as butane, krypton, trichloromethane, xenon, 1,1,2-trichloro-trifluoroethane, 1,2-dichlorotetrafluoro-ethane, tetrafluoroethane, argon, carbon dioxide, diethyl ether, isobutane, pentane, perfluorocyclobutane, propane and tetrafluoromethane, and liquids with low thermal conductivity, such as CFC-11, HCFC-141b, methanol, ethanol, glycerol, ether, acetone, ethylene glycol, thermally non-conducting silicone fluid containing glass, such as glass fibers or glass beads, and propylene glycol, and combinations thereof.

Flow rate monitors can be included in the jacket, and/or in the pipes or tubing that deliver the thermal transfer fluid to the jacket. The flow rate monitors can be in communication with a computer module. Data from the flow rate monitors can be used to determine the flow of liquid cryogen thermal transfer fluid through the system, particularly through the jacket, and can be used to modulate the rate of flow of liquid cryogen thermal transfer fluid through the system, either manually or automatically such as by computer control.

The thermal transfer systems provided herein also can include valves that can be used to modulate the flow of liquid cryogen thermal transfer fluid through the jacket in thermal contact with the conduit. The valves can be controlled manually or can be in communication with and/or controlled by a computer module. The computer module can modulate the flow through the system by opening or closing the valves or adjusting the degree to which one or more of the valves are open. The computer module can be in communication with flow meters of the system and can adjust the flow through the system by adjusting the valves.

One or more flow meters can be included in the liquid cryogen thermal transfer fluid circuit. The flow meter can include a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

The rate of flow of liquid cryogen thermal transfer fluid through the jacket can be manually or computer controlled, such as by adjusting one or more valves. For example, the computer module can be programmed with one of a variety of programs for controlling the valve and/or pump. For example, the controller may be programmed to utilize proportional integral (PI) control, proportional integral differential (PID) control, etc., such as, for example, described in detail in connection with a thermal mass flow meter/controller in U.S. Pat. No. 6,962,164, which is herein incorporated by reference in its entirety. In another example, the computer can be adapted to use a "model-free" adaptive control algorithm to drive one or more valves. This method includes a feedback "neuron-based" control algorithm that is independent of the particular liquid flowing in the system and does not require a priori knowledge of the dynamics of the system. At least one embodiment of this method is described in detail in U.S. Pat. No. 6,684,112, which is herein incorporated by reference in its entirety.

A communications medium can be located within the conduit, for example, within an inner annulus of the conduit or in a gun-drilled channel in the conduit or a channel formed during fabrication of the conduit. The communications medium can permit communications between the computer module, which can be located at a site remote from the refrigeration system, and one or more components of the thermal extraction system provided herein. Communications between thermal extraction system and the computer module can be performed using any suitable technique, including electromagnetic (EM) signaling, mud-pulse telemetry, switched packet networking, or connection-based electronic signaling. The communications medium can be a wire, a cable, a waveguide, a fiber, a fluid such as mud, or any other medium. The communications medium can include one or more communications paths. For example, one communications path can couple the computer module to jacket while another communications path can couple the computer module to the refrigeration unit.

The communication medium can be used to control one or more elements of the thermal extraction system, such as control valves or the refrigeration unit. The communications medium also can be used to convey data, such as temperature or pressure sensor measurements. For example, measurements from temperature sensors attached to the conduit can be sent to the computer module for further processing or analysis or storage. The methods of the present invention can be embodied in a computer-readable storage medium having a computer-readable program embodied therein for directing operation of the described system such as described above. The computer-readable program includes instructions for operating the thermal extraction system in accordance with the embodiments described above.

For some embodiments, including embodiments for use in deep sea drilling applications, the jacket that is configured to be in thermal communication with the conduit can be made of a thermally conducting metal of a thickness or cross-section or configuration sufficient to resist collapse, deformation and/or structural failure under pressure. Any metal exhibiting thermal conducting properties can be used. Exemplary metals for use as a thermal conductor include, e.g., copper, silicon, diamond deposited by vapor phase process (CVD), silver, gold, grapheme, aluminum and aluminum alloys, nickel, titanium, titanium alloys, tungsten, gold, silver and alloys thereof.

The thermal extraction device can be used in deep sea drilling operations that experience extremes in pressure and reduced temperatures. For such applications, the device can be configured to withstand the extreme pressures exerted by the water on the device. For example, for such applications, the jacket to be in thermal communication with the conduit can be engineered to withstand the pressure exerted by the water at depths of from about 1,000 feet to about 10,000 feet below sea level. It is known in the art that normal pressure increases approximately 0.465 psi per foot of depth under water (10.5 kpa per meter of depth). Thus, normal pressure at 10,000 feet under water is about 4,650 psi. Water pressure at 5,000 feet is a little over a ton per square inch (about 2,438 psi).

The fluid within the conduit can include any fluid transported through conduits or pipes. The fluid can be a liquid, a gas or combinations thereof. An exemplary liquid fluid is crude oil or produced oil from an oil well. Produced oil typically can contain some amount of water. Thus, the fluid can include crude oil, alone or in combination with water.

In some instances, in an underground oil reservoir, the ambient conditions, including the temperature and pressure of the reservoir, may result in $C_1$ to $C_8$ alkanes, including methane, ethane, propane and butane, to be dissolved in the crude oil, the proportion of which is in the form of a gas or liquid dictated by the subsurface conditions. Thus, in some instances, the liquid fluid can include dissolved gases, and can include gases that escape from the liquid as the temperature and/or pressure changes in the conduit. An exemplary fluid that is a gas is a natural gas, which can include any combination of lightweight hydrocarbons, including alkanes, alkenes and alkynes, alone or in any combination. A natural gas predominately contains methane, but also can include ethane, a propane, a butane, a pentane, higher molecular weight hydrocarbons and water vapor.

The last or several of the last strings of casing can include material that exhibits high tensile strength under cryogenic conditions, and the jacket can be affixed thereto and filled with liquid cryogen thermal transfer fluid and stay in that state until or unless needed. For example, the casings can include channels or conduits that include a cladding of high tensile strength material that is compatible with cryogenic fluids. For example, the channels in the casings can include a cladding of an alloy having a ductile fracture mode higher than steel and a brittle fracture mode lower than steel. The casings can be made of a material that exhibits high tensile strength under cryogenic conditions. For example, steel alloys, particularly steel containing Cr, Ni or Si, can exhibit a high ductile fracture mode and a low brittle fracture mode. Alloys having a ductile fracture mode higher than steel and a brittle fracture mode lower than steel are known in the art. Examples of such alloys include those described in U.S. Pat. Nos. 5,352,304; 6,183,573; 6,212,891; 7,235,212; 7,648,597 and 7,727,463.

In some applications, such as in deep sea and sea floor applications, the conduit and the fluid within the conduit are under pressure. In such applications, evaporative cooling that normally can be achieved by the conversion of a liquid, such as liquid argon or liquid nitrogen, into a gas is minimized or prevented, depending on the pressure of the conduit or the fluid within the conduit. When the pressure is high, latent heat can be drawn from the fluid inside the conduit by a liquid cryogen, but the liquid cryogen cannot be converted into a gas, and thus thermal transfer from the fluid in the conduit to the liquid cryogen is not as high as can be achieved under lower pressure conditions. In order to address this potential decrease or loss of heat transfer ability of cryogen injection, the cryogenic injection composition can include particles having a high latent heat of fusion, such as solid frozen particles, or a high heat of sublimation, such as solid particles of carbon dioxide. The particles can be of any size or geometry, and preferably the particles are micron or submicron in size. Inclusion of the particles having a high latent heat of fusion or heat of sublimation results in a injection composition having a higher thermal transfer capacity per mass of fluid than can be achieved under the same conditions without the particles of a high latent heat of fusion material or heat of sublimation material. When the injection composition containing the particles of a high latent heat of fusion material is introduced into the fluid within the conduit, the particles absorb thermal energy, particularly heat of fusion, in which the frozen particles absorb sufficient energy from the fluid to transition from a frozen state to a liquid state. When the cryogenic injection composition containing the particles of a high latent heat of sublimation material is introduced into the fluid within the conduit, the particles absorb thermal energy, in which the solid particles absorb sufficient energy from the fluid to transition from a solid state to a gas state.

The cryogenic injection composition can be introduced into the conduit in order to reduce the temperature of at least a portion of the conduit. The cryogenic injection composition can be introduced into the conduit in order to reduce the temperature of at least some portion of the fluid within the conduit, or both the fluid within the conduit and the conduit. By reducing the temperature of at least a portion of the fluid in the conduit, the viscosity of the fluid can be increased. The viscosity can increase due to the temperature dependence of the liquid viscosity, decreasing as the temperature decreases. This reduction in viscosity can reduce the flow of fluid through the conduit, and the reduced flow can result in increased thermal energy transfer from the fluid, further reducing the temperature of the fluid and slowing flow of the fluid. As the amount of thermal energy is removed from an increasing static, slower moving fluid, the temperature of the fluid can be reduced to a point at which flow stops or occurs only over an extended period of time. Increased removal of thermal energy from the fluid also can result in solidification of the fluid. Solidification of the fluid within the conduit can result in the formation of an ice plug, which can be thermally reversed by application of thermal energy.

The micron or submicron frozen particles of a material having a high latent heat of fusion or latent heat of sublimation in the cryogenic injection composition can act as nucleation sites for localized rheological changes and/or freezing of the fluid within the conduit. In addition, non-gas thermal energy transfer medium, such as micron or submicron frozen particles of a material having a high latent heat of fusion, has a much higher thermo-conductivity than a gas thermal energy transfer medium. In an evaporative thermal energy transfer system such as can be established using a liquid cryogen, e.g., liquid nitrogen or liquid argon, the evaporation of the liquid cryogen into a gas is effective for thermal energy transfer, but the resulting gas can serve as an insulating layer, thereby reducing the effectiveness of thermal energy transfer. A well-known phenomenon related to the insulating effect of the resulting gas from evaporation of a cryogen liquid is the Leidenfrost effect. Including the micron or submicron particles in the cryogenic injection composition can reduce or eliminate the Leidenfrost effect of the cryogen when the cryogenic injection composition comes into contact with the fluid within the conduit.

The cryogenic injection compositions can include micron or submicron particles, including nanoparticles, that facilitate thermal energy transfer out of a fluid within a conduit. Particles having different properties can be included in the composition. Particles can be selected to have a specific heat capacity that is greater than 0.1, or greater than 0.5, or greater than 1, or greater than 2. Particles also can be selected to have a specific heat capacity between about 0.25 and 2.5, or between about 0.2 and 2, or between about 0.1 and 1. For example, the particles can be microparticles or nanoparticles of or coated with paraffin wax, frozen water, lithium, solid polyethylene, beryllium, aluminum, glass, crushed granite, graphite, silica, titanium, iron, chromium, zinc, copper, silver, cadmium, tin, tungsten, gold, bismuth or solid carbon dioxide or combinations thereof. The particles can be carbon nanotubes or carbon fullerenes.

Thermal energy can be transferred more rapidly and efficiently out of the fluid within the conduit to the frozen high latent heat of fusion particles, or high latent heat of sublimation particles, or a combination thereof, resulting in a higher thermal energy transfer rate and thus potentially a higher freezing rate than can be achieved by a liquid-to-gas refrigerant phase change alone. The micron or submicron particles rapidly absorb thermal energy, and the absorption of thermal energy as latent energy for conversion from solid-to-liquid or solid-to-gas, depending on the composition of the particles, efficiently transfers thermal energy away from the fluid within the conduit. The fluid within the conduit that is exposed to the liquid cryogen component of the injection composition makes direct contact with the surface of the cryogen, typically completely or partially surrounding at least some portion of the cryogen. Including the micron or submicron particles in the injection composition increases the surface area available for thermal energy flux into the injection composition and out of the fluid within the conduit.

Thermal transfer rates, and ultimately freezing rates, can be increased by the extremely high surface to volume ratio of the frozen high latent heat of fusion or latent heat of sublimation particles contained in the injection composition. The temperature of the injection composition containing frozen high latent heat of fusion particles or latent heat of sublimation particles can maintain a relatively constant temperature due to the latent heat of fusion of the frozen particles or the latent heat of sublimation of the particles in the injection composition.

At pressures at depth, the temperature of the injection composition can be coaled to a desired temperature by any refrigeration or cooling device, unit or mechanism known in the art. For example, a closed loop on-site refrigeration unit can be used to achieve a desired temperature of the injection composition. In some applications, a thermal capacitance unit can be used to reduce the thermal energy of the injection composition. Thermal capacitance units or cooling batteries are known in the art and used to cool superconducting magnets (e.g., see U.S. Pat. Nos. 6,708,511 and 7,497,086). In some applications, magnetic refrigeration can be used to reduce the thermal energy of the injection composition. Magnetic refrigeration is a result of the magneto-caloric effect obtained when a changing magnetic field is applied to a material. The effect of the field modulates the degree of magnetic order, resulting in heating or cooling of the crystal lattice of the material. A cooling effect can be achieved by repeated cycling the magnetic field applied to the magneto-caloric refrigerant from zero to a maximum value and back to zero. Magnetic refrigeration is well known in the art (e.g., see U.S. Pat. Nos. 8,104,293; 8,099,964; 8,048,236; 7,603,865; 7,481,064; and 6,526,759). Other examples of refrigeration systems include vapor compression refrigeration systems, especially with a single stage or rotary compressor, heat exchange, magnetic refrigeration, cryogenic cooling and absorption systems. Heat exchange units are well known in the art (e.g., see U.S. Pat. Nos. 7,441,412; 7,407,600; 7,378,065; 7,272,951; 7,263,852; 7,069,981; 7,028,768; 7,013,668; 6,185,953; 5,787,722 and 5,582,239). Magnetic refrigeration is a cooling technology based on the magneto-caloric effect. Cryogenic cooling systems also are known in the art (e.g., see U.S. Pat. Nos. 7,921,657; 7,415,830; 7,273,479; 7,185,501 and 6,658,864). In some instances, a self-contained compressor driven refrigeration system isolated from the environment can be included in the system.

When the system is to be used underwater, particularly in deep sea drilling applications, the refrigeration unit can be constructed of material sufficient to withstand the pressures at depth, including the pressures exerted by water at depths of up to 7,000 feet under water. Alternatively, when the system is to be used underwater, the refrigeration unit can be isolated from the external water environment in a module constructed of material sufficient to withstand the pressures at depth. Those skilled in undersea construction are familiar with the required mechanics necessary for the construction of a module capable of containing a refrigerant and withstanding the ambient water pressures at depth.

Exemplary materials that can withstand the reduced temperatures and elevated pressures of deep sea well applications include, but are not limited to, steel, fiberglass, graphite, plastics, carbon fibers and combinations thereof. For example, steel alloys, particularly steel containing Cr, Ni or Si, can exhibit a high ductile fracture mode and a low brittle fracture mode. Alloys having a ductile fracture mode higher than steel and a brittle fracture mode lower than steel are known in the art and also can be used. Exemplary alloys include those described in U.S. Pat. Nos. 5,352,304; 6,183,573; 6,212,891; 7,235,212; 7,648,597 and 7,727,463. Carbon fiber/binder wrapped containers using binders such as, e.g., epoxies such as polyacrylonitrile (PAN), resins such as polyesters and combinations thereof also can be used. Carbon fibers that are both strong and lightweight, as compared to steel, include, but are not limited to graphite, carbon composites, codified solid fibers, laminated carbon fibers, PAN-based carbon fibers, pitch-based carbon fibers and combinations thereof. The module can include an external coating containing carbon fibers. The coating can be configured so that the carbon fibers align diagonally about the integument of the module. Any carbon fiber can be used, such as, e.g., graphite, carbon composites, codified solid fibers, laminated carbon fibers, PAN-based carbon fibers, pitch-based carbon fibers, and combinations thereof.

The injection composition can include as a cryogen any refrigerant that can transfer thermal energy under the conditions of use. Exemplary liquid refrigerant can contain liquid or solid carbon dioxide, liquid ammonia, liquified natural gas or chlorofluorohydrocarbons or fluorohydrocarbons, liquified gases such as liquid argon, neon, nitrogen, nitrous oxide, oxygen, or a mixture thereof. In high pressure applications, such as at depth in deep sea drilling applications, the cryogen in the injection composition can be at a temperature sufficient for thermal transfer. For example, the temperature of the injection composition can be less than $-40°$ C., or less than $-80°$ C., or less than $-100°$ C., or less than $-150°$ C.

The cryogenic injection composition also can contain one or more solvents. In some applications, the presence of one or more solvents can modulate the latent heat or fusion or latent heat of sublimation of a compound by modifying the packing of the molecules of the material. For example, addition of solvent to a cryogenic injection composition containing micron or submicron particles of solid carbon dioxide can modulate the latent heat of sublimation of the particles. Exemplary solvents that can be included in the cryogenic injection composition include acetaldehyde, acetone, acetonitrile, bromo-benzene, butanol, butyl acetate, n-butyl amine, t-butyl amine, carbitol acetate, carbon tetrachloride, chlorobenzene, chloroform, cyclohexane, cyclohexanone, cyclo-pentane, m-dichlorobenzene, diethyl carbitol, diethyl ether, ethanol, ethyl acetate, heptane, hexane, hexanol, isooctane, isopentane, isopropanol, methanol, nitromethane, n-octane, octanol, m-pentane, propanol, trichloroethylene, m-xylene and combinations thereof.

The cryogenic injection composition also can contain one or more surfactants. Any amphoteric, anionic, cationic, zwitterionic, non-ionic surfactant or silicone surfactant can be included in the cryogenic injection composition. Exemplary amphoteric surfactants include betaines, sulphobetaines, imidazoline betaines and alkyl amido propyl betaines. Exemplary nonionic surfactants include ethoxylated nonionic surfactants selected from among condensation products of ethylene oxide with aliphatic alcohols having from 8 to 22 carbon atoms in either straight or branched chain configuration as well as condensation products of ethylene oxide with nonyl phenol, phenol, butyl phenol, di-nonyl phenol, octyl phenol or other phenols, sorbitan esters and amine oxides, ethoxylated $C_{10}$-$C_{20}$ alcohols, fatty acids, fatty amines or glyceryl esters, alkyl polyglycosides, methyl glucoside esters, as well as blends of such nonionic surfactants. Exemplary anionic surfactants include alkali metal alkyl sulfates, alkyl or alkylaryl sulfonates, linear or branched alkyl ether sulfates and sulfonates, alcohol polypropoxylated and/or polyethoxylated sulfates, alkyl or alkylaryl disulfonates, alkyl disulfates, alkyl sulphosuccinates, alkyl ether sulfates, linear and branched ether sulfates and mixtures thereof. Exemplary cationic surfactants include arginine methyl esters, alkanolamines and alkylenediamides, and mixtures thereof.

The amount of surfactant that can be included in the cryogenic injection composition can be between about 0.1 wt. % and about 25 wt. %. In some applications, the amount of surfactant in the composition can be between 0.2 wt. % and 10 wt. %, or between 0.5 wt. % and 5 wt. %.

The cryogenic injection composition can be introduced into the fluid within the conduit via use of an injector. The injector can inject the cryogenic injection composition across a conduit wall, such as a well casing, delivering the cryogenic injection composition into the fluid within the conduit. As the cryogenic injector fluid interacts with the fluid within the conduit, the composition removes thermal energy from the fluid, reducing the temperature of the fluid. The injector can include one-way valves to prevent fluid from the conduit from entering the injector when the injector is in stand-by and not operating. When operating, the one-way valves can open and release the cryogenic injection composition directly into, the fluid in the conduit, such as oil in a production tubular in an oil well. Because the pressure of the cryogenic injection composition exiting the injector is sufficiently high, no fluid from the conduit can enter into the injector.

The injector for introducing the cryogenic injection composition into the fluid within the conduit can be made of any material suitable for use at cryogenic temperatures and operating pressures. For example, the injector can include tubing of stainless steel, aluminum, copper, or cryogenically compatible polymers, such as fiber-reinforced epoxy composites and ultra-high molecular weight polyethylene or combinations of these materials. The injector can include tubing of an alloy having a ductile fracture mode higher than steel and a brittle fracture mode lower than steel. Exemplary alloys include those described in U.S. Pat. Nos. 5,352,304; 6,183,573; 6,212,891; 7,235,212; 7,648,597 and 7,727,463.

The injector can be a tube or an opening in the side of the conduit, such as a tube or an opening in the side of a flow tubular. The injector can include a port through which cryogenic injection composition is introduced into the conduit so that the cryogenic injection composition comes into contact with the fluid within the conduit. The injector can include an isolation mechanism for controlling the introduction of the cryogenic injection composition into the fluid in the conduit. Any isolation mechanism known in the art can be used. In some embodiments, a check valve can be included in the injector port. The check valve can be used as an isolation mechanism and/or can be used to prevent the back flow of fluid in the conduit, such as oil in the flow tubular, into the injector. Any cryogenic check valve that is operative at cryogenic temperatures can be used. The injector can be isolated from the conduit by a manually or remotely operated valve suitable to contain the type and pressure of fluid in the conduit.

The injector for introducing the cryogenic injection composition into the fluid within the conduit can include a flow rate meter. The flow rate meter can be in communication with a computer module. Data from the flow rate meter can be used to determine the flow of cryogenic injection composition introduced into the conduit, and can be used to modulate the rate of flow of the cryogenic injection composition through the injector and into the fluid within the conduit. Modulation of flow can be accomplished either manually or automatically by computer control. Any flow meter known in the art can be used in the system. The flow meter can include a paddle wheel flow meter, a turbine flow meter, a magnetic flow meter, optical sensors, electromagnetic velocity sensors, coriolis force flow meters, thermal flow meters, ultrasonic flow meters or any other type of flow meter known in the art. Examples of flow meters known in the art include U.S. Pat. Nos. 7,730,777; 7,707,898; 4,934,196; 4,422,338 and RE 31,450, and U.S. Pat. Appl. Pubs. 2009-0281671, 2005-0288873 and 2004-0244498.

The injector for introducing the cryogenic injection composition into the fluid within the conduit can include one or more heating units. The heating units can be in thermal communication with the injectors and can be used to modulate the temperature of the injector during operation. Any heating unit known in the art can be used. Exemplary heaters include, e.g., Curie temperature heaters (see U.S. Pat. No. 7,461,691), temperature limited heaters (see U.S. Pat. Pub. No. 2005-0092483), conductor-in-conduit heat sources (see U.S. Pat. Pub. No. 2004-0020642), heater strips (see U.S. Pat. No. 3,793,716), resistive heating strips (see U.S. Pat. No. 4,238,640) or any of the heating elements described in U.S. Pat. Nos. 7,066,730; 4,238,640; 3,971,416; and 3,814,574.

The injector for introducing the cryogenic injection composition into the fluid within the conduit can include a thermal monitoring device, such as a thermocouple. The thermal monitoring device can be in communication with a computer in order to monitor the temperature of the injector. The injector for introducing the cryogenic injection composition into the fluid within the conduit can include a computer module for automation of the system. The computer module can be in communication with and/or in control of heating elements, valves, thermal monitoring devices. In some embodiments, a computer processor of the computer module can control flow-control metering valves to provide a flow of the cryogenic injection composition through the injector into the fluid within the conduit. The methods provided herein can be embodied in a non-transient computer-readable storage medium having a computer-readable program embodied therein for directing operation of the described system such as described above.

G. EXAMPLES

The following examples illustrate specific aspects of the present invention and are not intended to limit the scope thereof in any respect and should not be so construed.

Example 1

A cryogenic injection composition can be prepared by dispersing iron particles in liquid nitrogen. 10 g of spherical iron powder of a size between 1-3 micron (Alfa Aesar iron powder, 1-3 micron, from Fisher Scientific, Pittsburgh, Pa., Catalog No. AA4033714) and 10 g of graphite (crystalline, −300 mesh, Alfa Aesar, Ward Hill, Mass., Catalog No. 10129-30) can be placed into an insulated, pre-cooled container (cooled by addition of liquid nitrogen and allowing the liquid nitrogen to boil off), such as a bench top liquid nitrogen container, and 80 g of liquid nitrogen can be added to the container. The container can be closed using a clamped vented lid and the contents of the container combined by agitation of the container, providing a cryogenic injection composition containing iron particles in liquid nitrogen.

Example 2

A cryogenic injection composition can be prepared by dispersing diatomaceous earth and aluminum particles in liquid nitrogen. 40 g of spherical aluminum powder (5 micron, available from Alcoa, Inc., Pittsburgh, Pa.), 10 g of graphite (crystalline, −300 mesh) and 10 g diatomaceous earth (such as Celite® 545 filter aid, Fisher Scientific, Pittsburgh, Pa.) can be added to a pre-cooled insulated EMD Millipore® dispensing pressure vessel, and 140 g liquid nitrogen can be added to the vessel. The vessel can be sealed and the contents mixed by any appropriate means, such as by agitation of the vessel. The resulting cryogenic injection composition can by dispensed to an injector device by connecting the vessel to the injector device with appropriate cryogenic tubing.

While various embodiments of the subject matter provided herein have been described, it should be understood that they have been presented by way of example only, and not limitation. Since modifications will be apparent to those of skill in this art, it is intended that this invention be limited only by the scope of the appended claims.

The invention claimed is:
1. A cryogenic injection composition, comprising:
   a fluid cryogen selected from among liquid nitrogen, liquid oxygen, liquid helium, liquid neon, liquid methane, liquid natural gas, liquid argon, liquid nitrous oxide, liquid carbon dioxide, liquid chlorofluorocarbons and combinations thereof;
   a material selected from among carbon fibers, carbon nanostructures, graphite, fused silica, ground granite, aluminum silicon carbide, aluminum graphite, aluminum nitride, silicon nitride ceramic, and polyacetylene fibers and combinations thereof having a size of 100 μm or less in an amount of at or about 0.05% to at or about 90% based on the weight of the injection composition;
   a plurality of particles having a diameter of 1 μm or greater in an amount of at or about 0.05% to at or about 90% based on the weight of the injection composition, wherein the particles comprise a material having a specific heat capacity ($c_p$) from about 0.25 $J \cdot g^{-1} K^{-1}$ to about 2.5 $J \cdot g^{-1} K^{-1}$; and
   frozen particles of solvent in an amount from at or about 0.05% to at or about 85% based on the weight of the injection composition.

2. The cryogenic injection composition of claim 1, further comprising particles that comprise a material that has a specific heat capacity ($c_p$) of at or about 1 $J \cdot g^{-1} K^{-1}$ to at or about 3 $J \cdot g^{-1} K^{-1}$.

3. The cryogenic injection composition of claim 1, wherein:
   (a) the particles comprise or are coated with frozen water or solid carbon dioxide; or
   (b) the particles comprise a thermally conductive material selected from among copper, brass, beryllium, cobalt, chrome nickel steel, iron, magnesium, molybdenum, nickel, zinc, carbon steel, stainless steel and any combination or alloy thereof; or
   (c) both (a) and (b).

4. The cryogenic injection composition of claim 1, wherein the particles are of a material or contain a material selected from among paraffin wax, frozen water, solid polyethylene, beryllium, aluminum, glass, silica, titanium, chromium, chrome nickel steel, iridium, lead, magnesium, molybdenum, nickel, carbon steel, stainless steel, zinc, copper, and iron and a combination thereof.

5. The cryogenic injection composition of claim 1, wherein:
   (a) the particles are hollow; or
   (b) the particles contain entrapped gas.

6. The cryogenic injection composition of claim 1, wherein:
   the particles have a diameter between 1 μm and 10 μm; or
   the particles have a diameter less than 100 μm.

7. The cryogenic injection composition of claim 1, wherein the particles are of a shape selected from among cubes, flakes, granules, cylinders, rings, rods, needles, prisms, disks, fibers, pyramids, spheres, spheroids, prolate spheroids, oblate spheroids, ellipsoids, ovoids and random non-geometric shapes and combinations of these shapes.

8. The cryogenic injection composition of claim 1, wherein the particles have a specific surface area in a range from at or about 0.1 $m^2/g$ to at or about 500 $m^2/g$.

9. The cryogenic injection composition of claim 1, wherein the carbon nanostructures are selected from among carbon nanotubes, carbon buckyballs, carbon nanoribbons and carbon nanowires and combinations thereof.

10. The cryogenic injection composition of claim 1, further comprising a surfactant selected from among cationic, anionic, non-ionic, amphoteric, zwitterionic and silicone surfactants and a combination thereof in an amount from at or about 0.1% to at or about 25% based on the weight of the composition.

11. A method for freezing at least a portion of a flowing fluid in a conduit, comprising:
   injecting via an injector a cryogenic injection composition of claim 1 into the fluid in the pipeline.

12. The method of claim 11, wherein the fluid within the conduit comprises a hydrocarbon.

13. A cryogenic injection composition, comprising:
   a fluid cryogen selected from among liquid nitrogen, liquid oxygen, liquid helium, liquid neon, liquid methane, liquid natural gas, liquid argon, liquid nitrous oxide, liquid carbon dioxide, liquid chlorofluorocarbons and combinations thereof;
   a material selected from among carbon fibers, carbon nanostructures, graphite, fused silica, ground granite, aluminum silicon carbide, aluminum graphite, aluminum nitride, silicon nitride ceramic, and polyacetylene fibers and combinations thereof having a size of 100

μm or less in an amount of at or about 0.05% to at or about 90% based on the weight of the injection composition; and a plurality of particles having a diameter of 100 μm or less in an amount of at or about 0.05% to at or about 90% based on the weight of the injection composition, wherein the particles comprise a material selected from among a metal, a glass, a metal-coated glass, an oxide, a plastic, a metal-coated plastic, a ceramic, corian, diatomaceous earth, fiberglass, foam glass, gypsum, magnesite, magnesia fibers, mineral fibers, nylon, perlite, foamed plastic, expanded polystyrene, polyurethane, porcelain, PTFE, PVC, pyrex glass, silica, amorphous silica, vermiculite, crushed stone, sand, paraffin wax, frozen water, solid polyethylene and combinations thereof, wherein the particles comprise or are coated with frozen water; and (a) a material that has a heat of fusion greater than 20 cal/g; or (b) a material that has a heat of sublimation greater than 500 $J \cdot g^{-1}$; or (c) both (a) and (b).

14. The cryogenic injection composition of claim 13, further comprising a surfactant selected from among cationic, anionic, non-ionic, amphoteric, zwitterionic and silicone surfactants and a combination thereof.

15. The cryogenic injection composition of claim 13, wherein the metal is selected from among lithium, beryllium, aluminum, titanium, iron, chromium, zinc, copper, silver, cadmium, tin, tungsten, gold, bismuth, brass, cobalt, chrome nickel steel, iridium, lead, magnesium, molybdenum, nickel, platinum, carbon steel, stainless steel or a combination or alloy thereof.

16. The cryogenic injection composition of claim 13, wherein the oxide is selected from among an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

17. The cryogenic injection composition of claim 13, wherein:

(a) the particles are hollow; or (b) the particles contain entrapped gas.

18. The cryogenic injection composition of claim 13, wherein:

the particles have a diameter between 1 μm and 10 μm; or the particles have a diameter less than 1000 nm.

19. The cryogenic injection composition of claim 13, wherein the particles are of a shape selected from among cubes, flakes, granules, cylinders, rings, rods, needles, prisms, disks, fibers, pyramids, spheres, spheroids, prolate spheroids, oblate spheroids, ellipsoids, ovoids and random non-geometric shapes and combinations of these shapes.

20. The cryogenic injection composition of claim 13, wherein the particles have a specific surface area in a range from at or about 0.1 $m^2/g$ to at or about 500 $m^2/g$.

21. The cryogenic injection composition of claim 13, wherein the carbon nanostructures are selected from among carbon nanotubes, carbon buckyballs, carbon nanoribbons and carbon nanowires and combinations thereof.

22. A method for freezing at least a portion of a flowing fluid in a conduit, comprising injecting via an injector a cryogenic injection composition of claim 13 into the fluid in the pipeline, wherein the injection of the cryogenic injection composition results in a reduction in thermal energy in the flowing fluid within the conduit thereby reducing or eliminating the flow of fluid through the conduit.

23. The method of claim 22, wherein the fluid within the conduit comprises a hydrocarbon.

24. The method of claim 22, the cryogenic injection composition further comprising a material having a high latent heat of fusion or a high heat of sublimation.

25. A cryogenic injection composition, comprising:

a fluid cryogen selected from among liquid nitrogen, liquid oxygen, liquid helium, liquid neon, liquid methane, liquid natural gas, liquid argon, liquid nitrous oxide, liquid carbon dioxide, liquid chlorofluorocarbons and combinations thereof;

a plurality of frozen beads comprising a frozen solvent and particles having a diameter of 10 μm or less, the particles comprising a material having a specific heat capacity ($c_p$) from about 0.1 $J \cdot g^{-1} K^{-1}$ to about 2.5 $J \cdot g^{-1} K^{-1}$, wherein:

the particles are contained within the frozen beads; or the particles are contained on the surface of the frozen beads; or the particles are on the surface of and contained within the frozen beads.

26. The cryogenic injection composition of claim 25, wherein the frozen bead further comprises a material having a high latent heat of fusion or high heat of sublimation.

27. The cryogenic injection composition of claim 25, wherein the frozen bead further comprises a surface active agent selected from among an anionic surfactant, a cationic surfactant, a zwitterionic surfactant, a non-ionic surfactant and a silicone surfactant and a combination thereof.

28. A method for modulating flow of a fluid in a conduit, comprising:

activating an injection device affixed to the conduit to introduce into the fluid within the conduit the cryogenic injection composition of claim 25;

wherein the injection of the cryogenic injection composition results in a reduction in thermal energy in the flowing fluid within the conduit thereby reducing or eliminating the flow of fluid through the conduit.

29. The method of claim 28, wherein:

the cryogenic injection composition further comprises frozen beads comprising a material having a high latent heat of fusion or a high heat of sublimation; and the solvent is selected to have a melting point below the initial temperature of the fluid flowing within the conduit.

30. The method of claim 28, wherein the cryogenic injection composition further comprises a surfactant selected from among an anionic surfactant, a cationic surfactant, a zwitterionic surfactant, a non-ionic surfactant and a silicone surfactant and a combination thereof.

31. The method of claim 28, wherein the carbon nanostructures of the cryogenic injection composition are selected from among carbon nanotubes, carbon buckyballs, carbon nanoribbons and carbon nanowires and combinations thereof.

32. The method of claim 28, wherein:

the particles of the frozen beads have a shape selected from among cubes, flakes, granules, cylinders, rings, rods, needles, prisms, disks, fibers, pyramids, spheres, spheroids, prolate spheroids, oblate spheroids, ellipsoids, ovoids and random non-geometric shapes and combinations of these shapes; and the particles of the frozen beads are hollow or contain entrapped gas.

33. The cryogenic injection composition of claim 25, wherein the solvent comprises acetaldehyde, acetone, acetonitrile, acrolein, benzene, benzonitrile, bromo-benzene, butanol, butyl acetate, n-butyl amine, t-butyl amine, butyl bromide, carbitol acetate, carbon disulfide, carbon tetrachloride, chlorobenzene, chloroform, cyclohexane, cyclohexanone, cyclopentane, m-dichlorobenzene, o-dichloro-benzene, diethyl carbitol, diethyl ether, dioxane, ethanol, ethyl acetate, ethyl bromide, ethylene glycol, ethyl methyl ketone, glycerin, heptane, heptanone, hexane, hexanol, 1,5-hexadiene, isoamyl acetate, isooctane, isopentane, isopropanol, methanol, methyl cyclohexane, nitroethane, nitromethane, n-octane, octanol, i-pentane, m-pentane, propanol, propylene glycol, pyridine, toluene, thiophene, trichloroethylene, water, m-xylene, p-xylene or a combination thereof.

34. The cryogenic injection composition of claim 25, wherein:
the particles of the frozen beads comprise a metal selected from among copper, brass, beryllium, cadmium, cobalt, chrome nickel steel, gold, silver, iridium, iron, lead, magnesium, molybdenum, nickel, platinum, tin, zinc, carbon steel, stainless steel and any combination or alloy thereof; or
the particles of the frozen beads comprise an oxide selected from among an oxide of alumina, aluminum, barium, beryllium, bismuth, chromium, cobalt, copper, gadolinium iridium, iron, magnesium, manganese, molybdenum, nickel, niobium, silica, silicon, silver, tantalum, thorium, tin, titanium, tungsten, vanadium, yttrium, zinc, zirconia or zirconium or combinations thereof.

35. The cryogenic injection composition of claim 25, further comprising frozen beads comprising a material having a high latent heat of fusion or a high heat of sublimation.

* * * * *